US012457465B2

(12) United States Patent
Radisavljevic et al.

(10) Patent No.: US 12,457,465 B2
(45) Date of Patent: Oct. 28, 2025

(54) SYSTEM FOR DYNAMICALLY DERIVING AND USING POSITIONAL BASED GAIN OUTPUT PARAMETERS ACROSS ONE OR MORE MICROPHONE ELEMENT LOCATIONS

(71) Applicant: NUREVA, INC., Calgary (CA)

(72) Inventors: Aleksander Radisavljevic, Victoria (CA); Linshan Li, Calgary (CA); Kael Blais, Englewood, CO (US)

(73) Assignee: NUREVA, INC., Calgary (CA)

( * ) Notice: Subject to any disclaimer, the term of this patent is extended or adjusted under 35 U.S.C. 154(b) by 228 days.

(21) Appl. No.: 18/126,739

(22) Filed: Mar. 27, 2023

(65) Prior Publication Data

US 2023/0308822 A1 Sep. 28, 2023

Related U.S. Application Data

(60) Provisional application No. 63/324,452, filed on Mar. 28, 2022.

(51) Int. Cl.
*H04S 7/00* (2006.01)
*H04R 1/40* (2006.01)
*H04R 3/00* (2006.01)

(52) U.S. Cl.
CPC ............... *H04S 7/30* (2013.01); *H04R 1/406* (2013.01); *H04R 3/005* (2013.01); *H04R 2201/401* (2013.01); *H04S 2400/15* (2013.01)

(58) Field of Classification Search
CPC ....... H04S 7/30; H04S 2400/15; H04R 1/406; H04R 3/005; H04R 2201/401
(Continued)

(56) References Cited

U.S. PATENT DOCUMENTS 4,499,578 A 2/1985 Marouf et al.
4,536,887 A 8/1985 Kaneda et al.
(Continued)

FOREIGN PATENT DOCUMENTS

EP 0903055 B1 10/2007
EP 2975609 A1 1/2016
(Continued)

OTHER PUBLICATIONS

Communication pursuant to Article 94(3) EPC dated Oct. 14, 2024, from European Patent Application No. 20749339.6-1207, 10 sheets.
(Continued)

*Primary Examiner* — William A Jerez Lora
(74) *Attorney, Agent, or Firm* — KATTEN MUCHIN ROSENMAN LLP

(57) ABSTRACT

A system is provided for positional based automatic gain control to adjust one or more dynamically configured combined microphone array in a shared 3D space. The system includes a combined microphone array including one or more of individual microphones and/or microphone arrays and a system processor communicating with the combined microphone array. The system processor is configured to obtain predetermined locations of the microphones throughout the shared 3D space, obtain predetermined coverage zone dimensions based on the locations of the microphones, populate the coverage zone dimensions with virtual microphones, identify locations of sound sources in the shared 3D space based on the virtual microphones, compute positional based gain control (PBGC) parameter values for virtual microphones based on the locations of the virtual microphones, and combine microphone signals into desired channel audio signals by applying the PBGC parameters to adjust microphones to control positional based microphone gains based on the location information of the sound sources.

30 Claims, 45 Drawing Sheets

(58) Field of Classification Search
USPC .......................................... 381/91, 92, 122
See application file for complete search history.

(56) References Cited

U.S. PATENT DOCUMENTS

| | | | | |
|---|---|---|---|---|
| 5,477,270 | A | 12/1995 | Park | |
| 5,699,437 | A | 12/1997 | Finn | |
| 6,469,732 | B1 | 10/2002 | Chang et al. | |
| 6,593,956 | B1 | 7/2003 | Potts et al. | |
| 6,912,178 | B2 | 6/2005 | Chu et al. | |
| 6,912,718 | B1 | 6/2005 | Chang et al. | |
| 7,130,705 | B2 | 10/2006 | Amir et al. | |
| 7,254,241 | B2 | 8/2007 | Rui et al. | |
| 7,489,788 | B2 | 2/2009 | Leung et al. | |
| 7,720,232 | B2 | 5/2010 | Oxford et al. | |
| 7,848,531 | B1 | 12/2010 | Vickers et al. | |
| 7,995,768 | B2 | 8/2011 | Miki et al. | |
| 8,185,387 | B1 | 5/2012 | Lachapelle | |
| 8,861,537 | B1 | 10/2014 | Braithwaite et al. | |
| 8,953,819 | B2 | 2/2015 | Ko et al. | |
| 9,706,292 | B2 | 7/2017 | Duraiswami et al. | |
| 9,800,964 | B2 | 10/2017 | McIntosh et al. | |
| 10,003,900 | B2 | 6/2018 | Cartwright et al. | |
| 10,042,038 | B1 | 8/2018 | Lord et al. | |
| 10,063,987 | B2 | 8/2018 | McGibney | |
| 10,229,697 | B2 | 3/2019 | Bastyr et al. | |
| 10,237,639 | B2 | 3/2019 | McIntosh et al. | |
| 10,387,108 | B2 | 8/2019 | McGibney | |
| 10,397,726 | B2 | 8/2019 | McGibney | |
| 10,848,896 | B2 | 11/2020 | McGibney | |
| 10,972,835 | B2 | 4/2021 | Rollow, IV | |
| 11,127,415 | B2 | 9/2021 | Magnusson et al. | |
| 11,190,871 | B2 | 11/2021 | Yorga et al. | |
| 2005/0280701 | A1 | 12/2005 | Wardell | |
| 2006/0034469 | A1 | 2/2006 | Tamiya et al. | |
| 2006/0165242 | A1 | 7/2006 | Miki et al. | |
| 2008/0085014 | A1 | 4/2008 | Chen et al. | |
| 2008/0107277 | A1 | 5/2008 | Somasundaram et al. | |
| 2008/0285771 | A1 | 11/2008 | Tanaka et al. | |
| 2009/0129609 | A1 | 5/2009 | Oh et al. | |
| 2010/0034397 | A1 | 2/2010 | Nakadai et al. | |
| 2010/0135118 | A1 | 6/2010 | Van Leest et al. | |
| 2011/0135125 | A1 | 6/2011 | Zhan et al. | |
| 2012/0093344 | A1 | 4/2012 | Sun et al. | |
| 2012/0245933 | A1 | 9/2012 | Flaks et al. | |
| 2013/0083934 | A1 | 4/2013 | Ahgren | |
| 2013/0101134 | A1 | 4/2013 | Betts-Lacroix | |
| 2013/0142342 | A1 | 6/2013 | Del Galdo et al. | |
| 2013/0258813 | A1 | 10/2013 | Herre et al. | |
| 2014/0050328 | A1 | 2/2014 | Fischer | |
| 2014/0098964 | A1 | 4/2014 | Rosca et al. | |
| 2014/0119552 | A1 | 5/2014 | Beaucoup | |
| 2014/0133666 | A1 | 5/2014 | Tanaka et al. | |
| 2014/0185824 | A1 | 7/2014 | Burnett | |
| 2014/0314251 | A1 | 10/2014 | Rosca et al. | |
| 2014/0348342 | A1 | 11/2014 | Laaksonen et al. | |
| 2015/0185312 | A1 | 7/2015 | Gaubitch et al. | |
| 2015/0222996 | A1 | 8/2015 | Chu et al. | |
| 2015/0230026 | A1 | 8/2015 | Eichfeld et al. | |
| 2016/0071526 | A1 | 3/2016 | Wingate et al. | |
| 2016/0112469 | A1 | 4/2016 | Liu | |
| 2016/0173976 | A1 | 6/2016 | Podhradsky | |
| 2017/0178628 | A1 | 6/2017 | Macours et al. | |
| 2017/0347217 | A1* | 11/2017 | McGibney | H04R 29/005 |
| 2017/0366896 | A1 | 12/2017 | Adsumilli et al. | |
| 2017/0374454 | A1 | 12/2017 | Bernardini et al. | |
| 2018/0074782 | A1* | 3/2018 | McGibney | H04R 5/027 |
| 2018/0098174 | A1 | 4/2018 | Goodwin et al. | |
| 2018/0249267 | A1 | 8/2018 | Klingler et al. | |
| 2019/0349471 | A1 | 11/2019 | Ferguson et al. | |
| 2019/0364359 | A1* | 11/2019 | Ferguson | A61K 9/5031 |
| 2021/0035563 | A1 | 2/2021 | Cartwright et al. | |
| 2022/0004355 | A1 | 1/2022 | McGibney | |
| 2023/0133265 | A1* | 5/2023 | Springer | H04N 7/147<br>348/14.03 |

FOREIGN PATENT DOCUMENTS

| | | | |
|---|---|---|---|
| JP | 3154468 | B2 | 4/2001 |
| JP | 2018026701 | A | 2/2018 |
| WO | 03010995 | A2 | 2/2003 |
| WO | 2022/118072 | A1 | 6/2022 |

OTHER PUBLICATIONS

International Search Report and Written Opinion mailed Aug. 9, 2024, for International Patent Application No. PCT/CA2024/050615, 9 sheets.

Notice of Allowance dated Feb. 7, 2024, from U.S. Appl. No. 17/516,480, 10 sheets.

Communication pursuant to Article 94(3) EPC dated Feb. 29, 2024, from European Patent Application No. 21204322.8, 9 sheets.

Communication pursuant to Article 94(3) EPC dated Mar. 12, 2024, from European Patent Application No. 19808293.5, 6 sheets.

Theodoropoulos D et al.: "A reconfigurable beamformer for audio applications", 7th Symposium on Application Specific Processors, 2009. SASP '09. IEEE,, Jul. 27, 2009, pp. 80-87, XP031522047, ISBN: 978-1-4244-4939-2.

Final Office Action dated Dec. 5, 2024, from U.S. Appl. No. 17/739,926, 29 sheets.

Non-Final Office Action dated Oct. 11, 2023, from U.S. Appl. No. 17/516,480, 40 sheets.

Non-Final Office Action dated Apr. 25, 2024, from U.S. Appl. No. 17/739,926, 57 sheets.

International Search Report and Written Opinion mailed Sep. 15, 2017, from International Application No. PCT/CA2017/050642, 12 sheets.

Joseph Hector Dibiase, Thesis entitled, "A High-Accuracy, Low-Latency Technique for Talker Localization in Reverberant Environments Using Microphone Arrays", Brown University, May 2000.

Notice of Allowance dated Apr. 30, 2018, from U.S. Appl. No. 15/597,646, 18 sheets.

International Search Report and Written Opinion mailed Jun. 7, 2023, from International Application No. PCT/CA2023/50412, 11 sheets.

Extended European Search Report mailed May 7, 2019, from European Patent Application No. 17805437.5, 23 sheets.

Notice of Allowance dated May 24, 2019, from U.S. Appl. No. 16/110,393, 6 sheets.

Non-Final Rejection dated Sep. 17, 2018, from U.S. Appl. No. 16/110,393, 14 sheets.

International Search Report and Written Opinion mailed Oct. 12, 2017, from International Application No. PCT/CA2017/050676, 8 sheets.

Notice of Allowance dated Apr. 2, 2019, from U.S. Appl. No. 15/603,986, 42 sheets.

Final Rejection dated May 25, 2018, from U.S. Appl. No. 15/603,986, 13 sheets.

Non-Final Rejection dated Jan. 24, 2018, from U.S. Appl. No. 15/603,986, 26 sheets.

Communication pursuant to Article 94(3) EPC dated Feb. 17, 2020, from European Patent Application No. 17805437.5, 6 sheets.

Notice of Allowance dated Jul. 16, 2020, from U.S. Appl. No. 16/518,013, 19 sheets.

Non-Final Rejection dated Feb. 28, 2020, from U.S. Appl. No. 16/518,013, 21 sheets.

Notice of Allowance dated Apr. 11, 2019, from U.S. Appl. No. 16/110,393, 18 sheets.

Notice of Allowance dated Jan. 19, 2018, from U.S. Appl. No. 15/597,646, 22 sheets.

Notice of Allowance dated Aug. 16, 2021, from U.S. Appl. No. 17/097,560, 33 sheets.

Extended European search report from European Application No. 20194651.4 with a mailing date of Jan. 21, 2021, 11 sheets.

Extended European search report from European Application No. 17847841.8 with a mailing date of Jun. 28, 2019, 12 sheets.

(56) References Cited

OTHER PUBLICATIONS

Communication pursuant to Rules 70(2) and 70a(2) EPC from European Application No. 17847841.8 with a mailing date of Jul. 16, 2019, 1 sheet.
U.S. Appl. No. 62/343,512, filed May 31, 2016, 41 sheets.
U.S. Appl. No. 62/162,091, filed May 15, 2015, 52 sheets.
U.S. Appl. No. 62/345,208, filed Jun. 3, 2016, 44 sheets.
Non-Final Rejection dated Feb. 9, 2021, from U.S. Appl. No. 16/434,725, 72 sheets.
Notice of Allowance dated Jan. 25, 2023, from U.S. Appl. No. 17/374,585, 11 sheets.
Notice of Allowance dated Jan. 19, 2023, from U.S. Appl. No. 17/374,585, 41 sheets.
Non-Final Rejection dated Aug. 8, 2022, from U.S. Appl. No. 17/374,585, 57 sheets.
The extended European search report completed Feb. 2, 2022 (dated Feb. 10, 2022), from European Application No. 19808293.5, 8 sheets.
Emanuël A. P. Habets and Jacob Benesty, "A Two-Stage Beamforming Approach for Noise Reduction and Dereverberation", IEEE Transactions on Audio, Speeach, and Language Processing, vol. 21, No. 5, May 2013, pp. 945-958.
Gerhard Doblinger, "An Adaptive Microphone Array for Optimum Beamforming and Noise Reduction", 14th European Signal Processing Conference (EUSIPCO 2006), Florence, Italy, Sep. 4-8, 2006, 5 sheets.
Taylor B. Spalt, Christopher R. Fuller, Thomas F. Brooks, William M. Humphreys, Jr., "A Background Noise Reduction Technique using Adaptive Noise Cancellation for Microphone Arrays", p. 1-16, available at: https://ntrs.nasa.gov/search.jsp?R=20110012472 2018-05-16T17:29:07+00:00Z.
International Search Report and Written Opinion dated Oct. 3, 2019, from PCT/CA2019/050708, 9 sheets.
Notice of Allowance dated Feb. 10, 2023, from U.S. Appl. No. 16/421,908, 24 sheets.
Final Rejection dated Oct. 11, 2022, from U.S. Appl. No. 16/421,908, 26 sheets.
Non-Final Rejection dated Apr. 20, 2022, from U.S. Appl. No. 16/421,908, 38 sheets.
International Search Report and Written Opinion dated Jun. 15, 2023, from International Application No. PCT/CA2023/050371, 7 sheets.
International Search Report and Written Opinion dated May 30, 2023, from International Application No. PCT/CA2023/050277, 7 sheets.
The extended European search report dated Sep. 27, 2022, from European Patent Application No. 20749339.6, 15 sheets.
International Search Report and Written Opinion mailed May 22, 2020, from International Application No. PCT/CA2020/050100, 11 sheets.
Non-Final Rejection dated Dec. 10, 2020, from U.S. Appl. No. 16/774,258, 28 sheets.
Notice of Allowance dated Jul. 26, 2021, from U.S. Appl. No. 16/774,258, 21 sheets.
Lightspeed Technologies, "Audio Solutions for Classroom Reopening Challenges", Duplicom Presentation Systems, https://www.duplicom.com/products/lightspeed-audio-solutions/, Aug. 27, 2020, 7 sheets.
Luis Guerra, Troy Jensen, "How to Use The Shure MXA910 Ceiling Array Microphone for Voice Lift", Shure Incorporated, USA, Created Sep. 2016, upated Jul. 2018, Shure Incorporated, 11 sheets.
Alberta Infrastructure, "Sound-Field Systems Guide for Classrooms", published in May 2004, 19 sheets.
The extended European Search Report dated Feb. 11, 2022, from European Patent Application No. 21204322.8, 7 sheets.
International Search and Written Opinion dated Jul. 18, 2022, from PCT/CA2022/050731, 8 sheets.

* cited by examiner

FIG. 1a Prior Art – Typical audio conference system variations
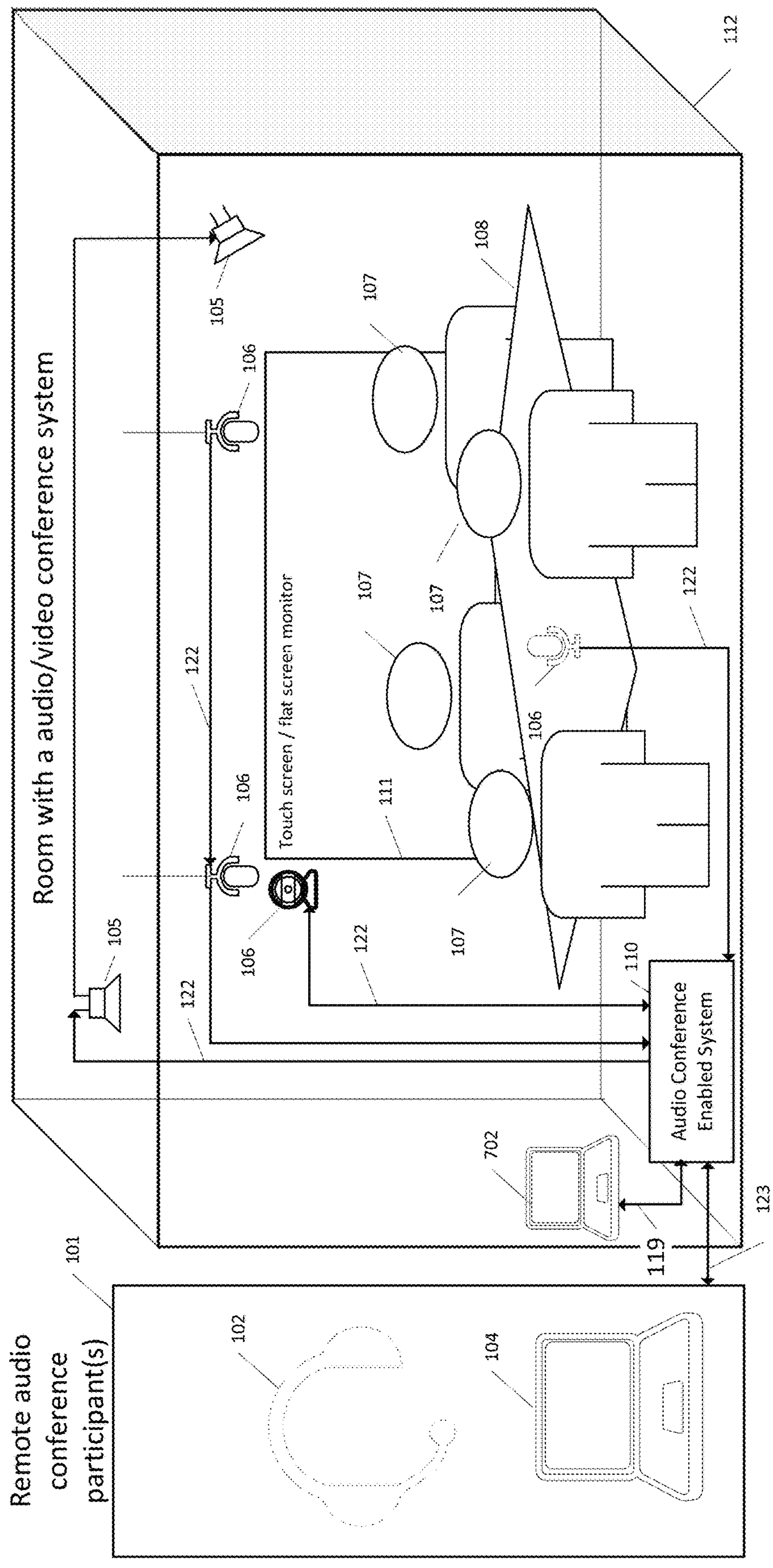

FIG. 1b Prior Art - Microphone Array and Speaker System
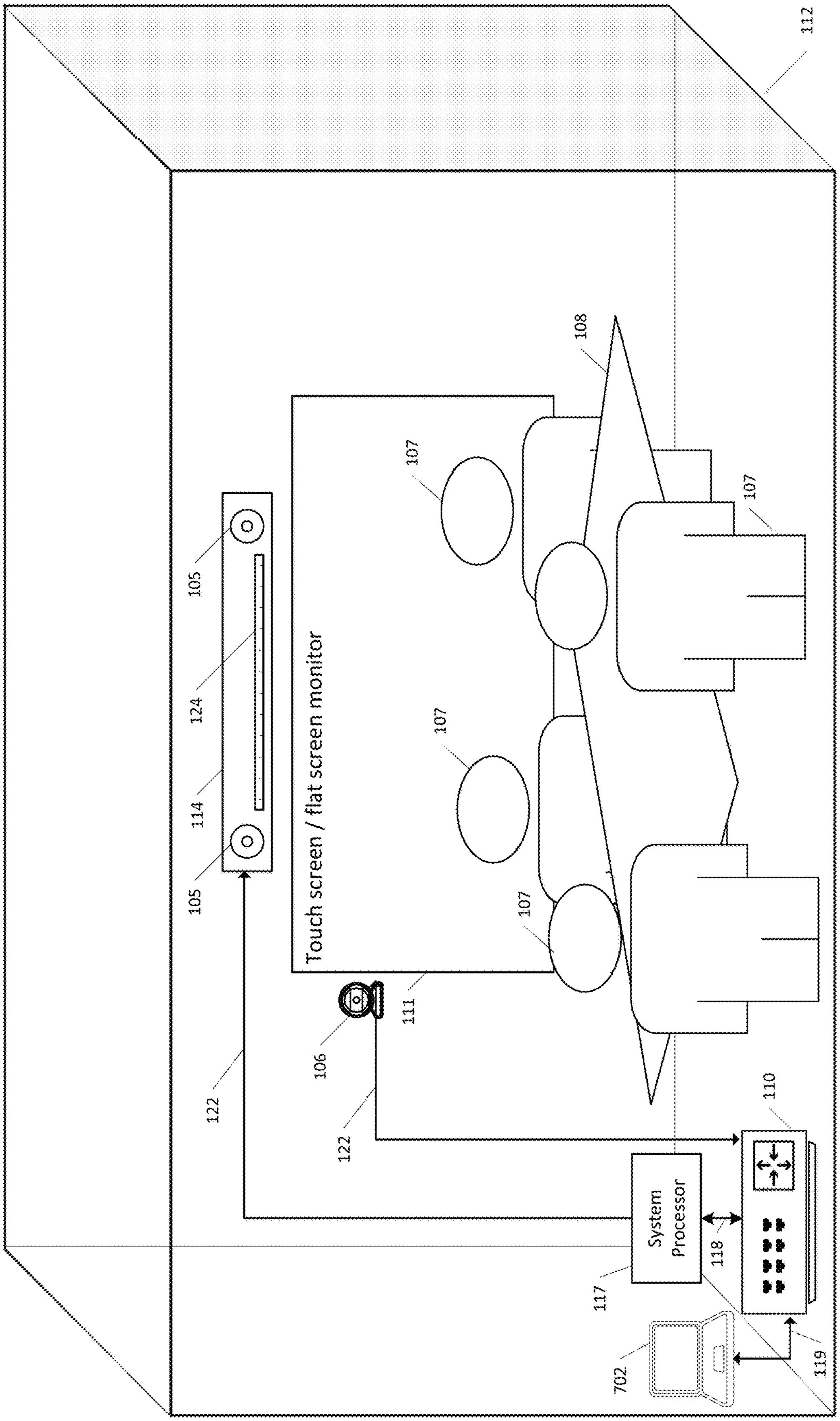

FIG. 1c Prior Art - Microphone Array and Speaker System
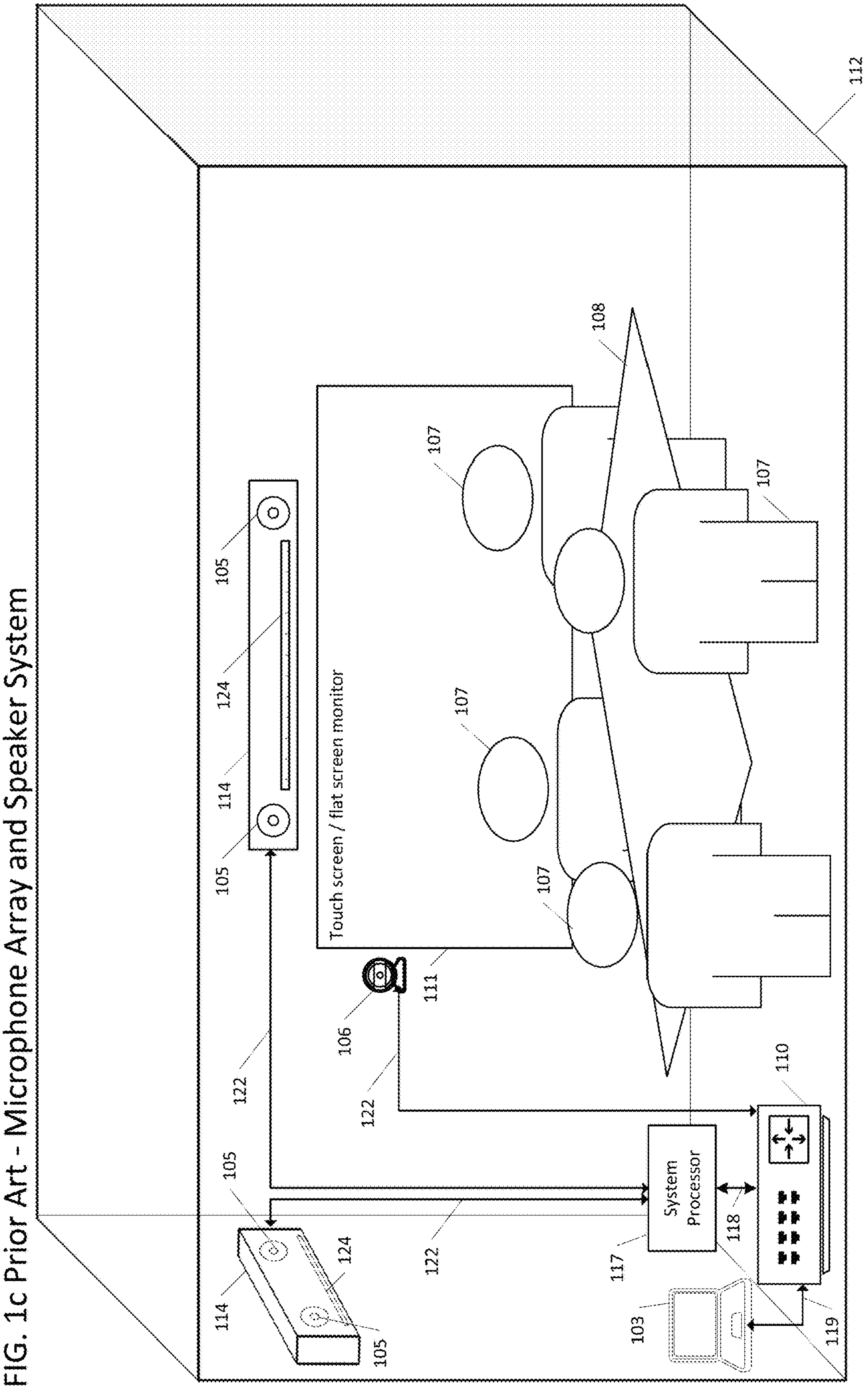

FIG. 2a Examples of Possible Microphone Arrangements
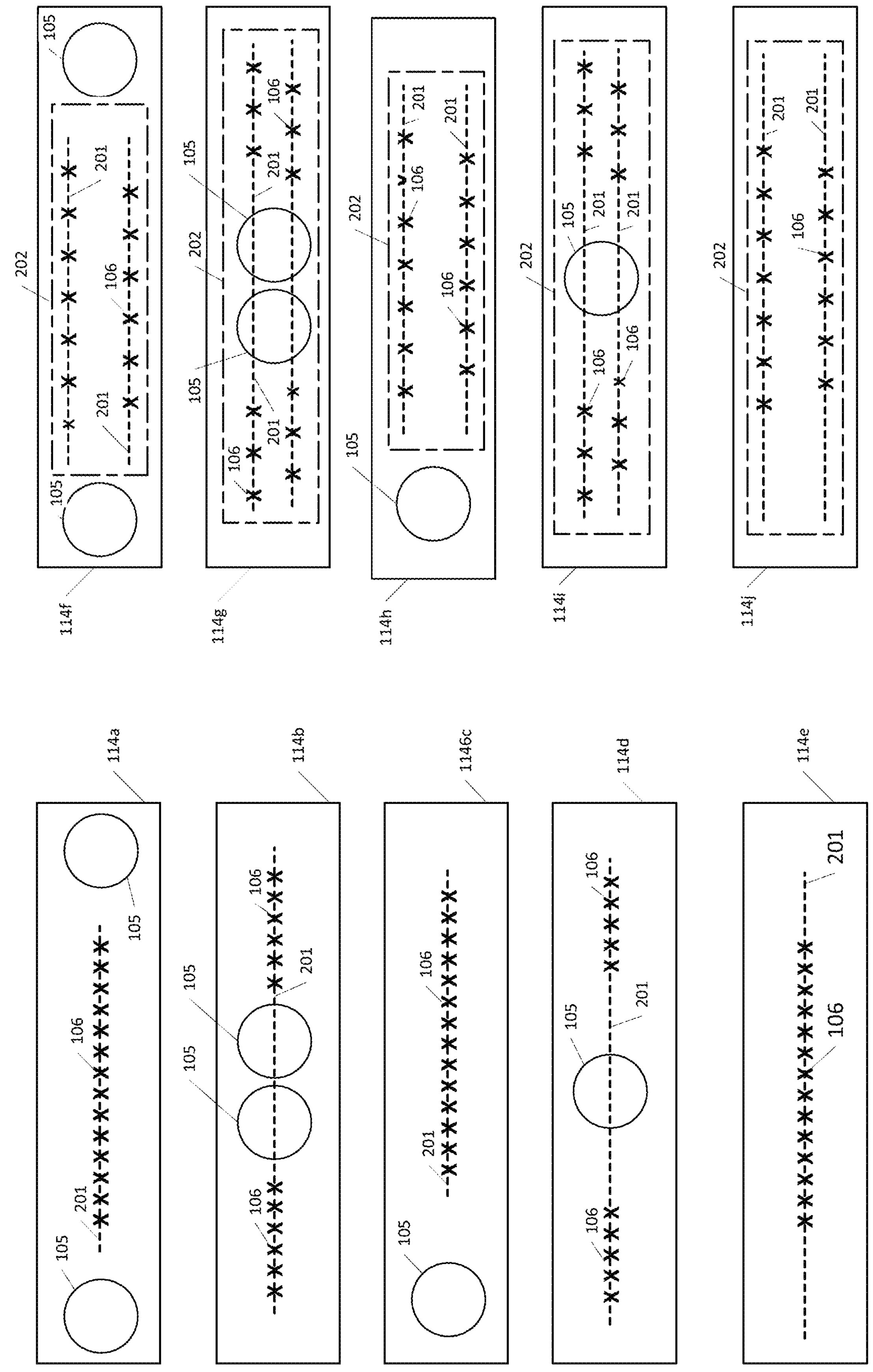

Examples of Microphone Axis (M-Axis) Arrangement

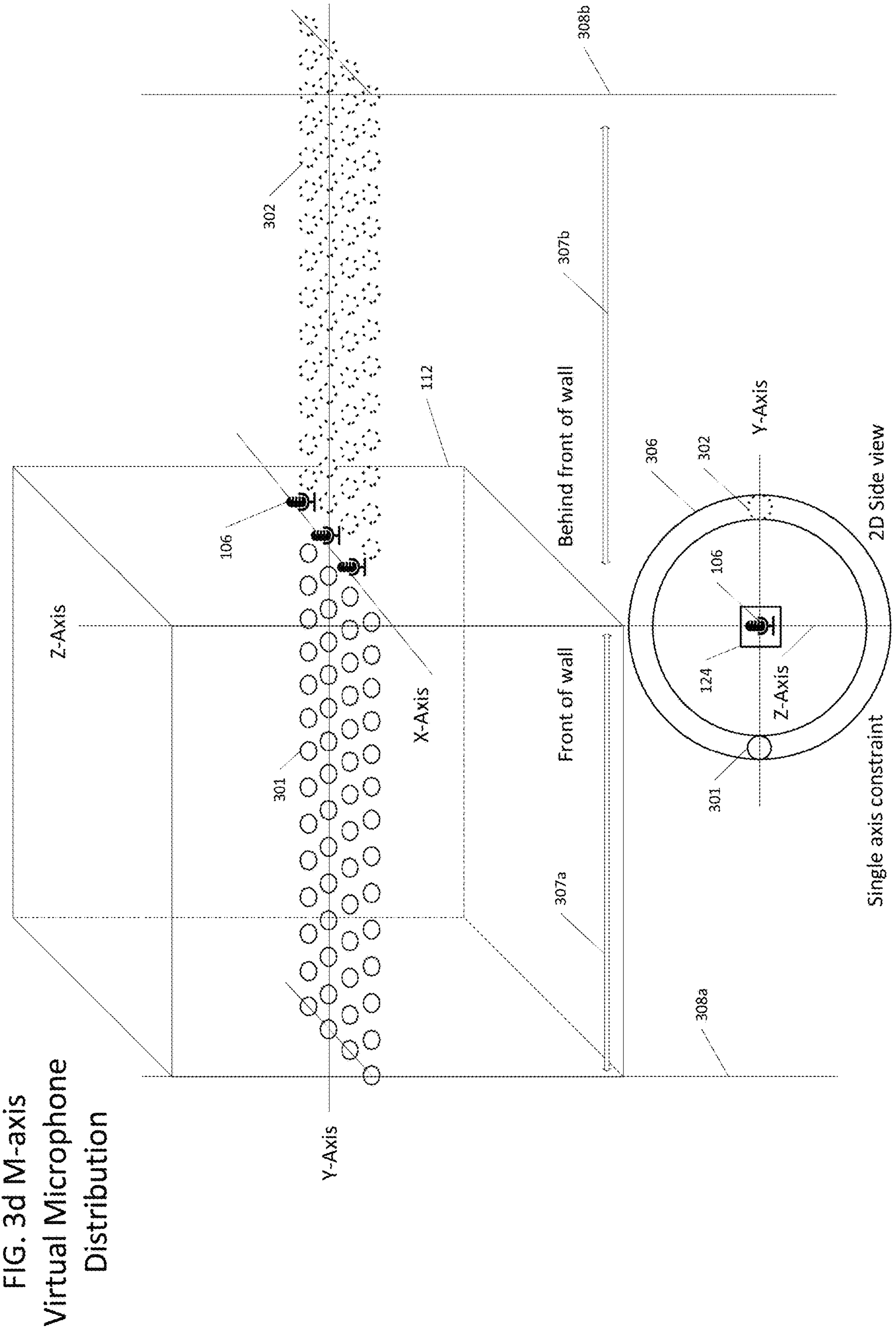
FIG. 3d M-axis Virtual Microphone Distribution

Examples of Microphone Plane (M-Plane) Arrangements

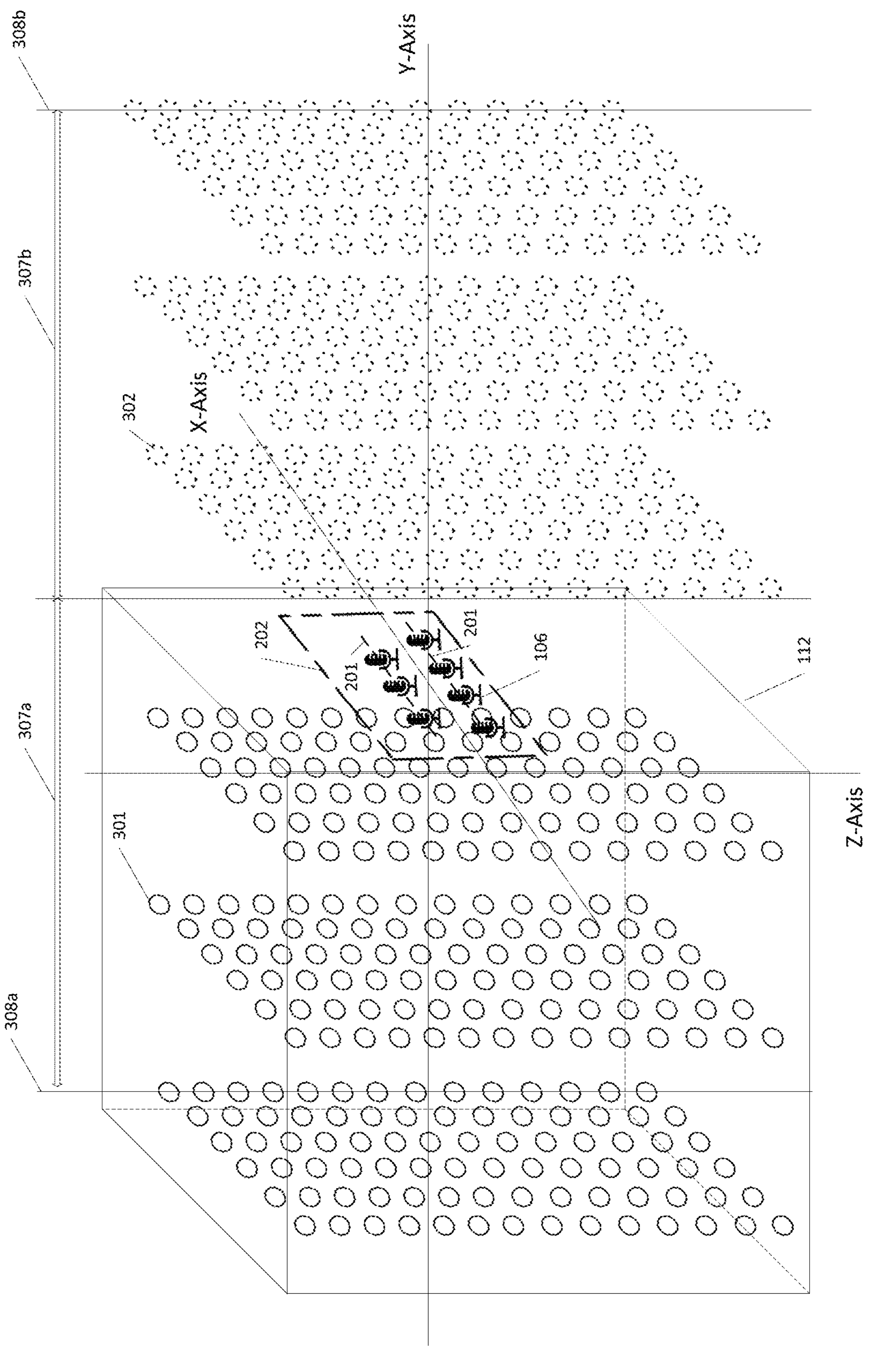
FIG. 3k M-Plane Virtual Microphone Distribution

Examples of Microphone Hyperplane (M-Hyperplane) Arrangements

A
B
C
D
E
112
201
203
106

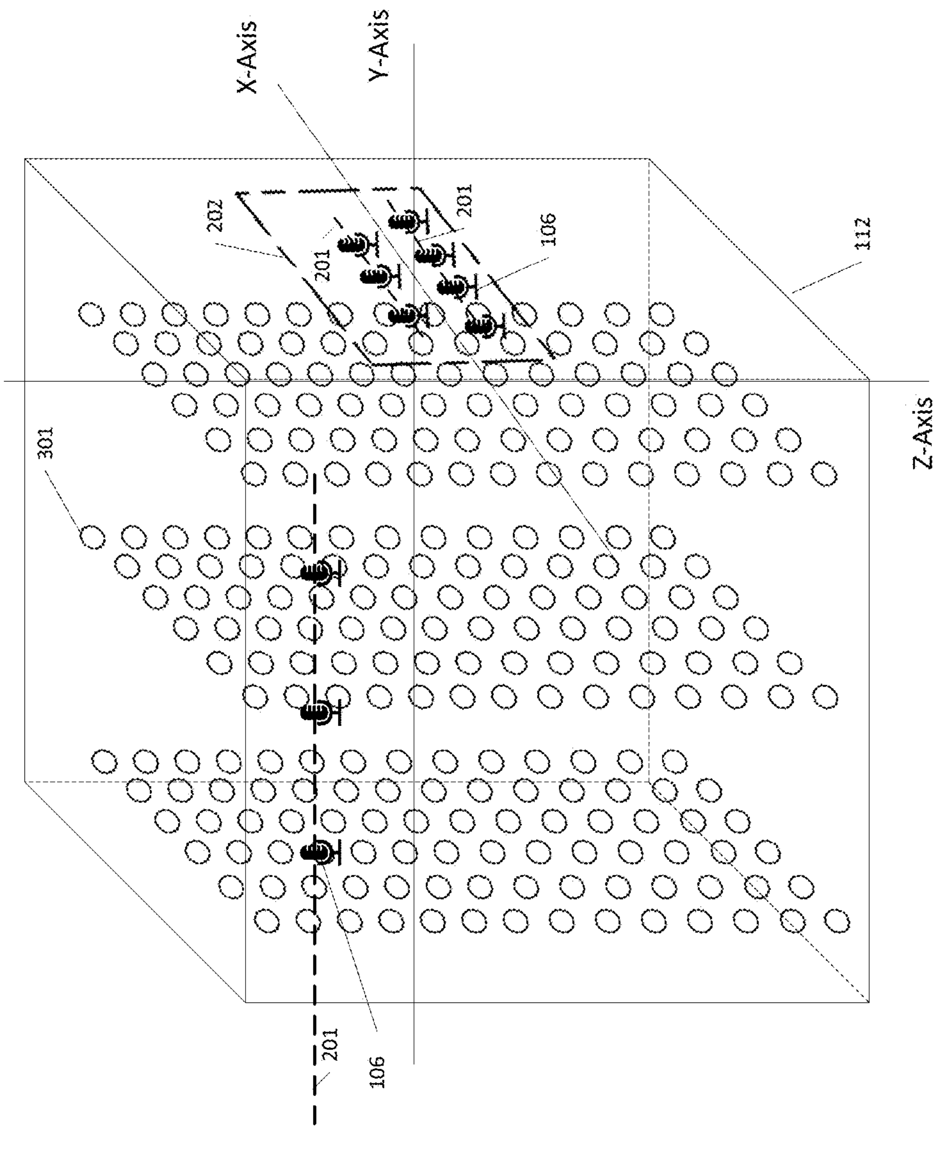
FIG. 3r M-Hyperplane Virtual Microphone Distribution

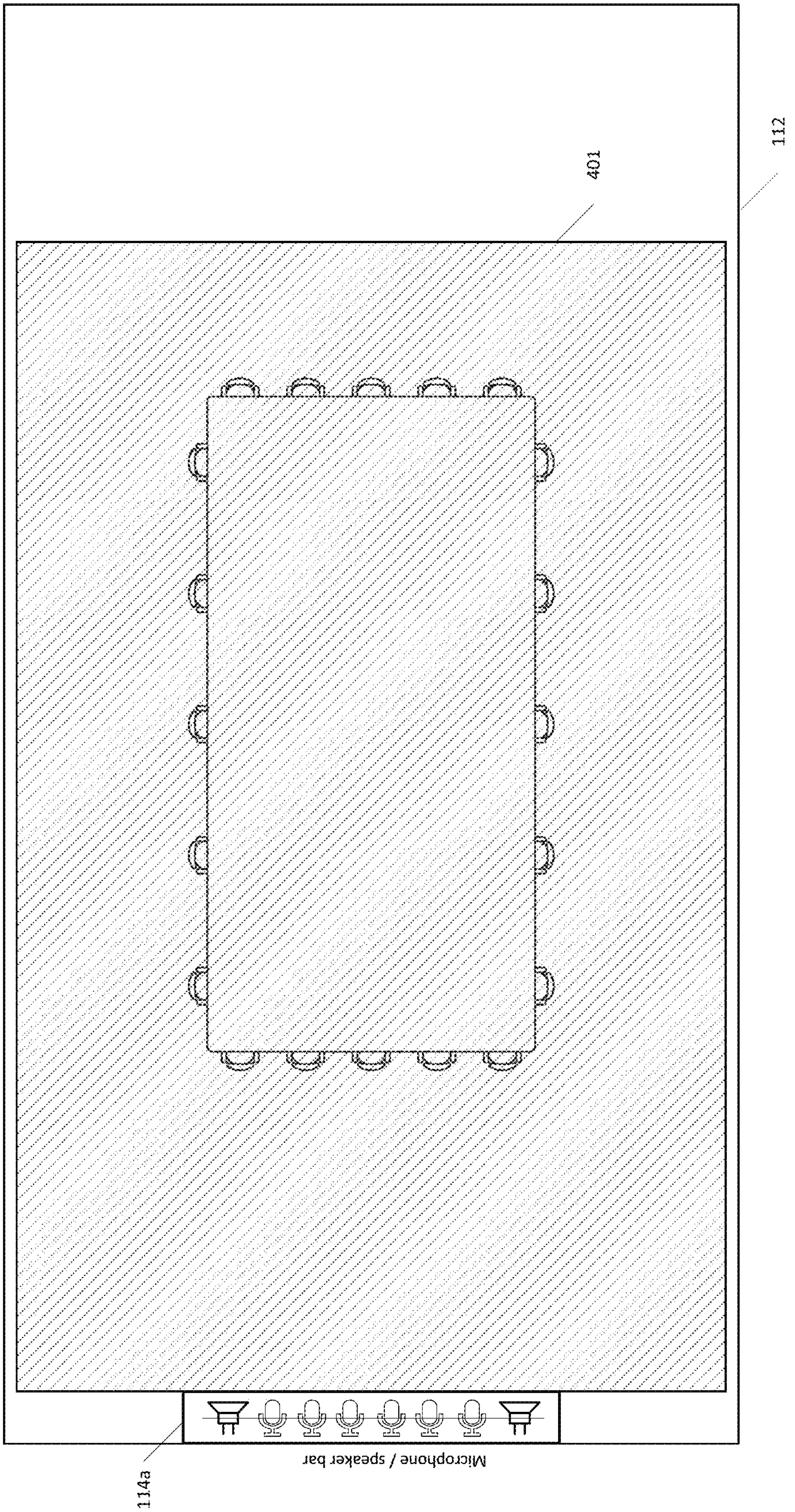
FIG. 4a Current Art – Array coverage patterns

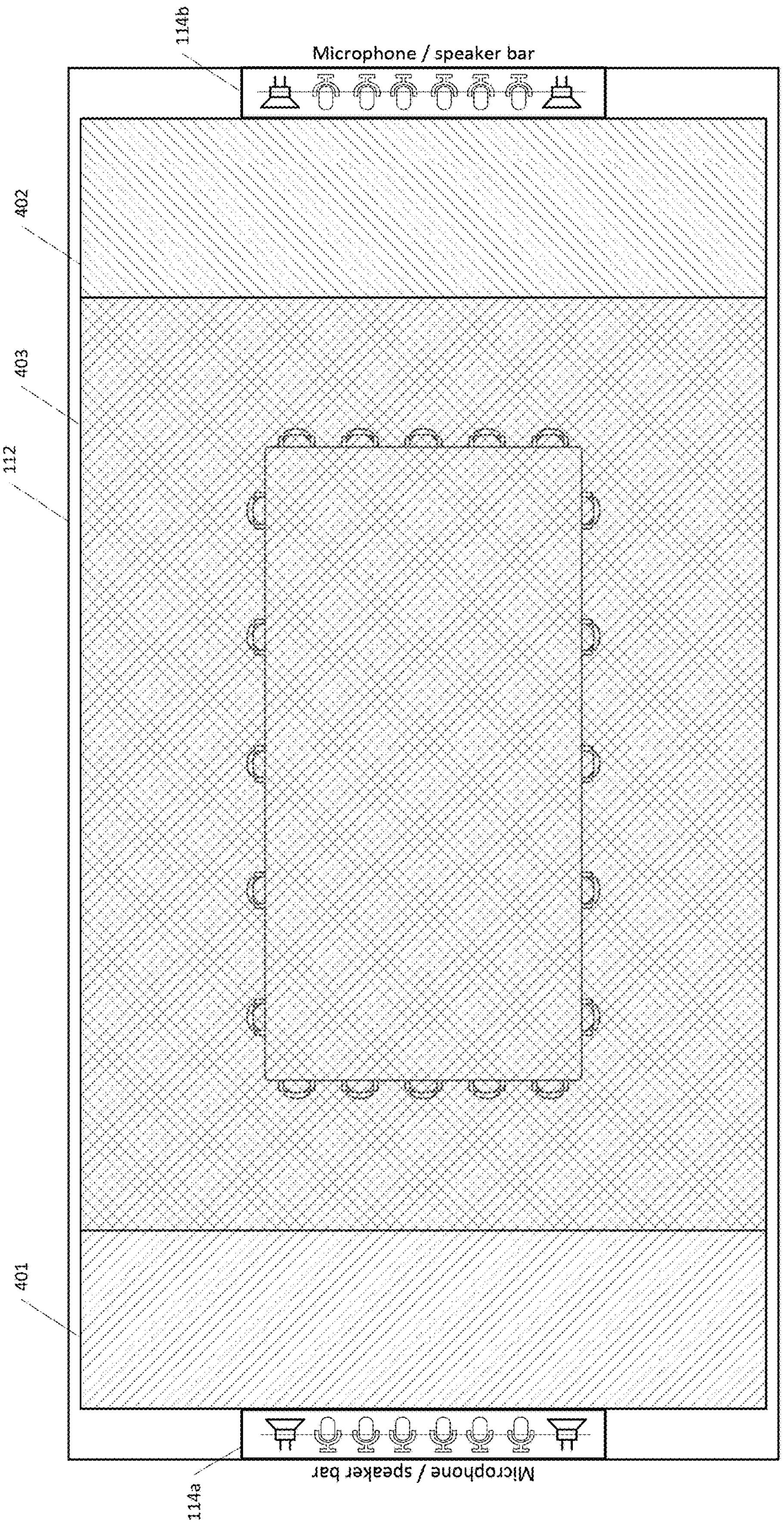
FIG. 4b Current Art – Array coverage patterns

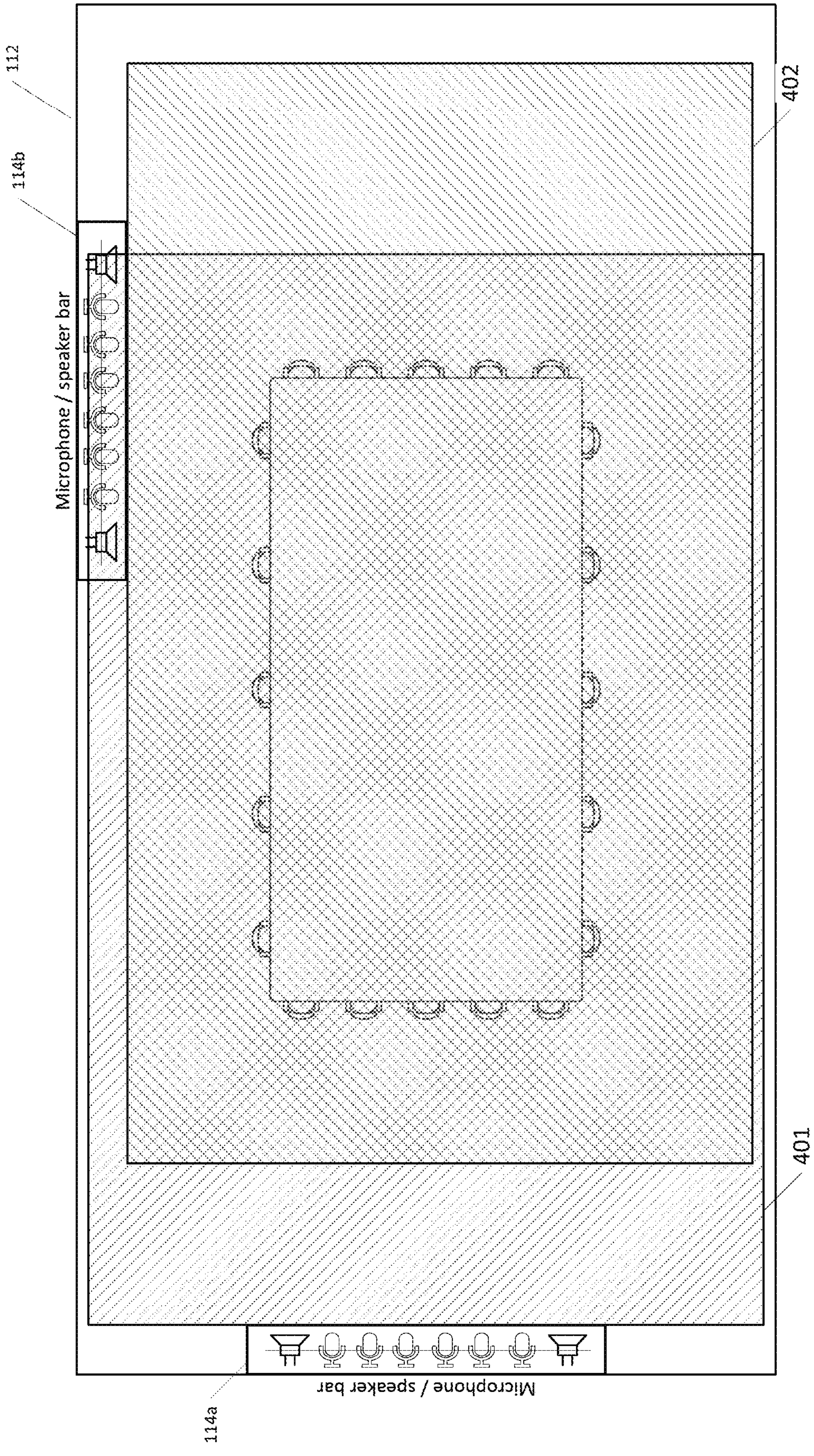
FIG. 4c Current Art – Array coverage patterns

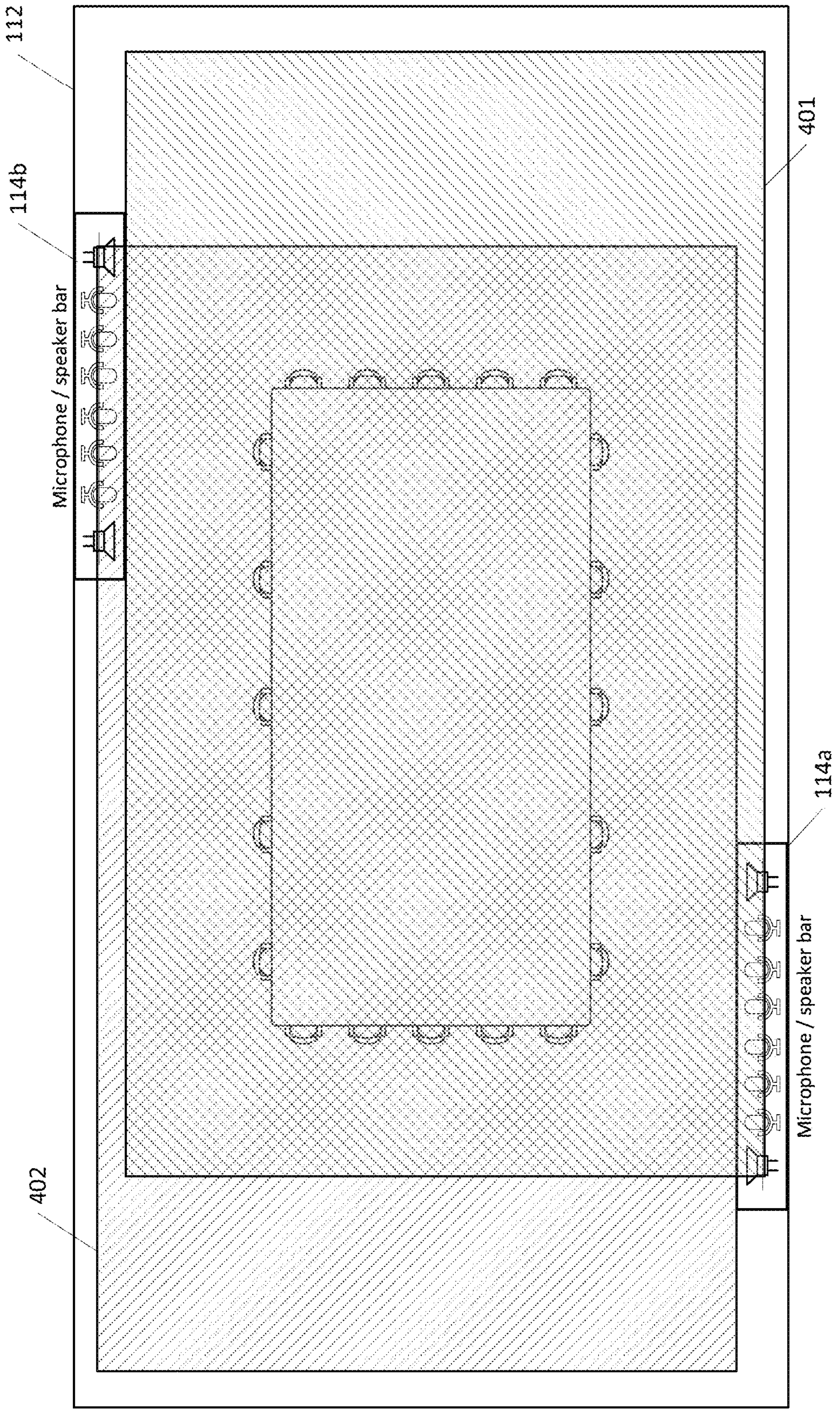
FIG. 4d Current Art – Array coverage patterns

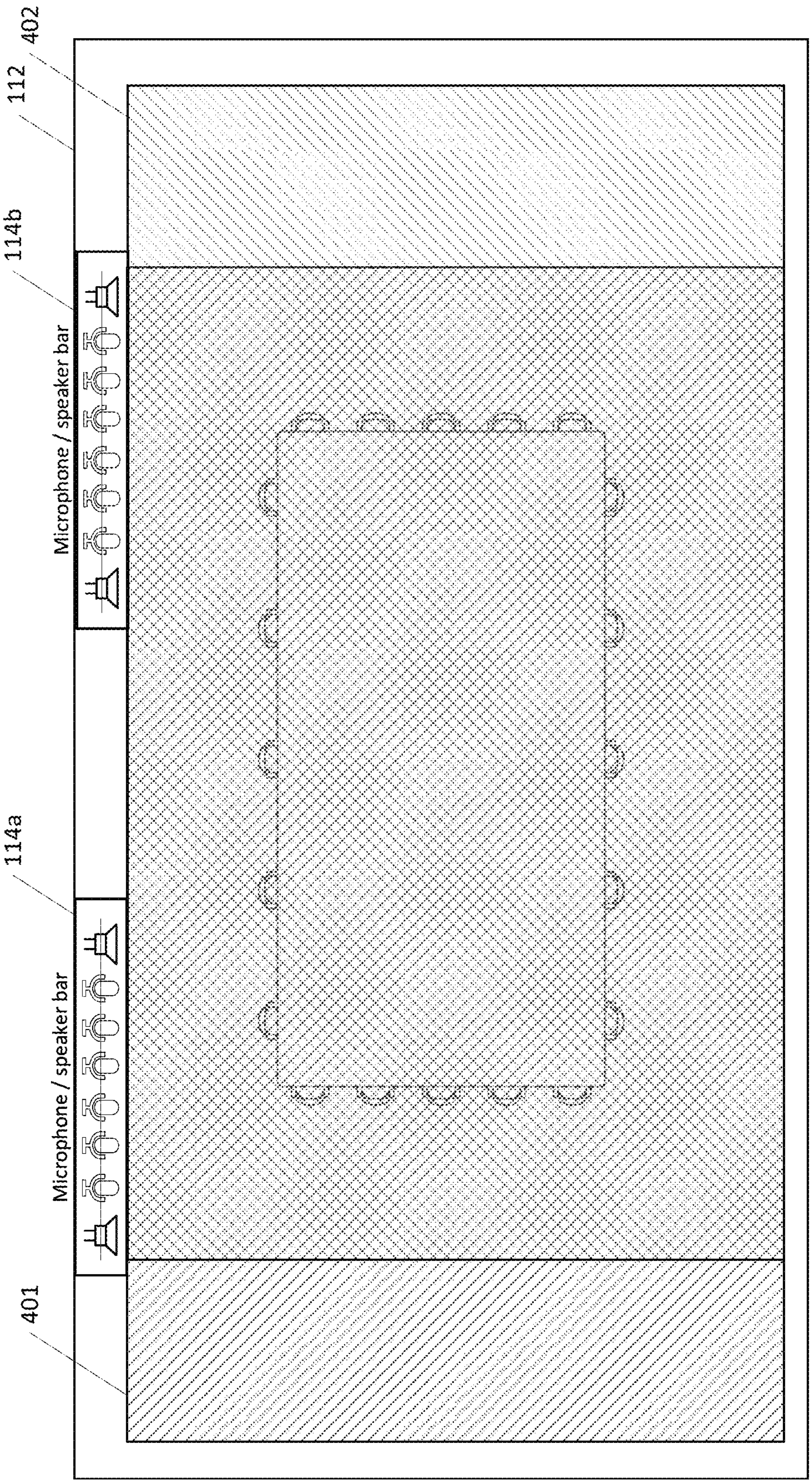
FIG. 4e Current Art – Array coverage patterns

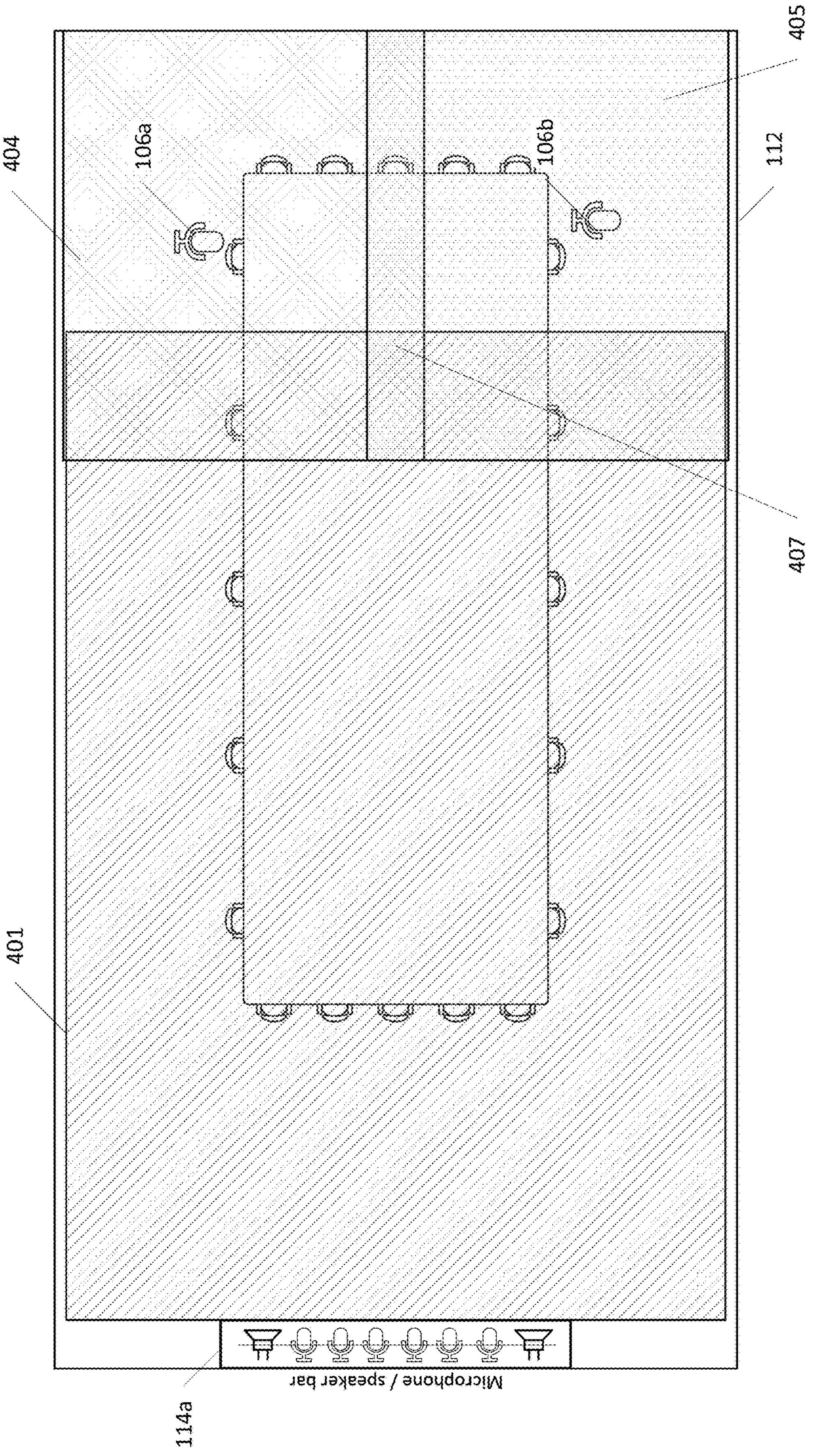
FIG. 4f Current Art – Array coverage patterns

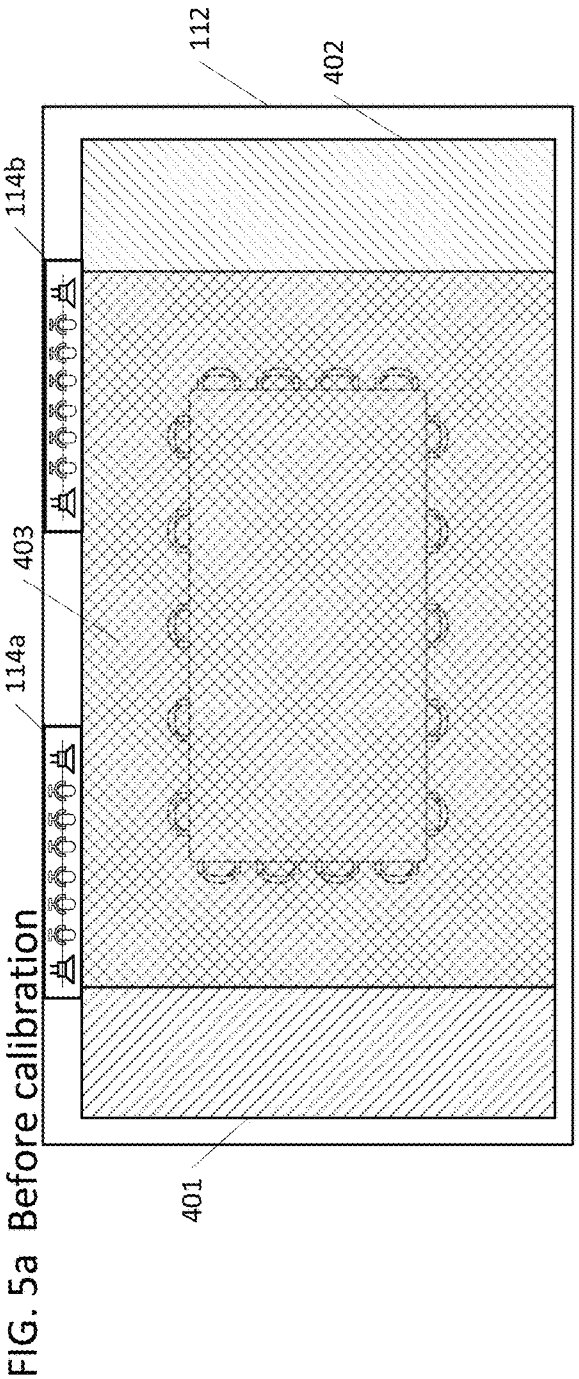
FIG. 5a Before calibration
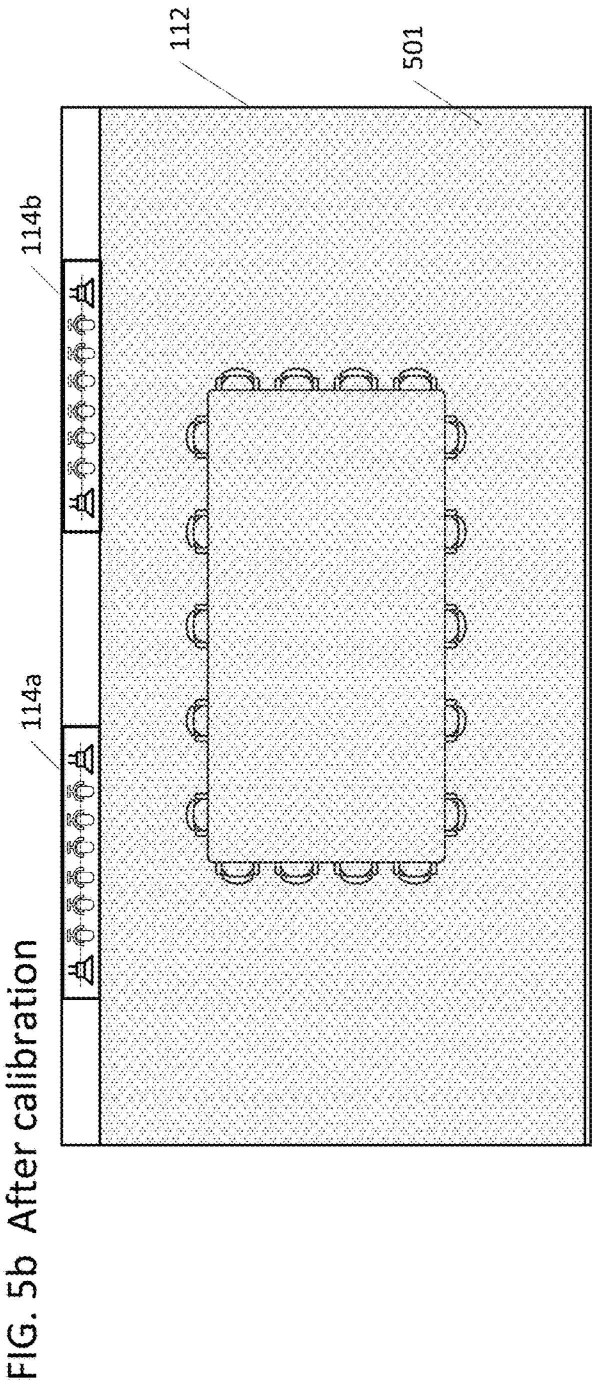
FIG. 5b After calibration

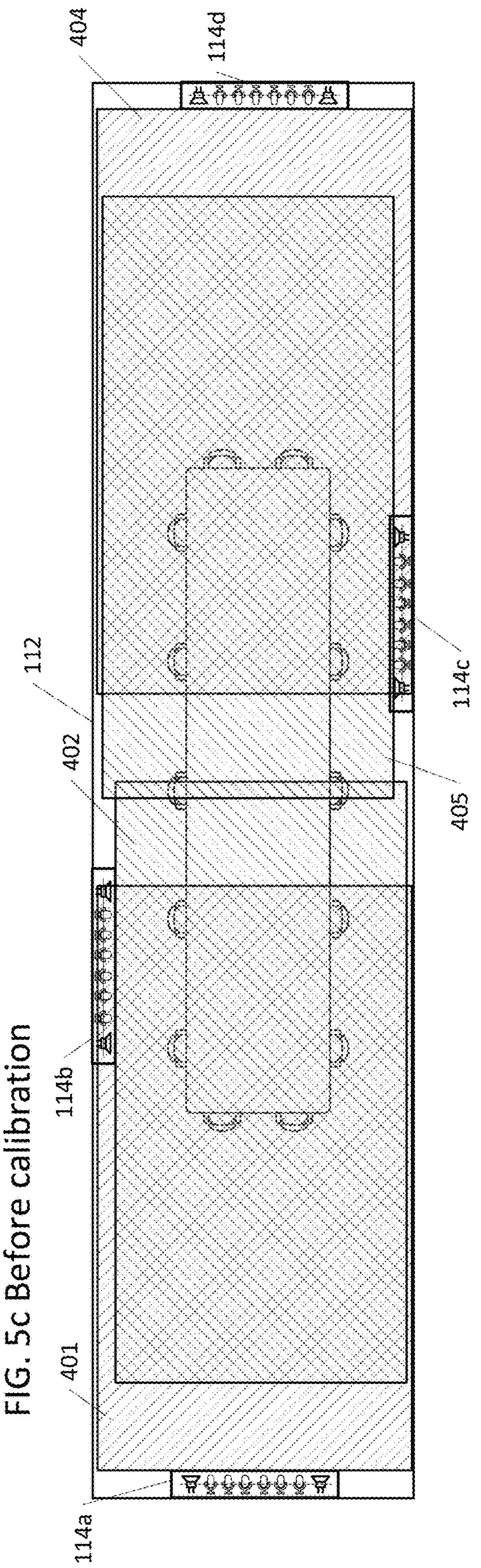
FIG. 5c Before calibration
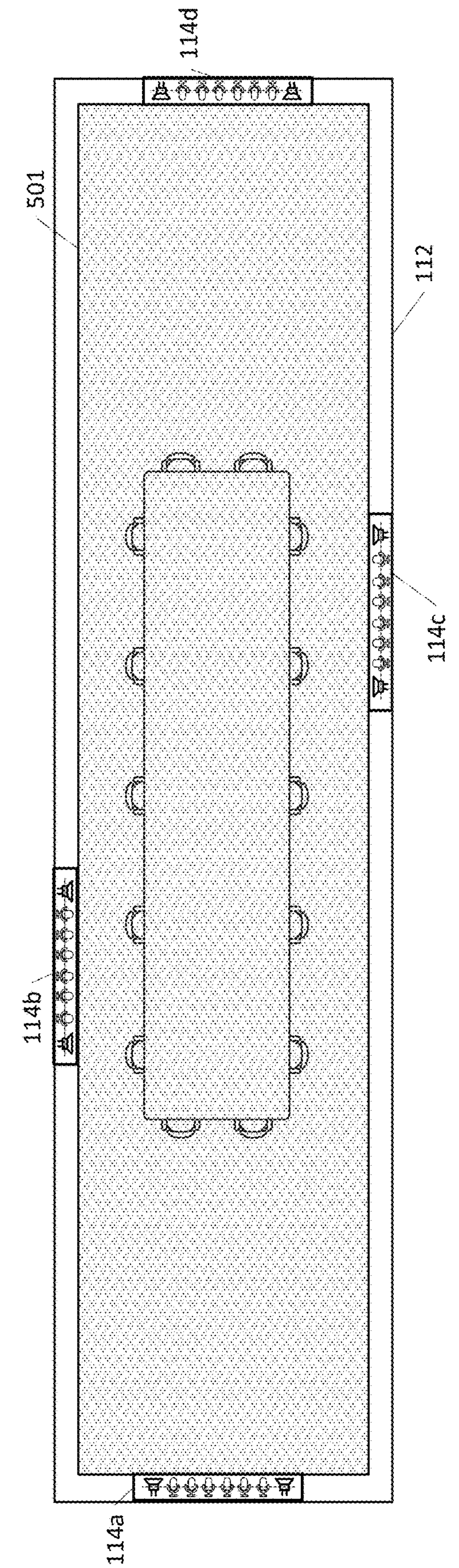
FIG. 5d After calibration

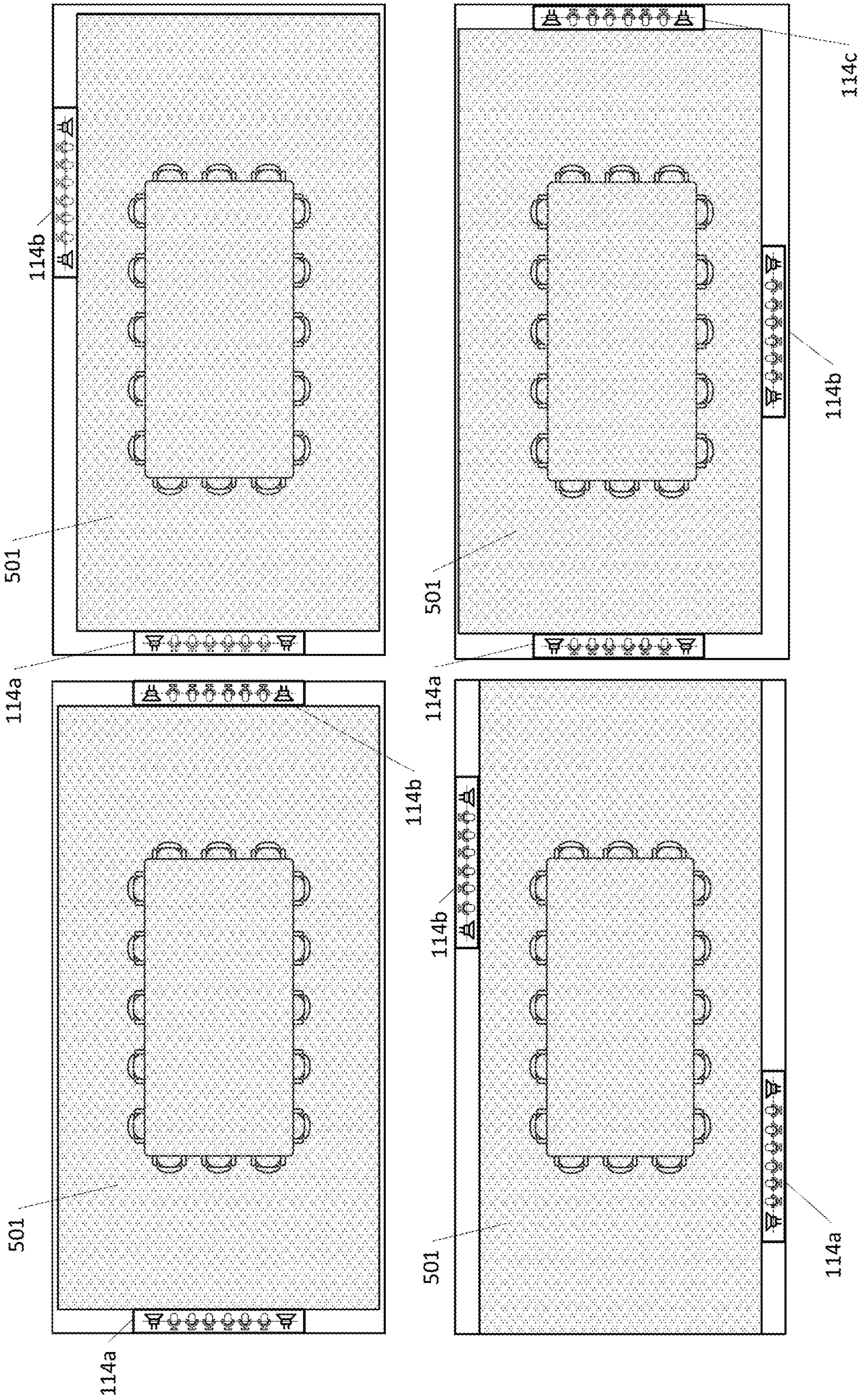
FIG. 5e – Build a single combined array

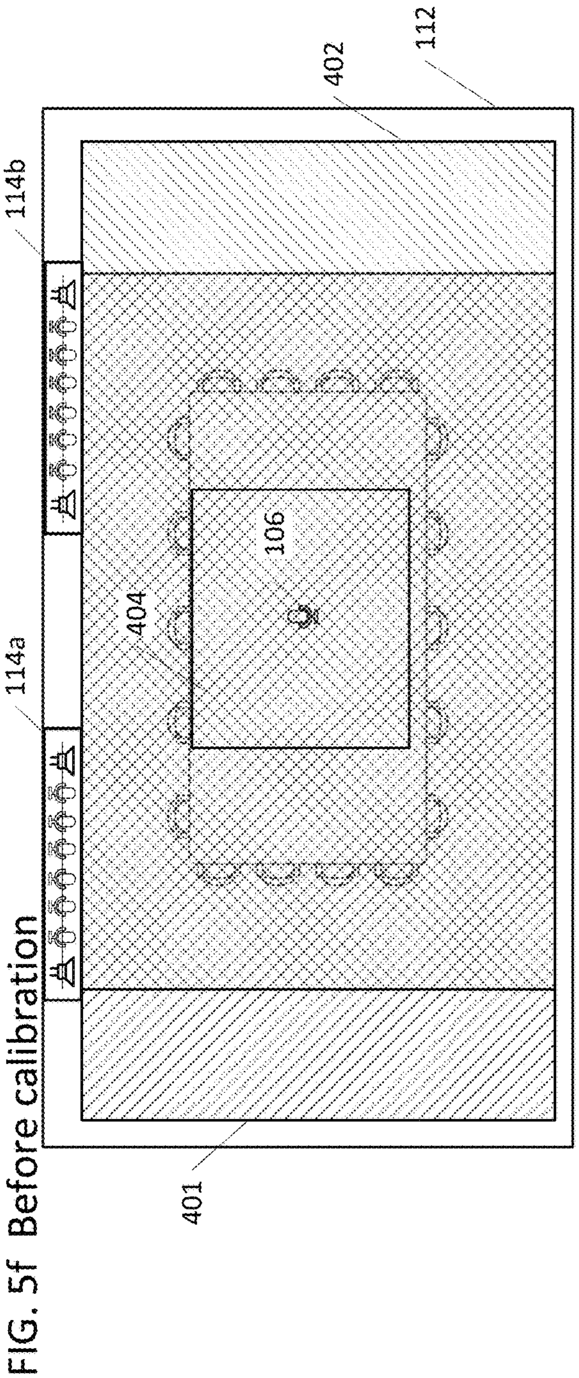
FIG. 5f Before calibration
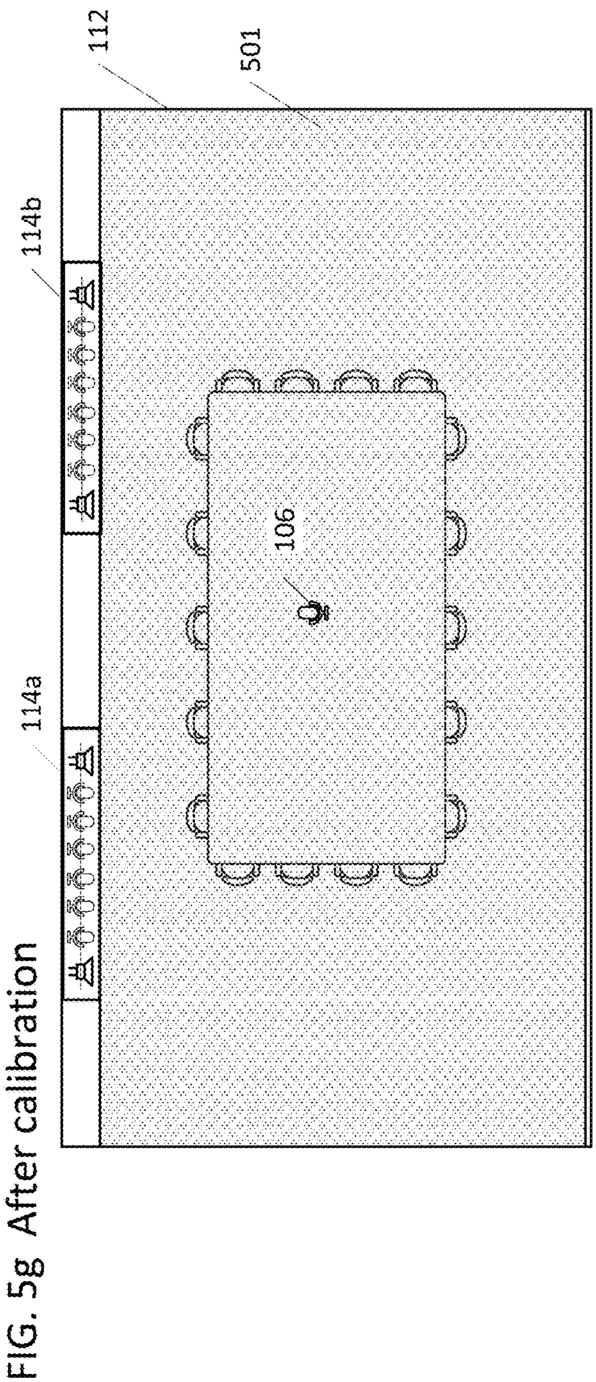
FIG. 5g After calibration

FIG. 6 Room Boundary Axis definitions
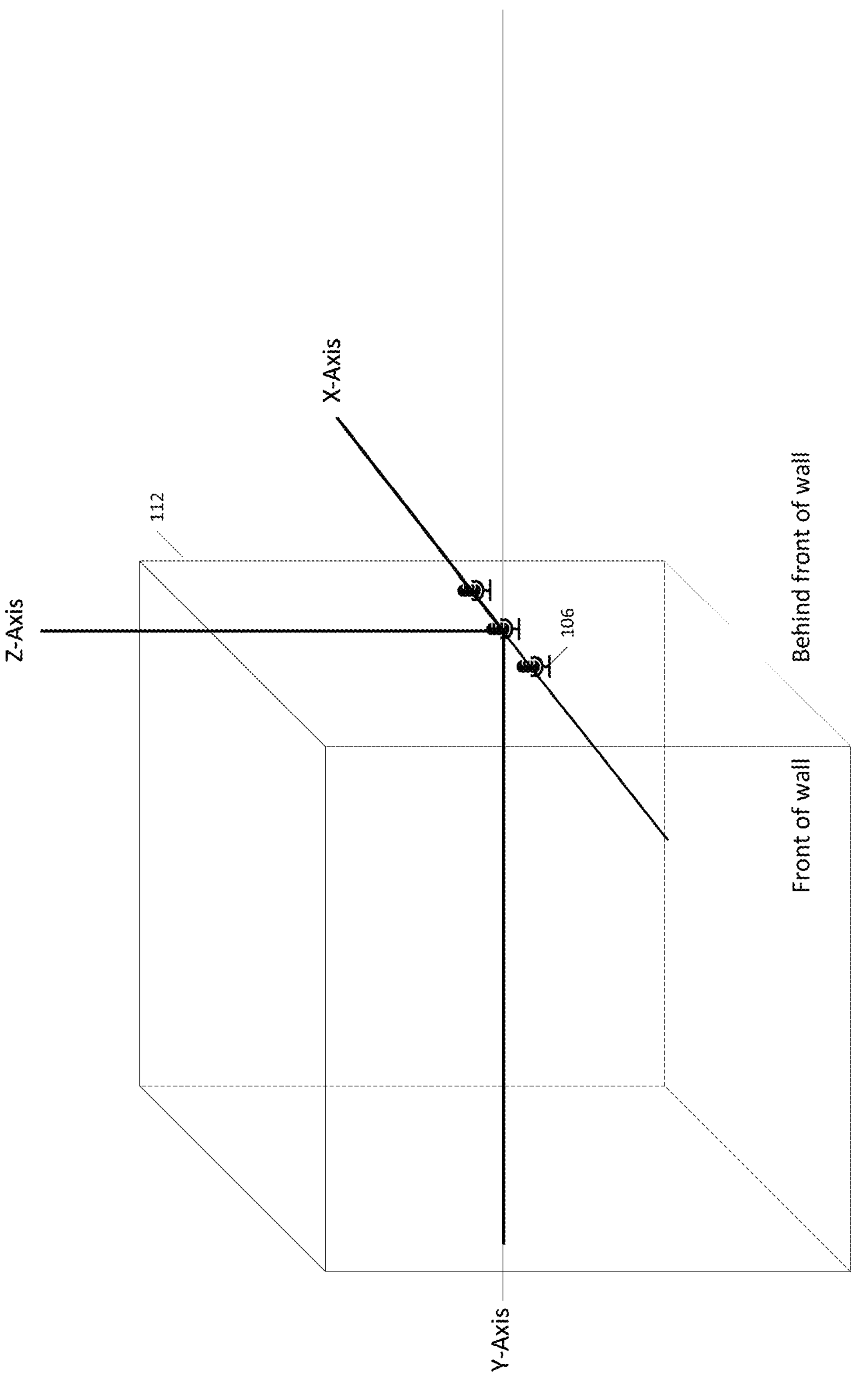

FIG. 7 Prior Art -Microphone Array and PBGC System Mapping
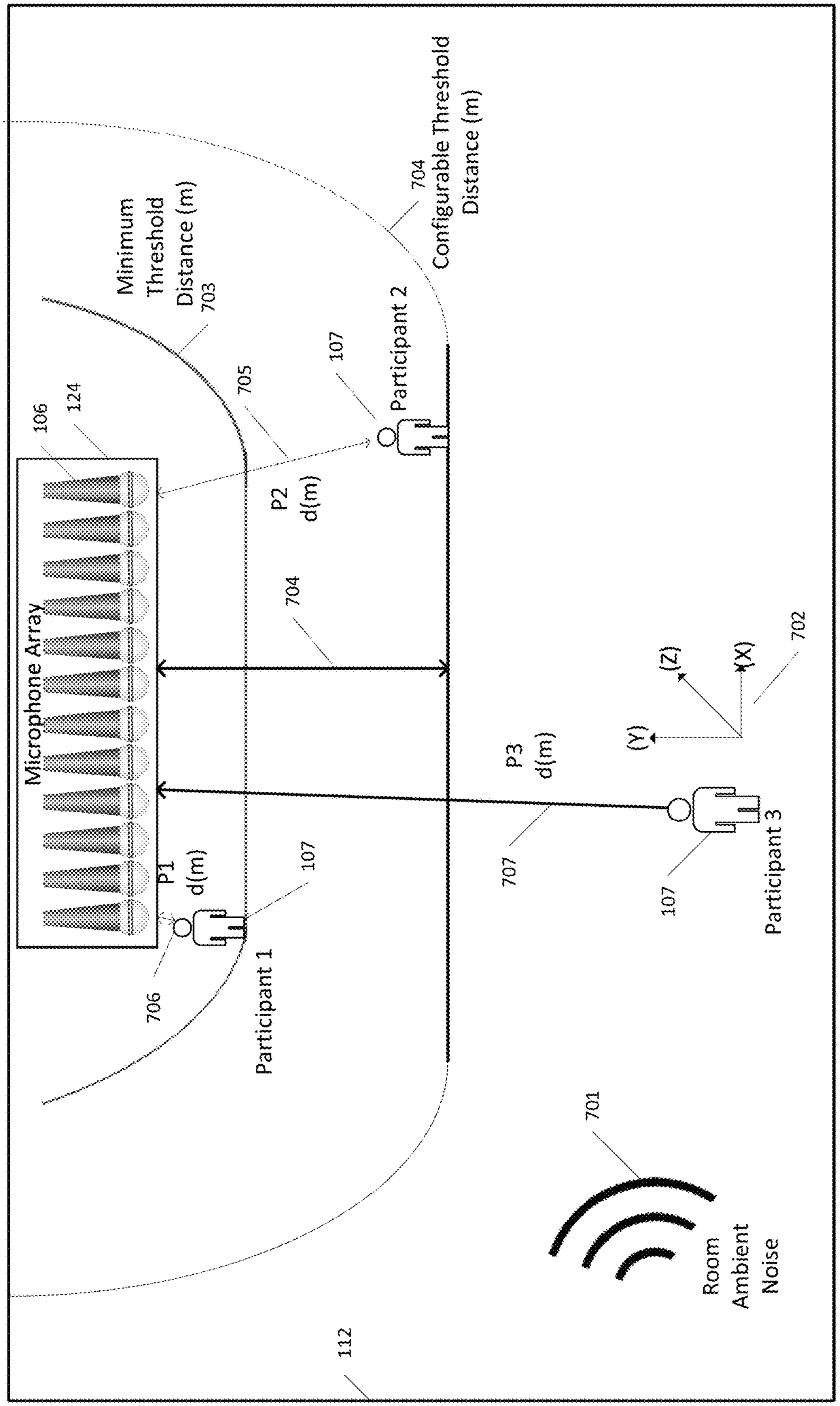

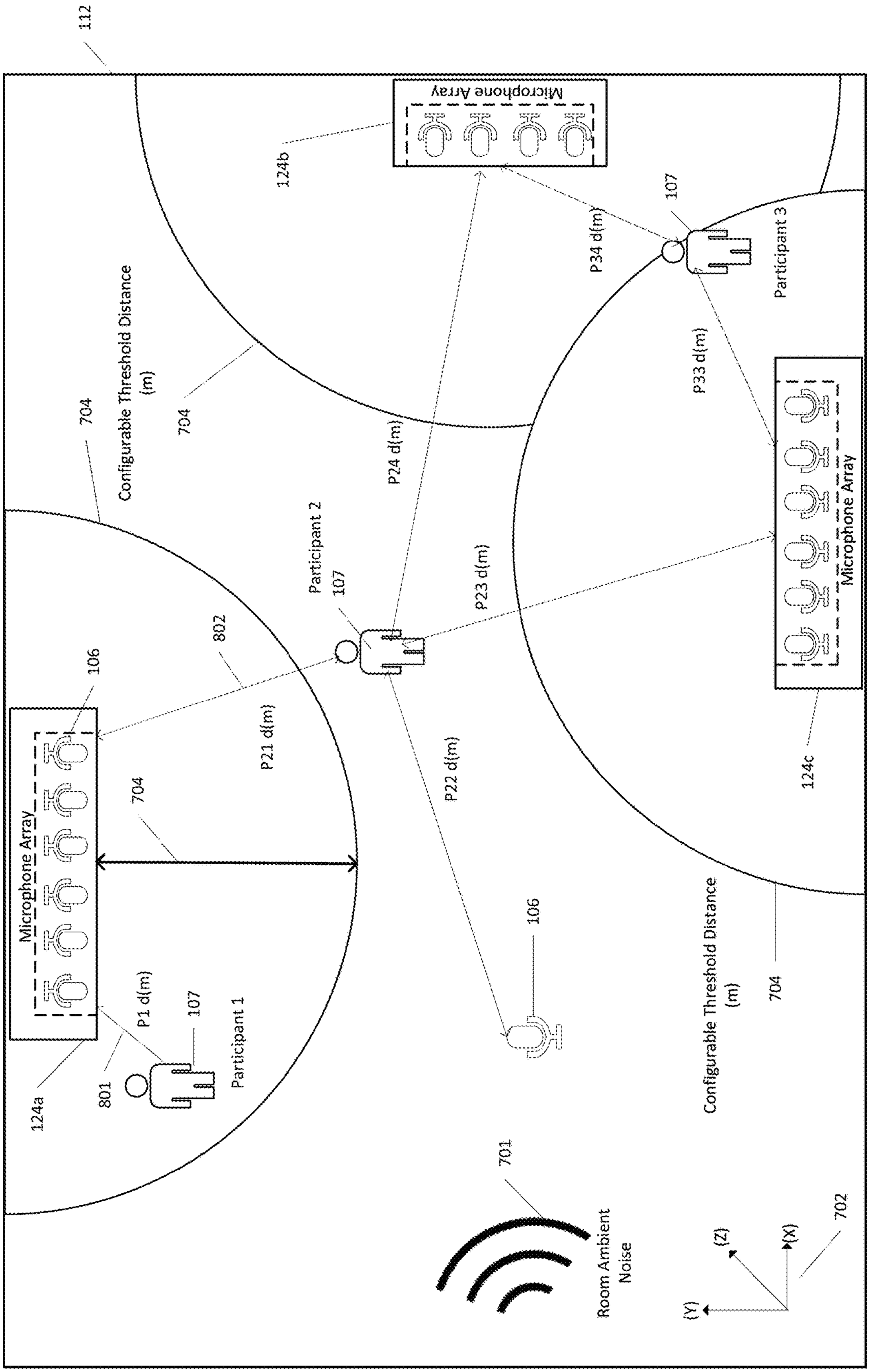
FIG. 8a Microphone Array and PBGC System Mapping Preferred Invention

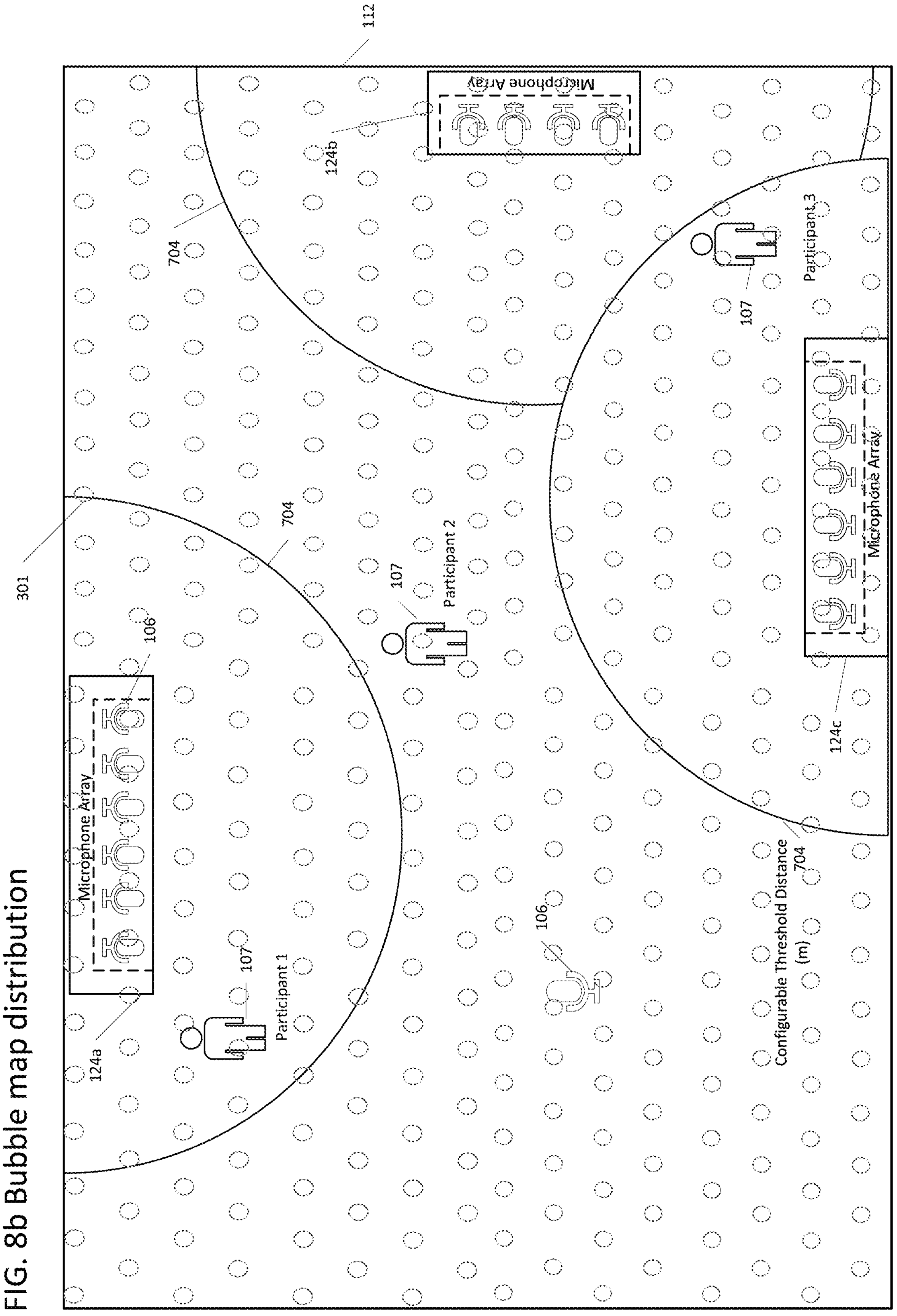
FIG. 8b Bubble map distribution

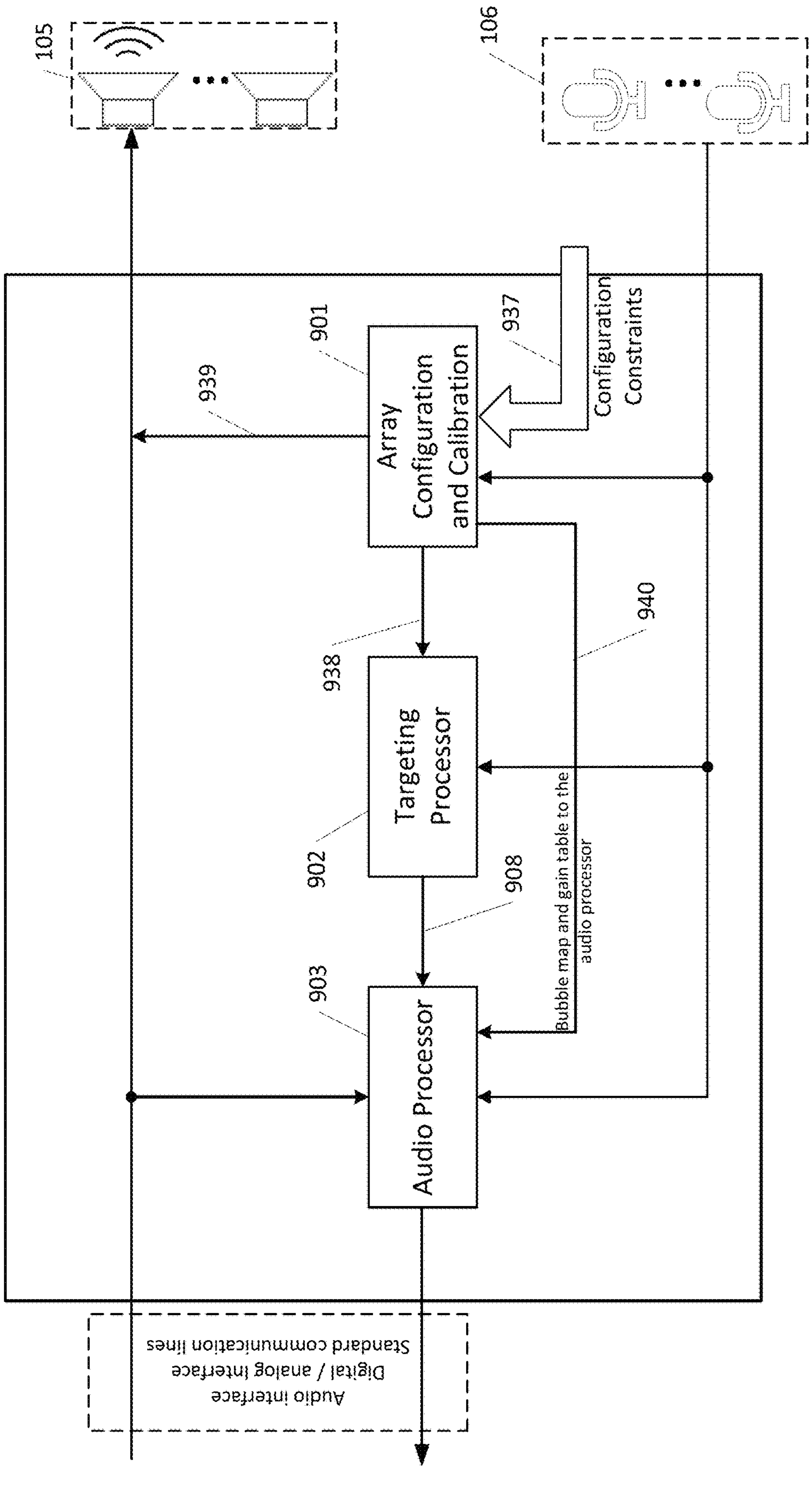
FIG. 9a Invention – Primary Processing Components – System Diagram

FIG. 9b (902) – Target Processor - System Diagram
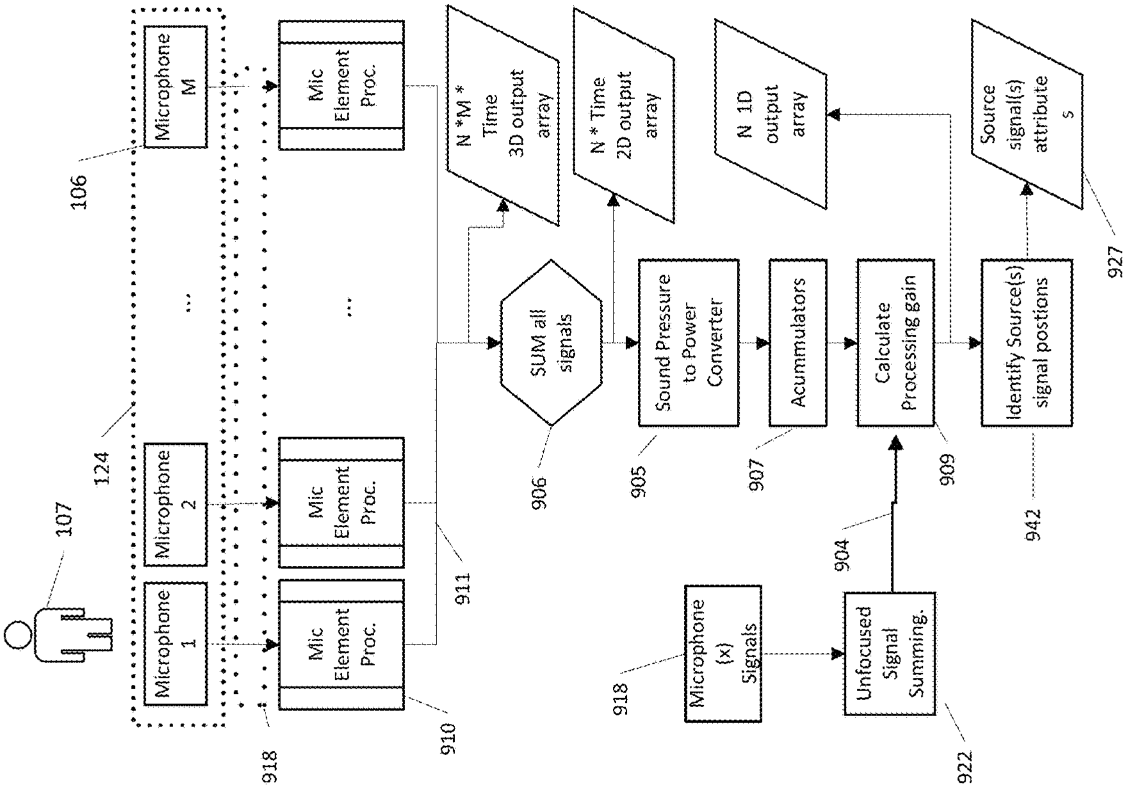
FIG. 9c (910)
Mic Element Processor
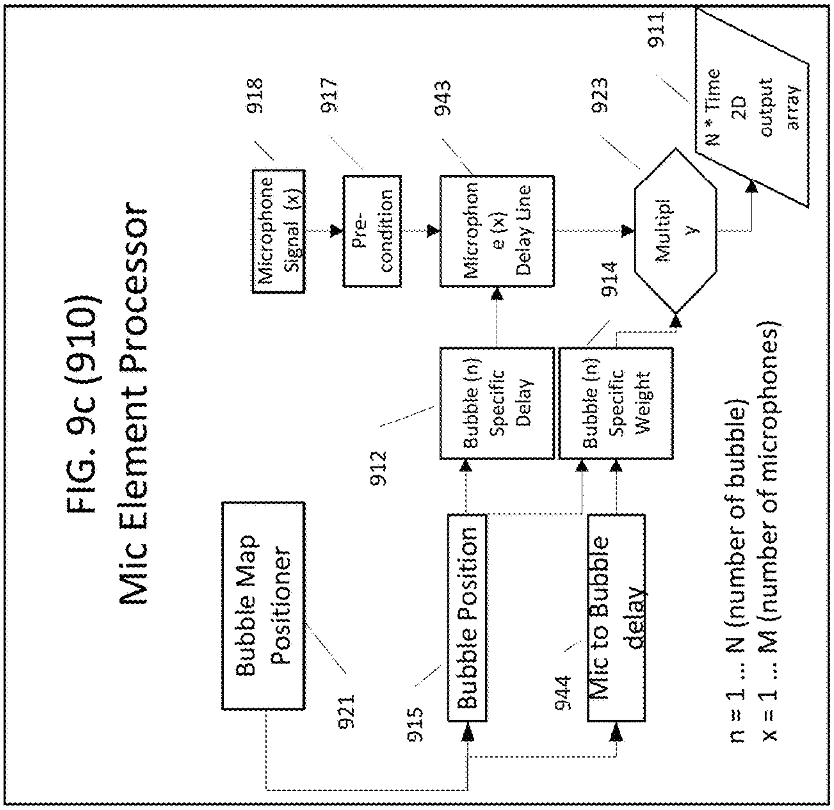

FIG. 9d Invention – Array configuration and calibration Sub-system
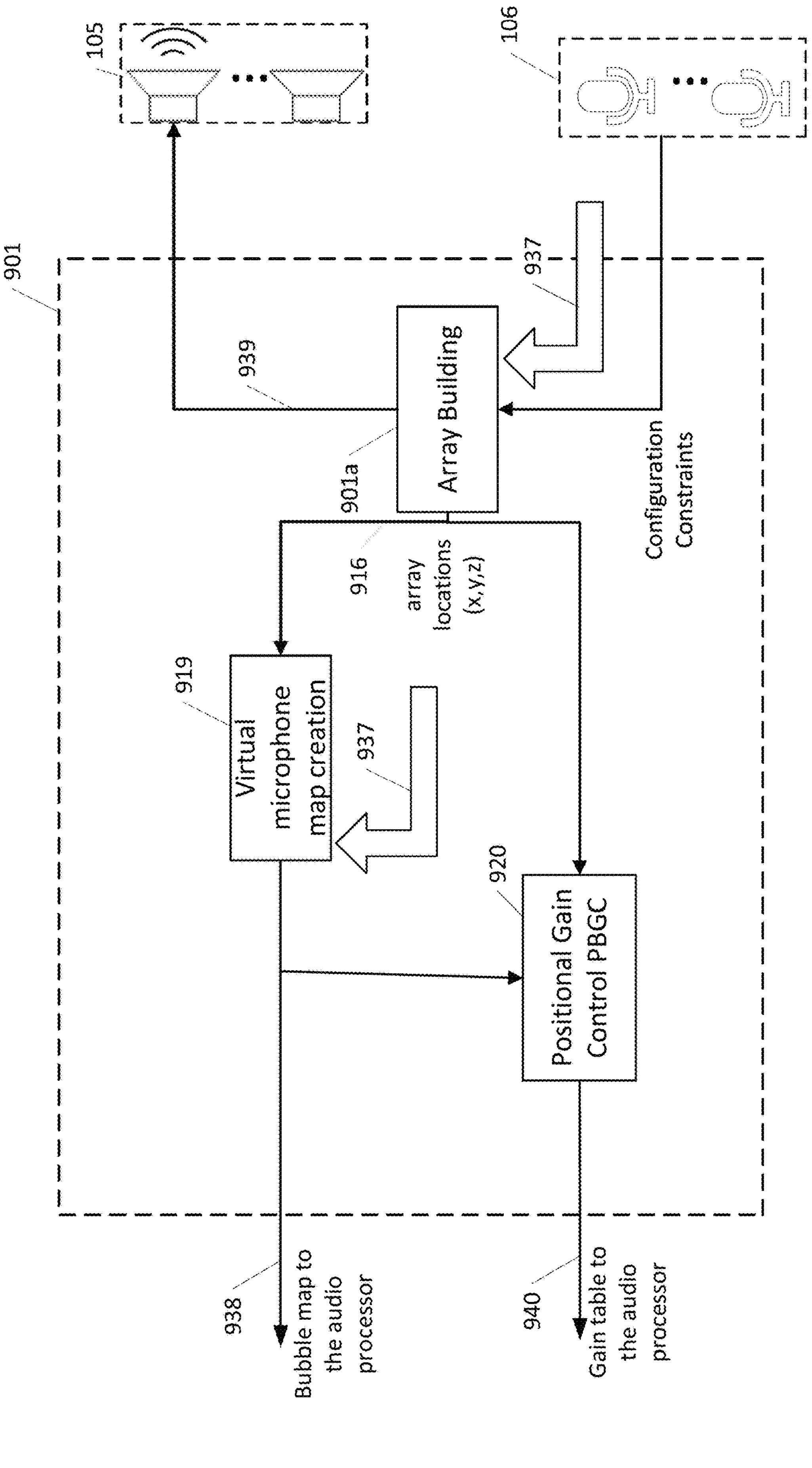

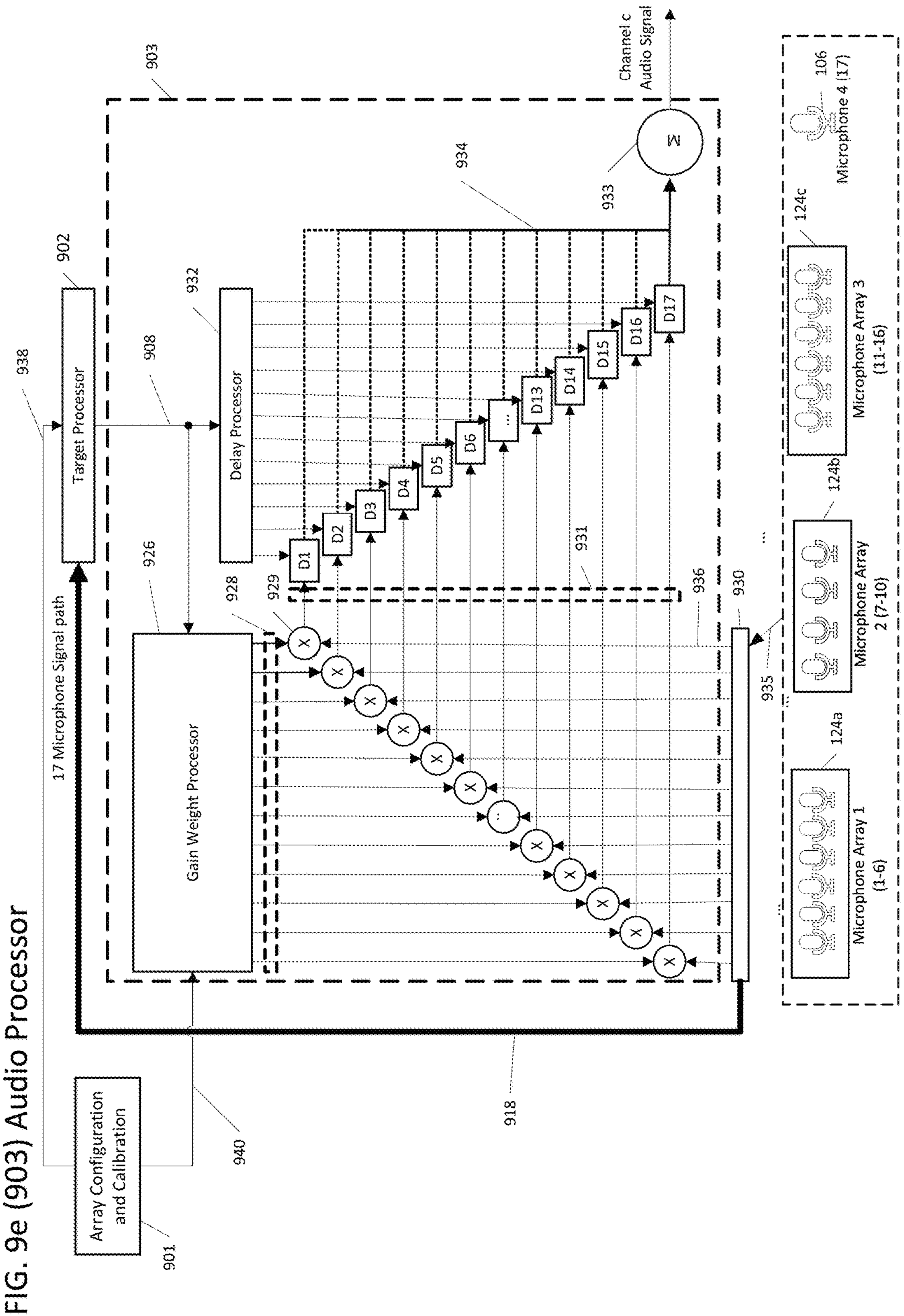
FIG. 9e (903) Audio Processor

FIG. 10a PGC algorithm main flowchart
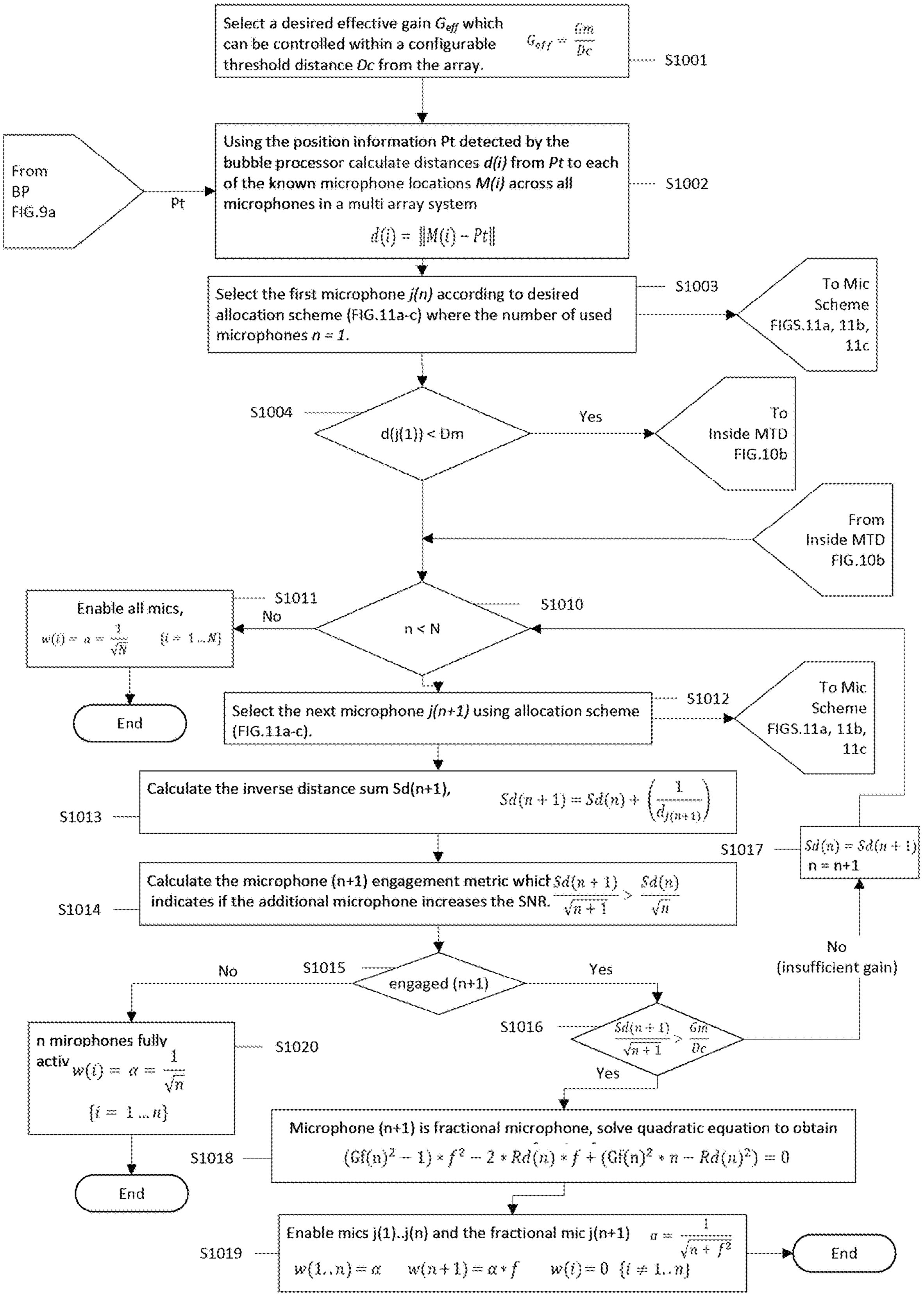

FIG.10b PGC algorithm in the single microphone zone (MTD)
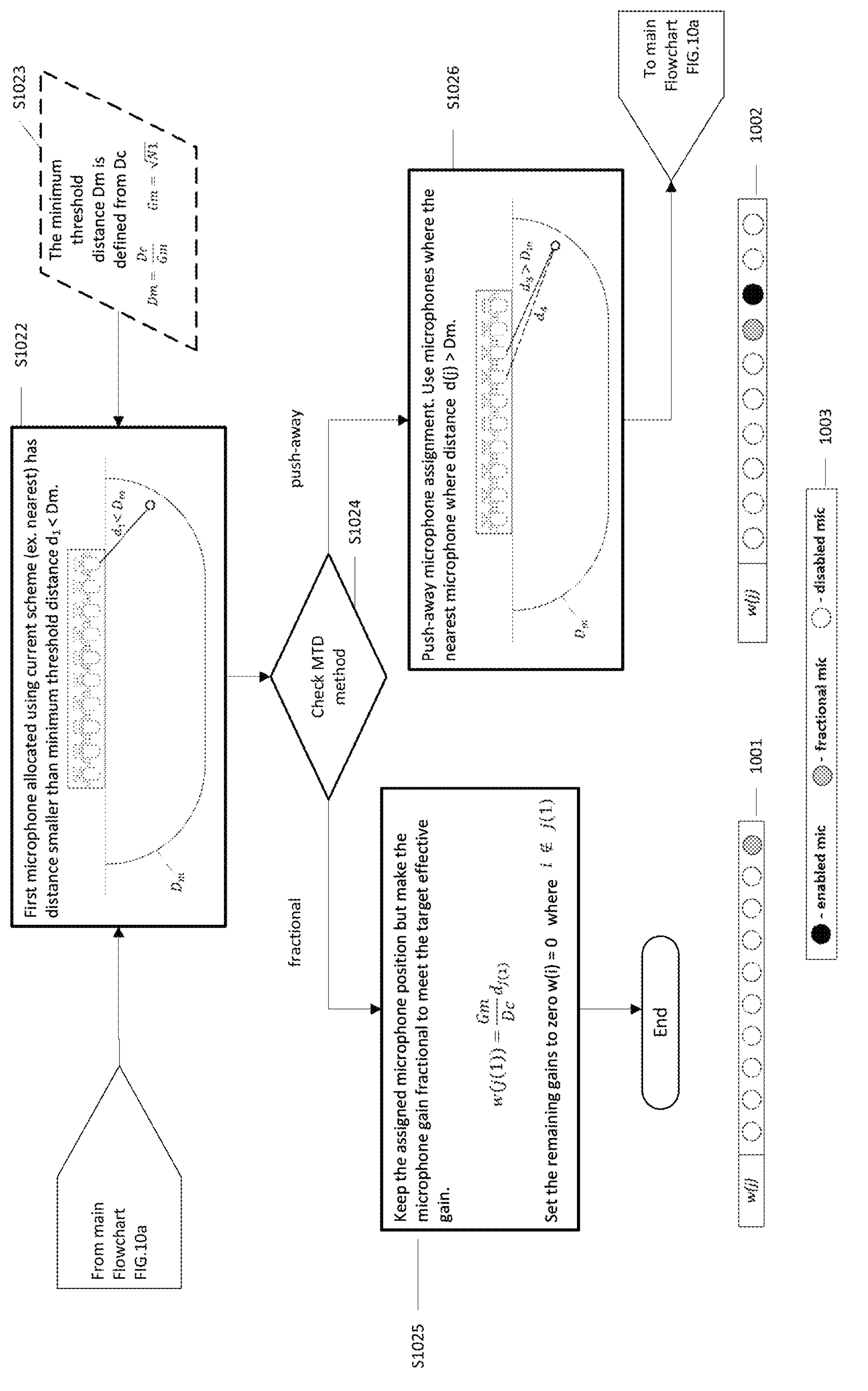

FIG. 11a, Microphone allocation scheme: center-based
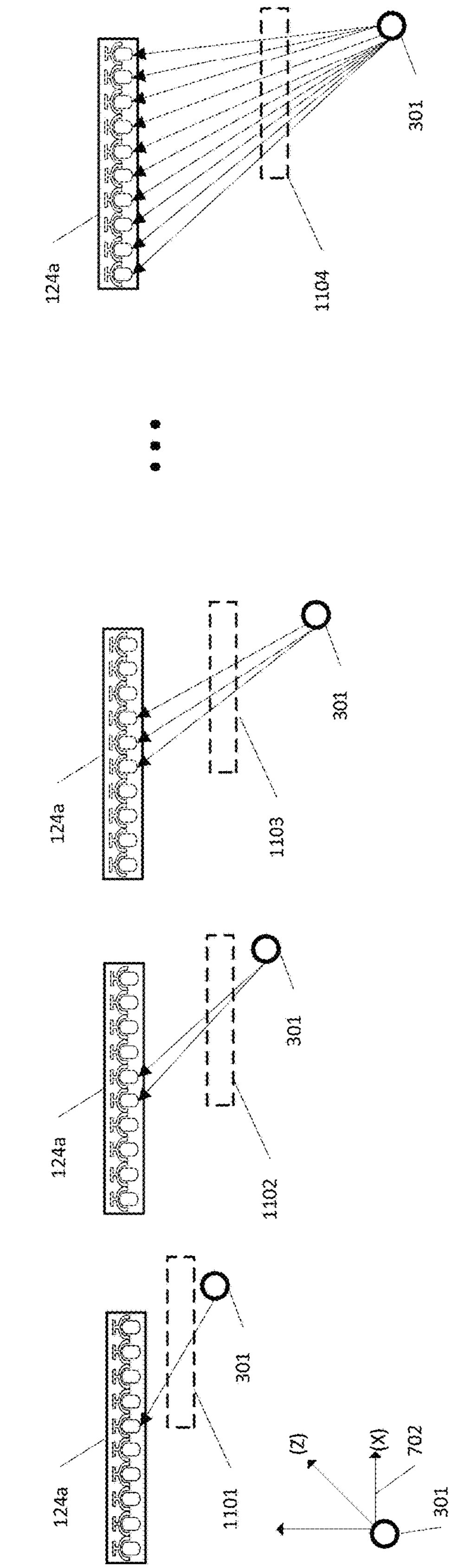
FIG. 11b, Microphone allocation scheme: nearest
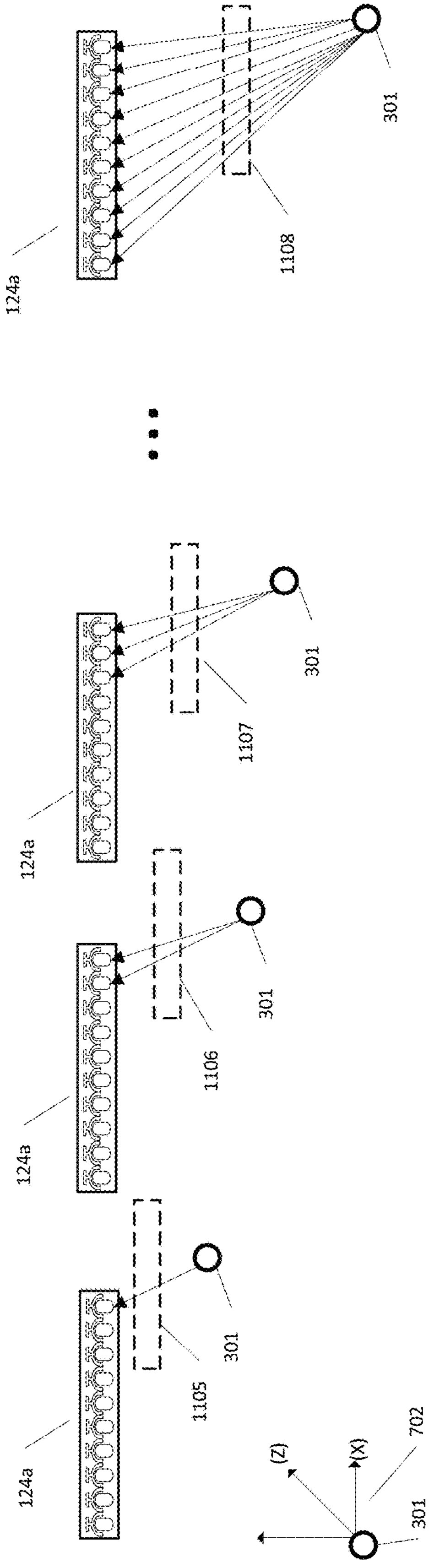

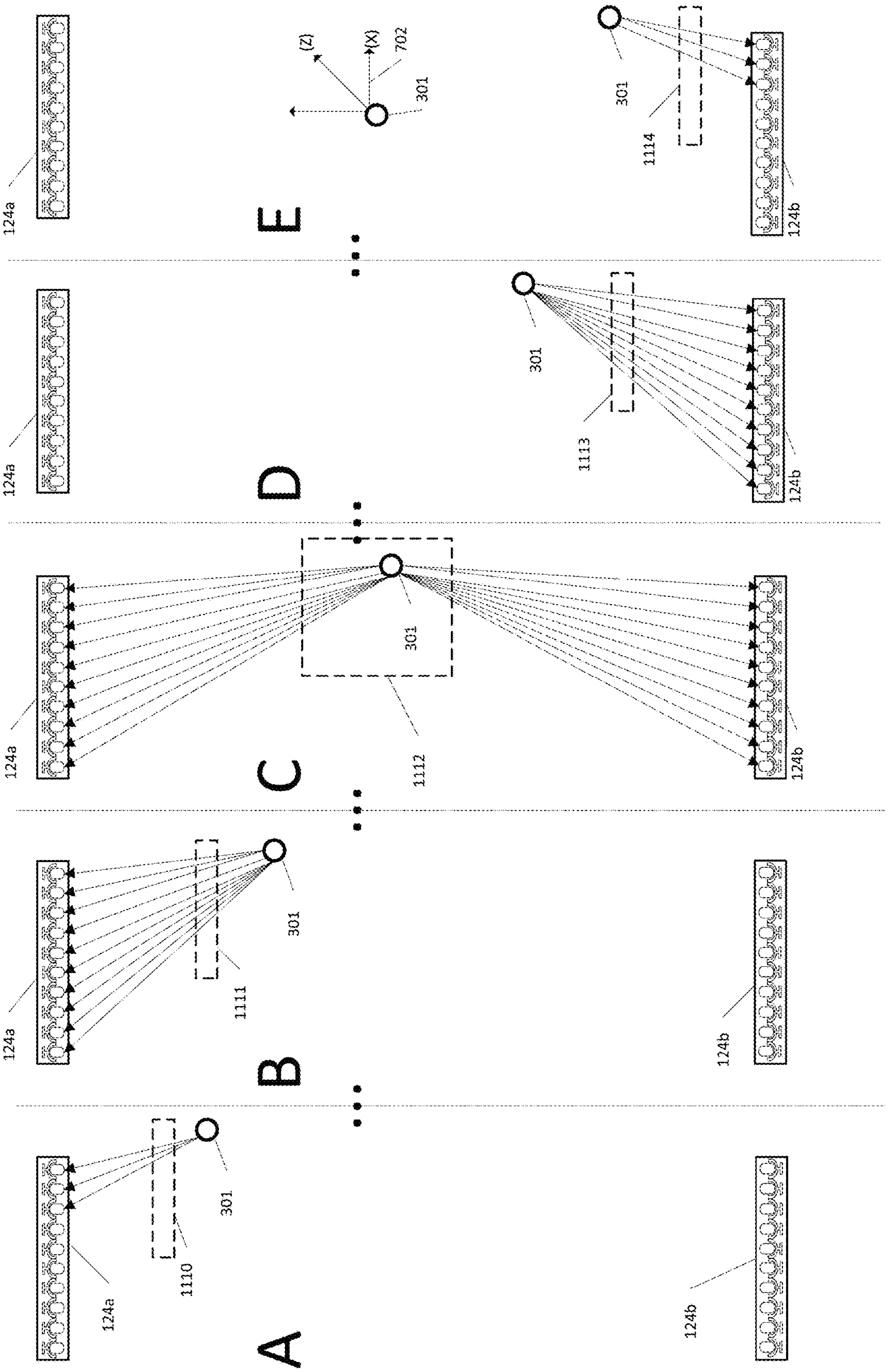
FIG. 11c, Microphone allocation scheme: nearest (multi array example)

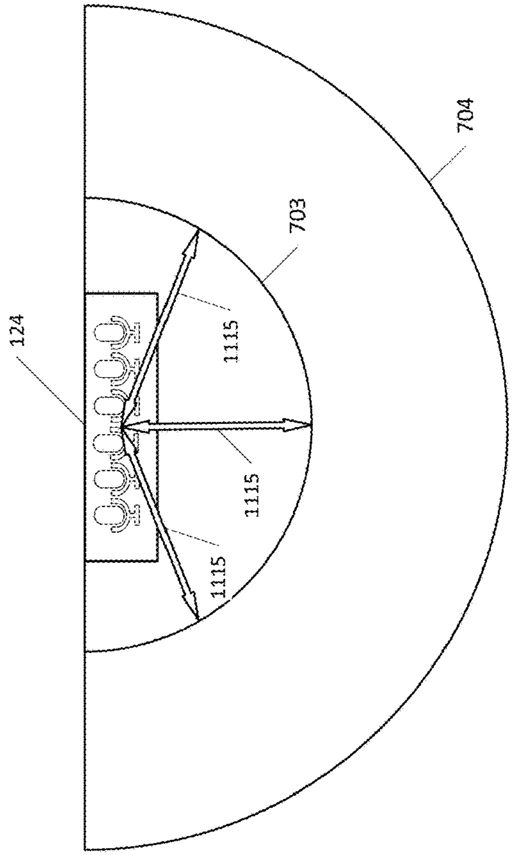
FIG. 11d, Common gain region for centre-based mic allocation scheme
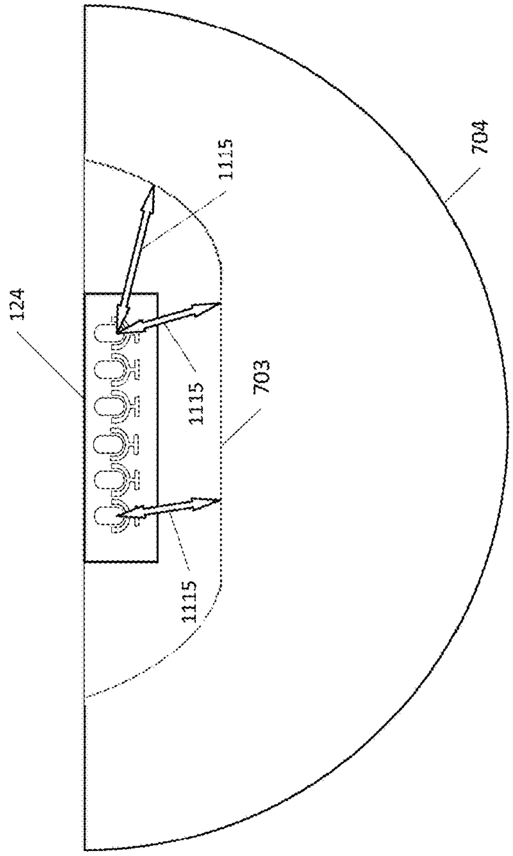
FIG. 11e, Common gain region for near-based mic allocation scheme FIG.12a PGC Microphone Activation Regions – Virtual Microphone Overlay
1202
| Microphone array locations | | | |
|---|---|---|---|
| | X (meters) | Y (meters) | Angle |
| Array -1 | 0 | 0 | 0 |
| Array -2 | 2 | 4.5 | 180 |
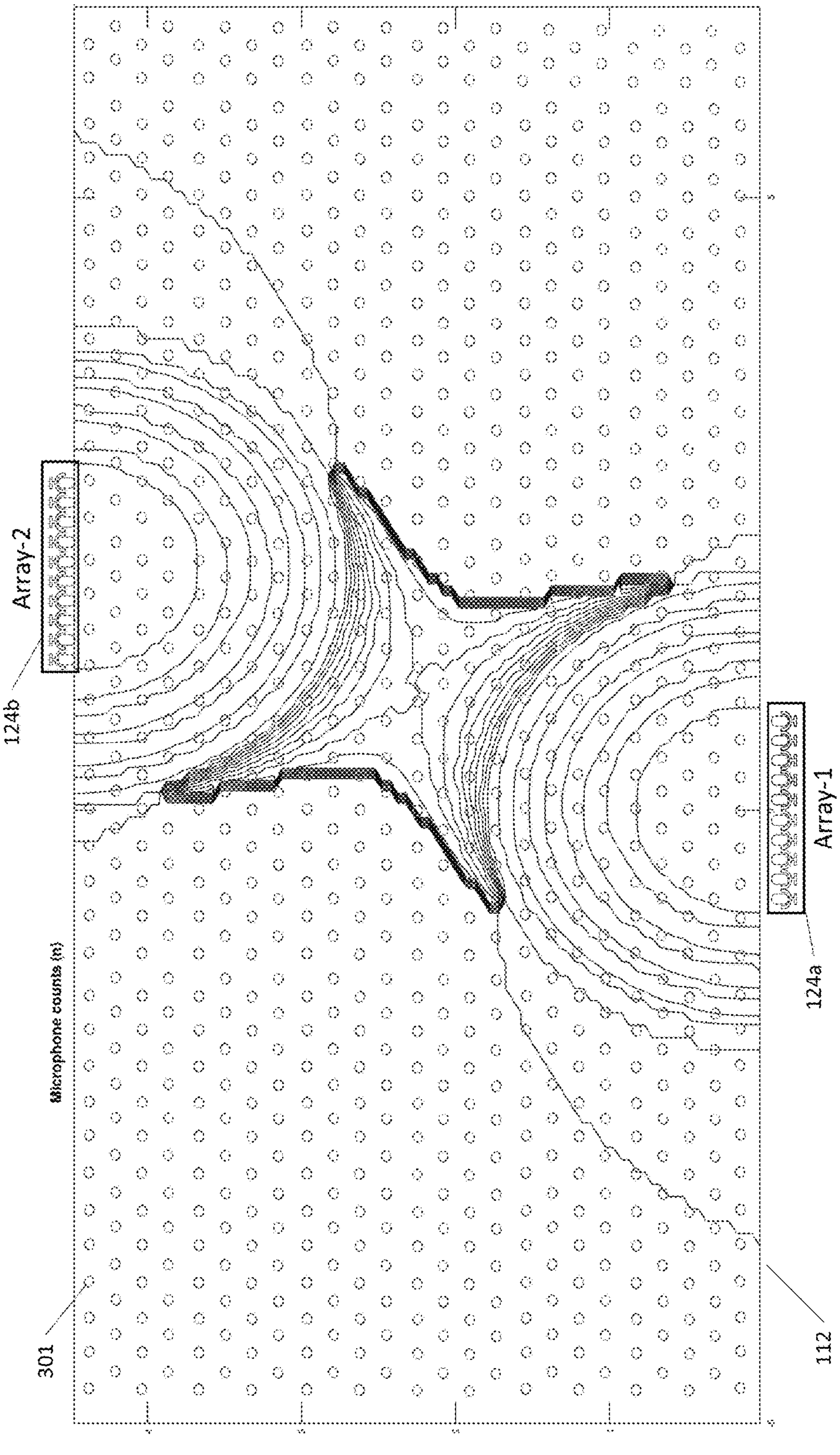

FIG. 12b Arrays On Opposite Walls - Microphone Activation Regions
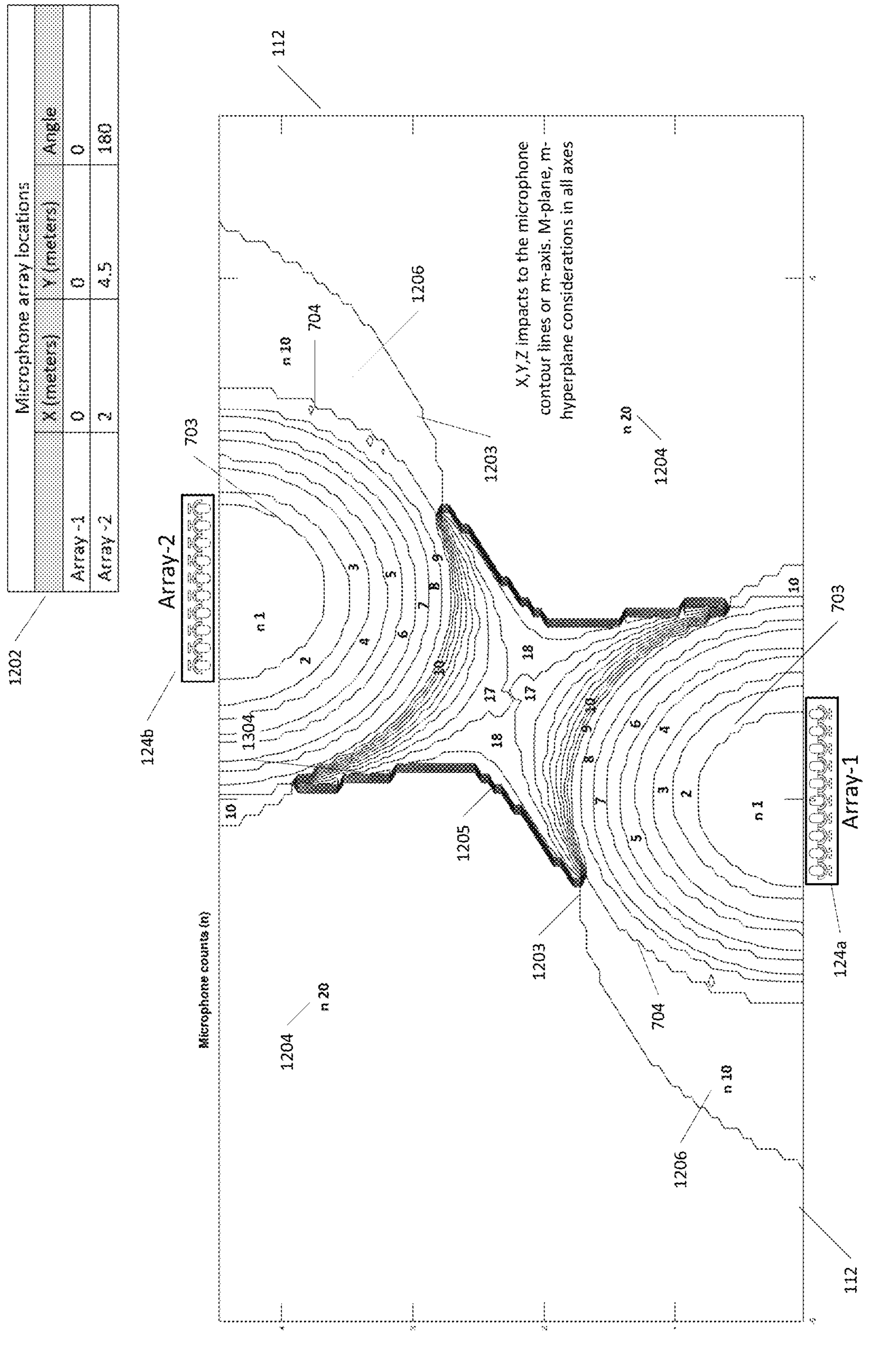
| Microphone array locations | | | |
|---|---|---|---|
| | X (meters) | Y (meters) | Angle |
| Array -1 | 0 | 0 | 0 |
| Array -2 | 2 | 4.5 | 180 |

FIG. 12c Arrays On Opposite Walls - Effective Gain Contours
1202
| Microphone array locations | | | |
|---|---|---|---|
| | X (meters) | Y (meters) | Angle |
| Array -1 | 0 | 0 | 0 |
| Array -2 | 2 | 4.5 | 180 |
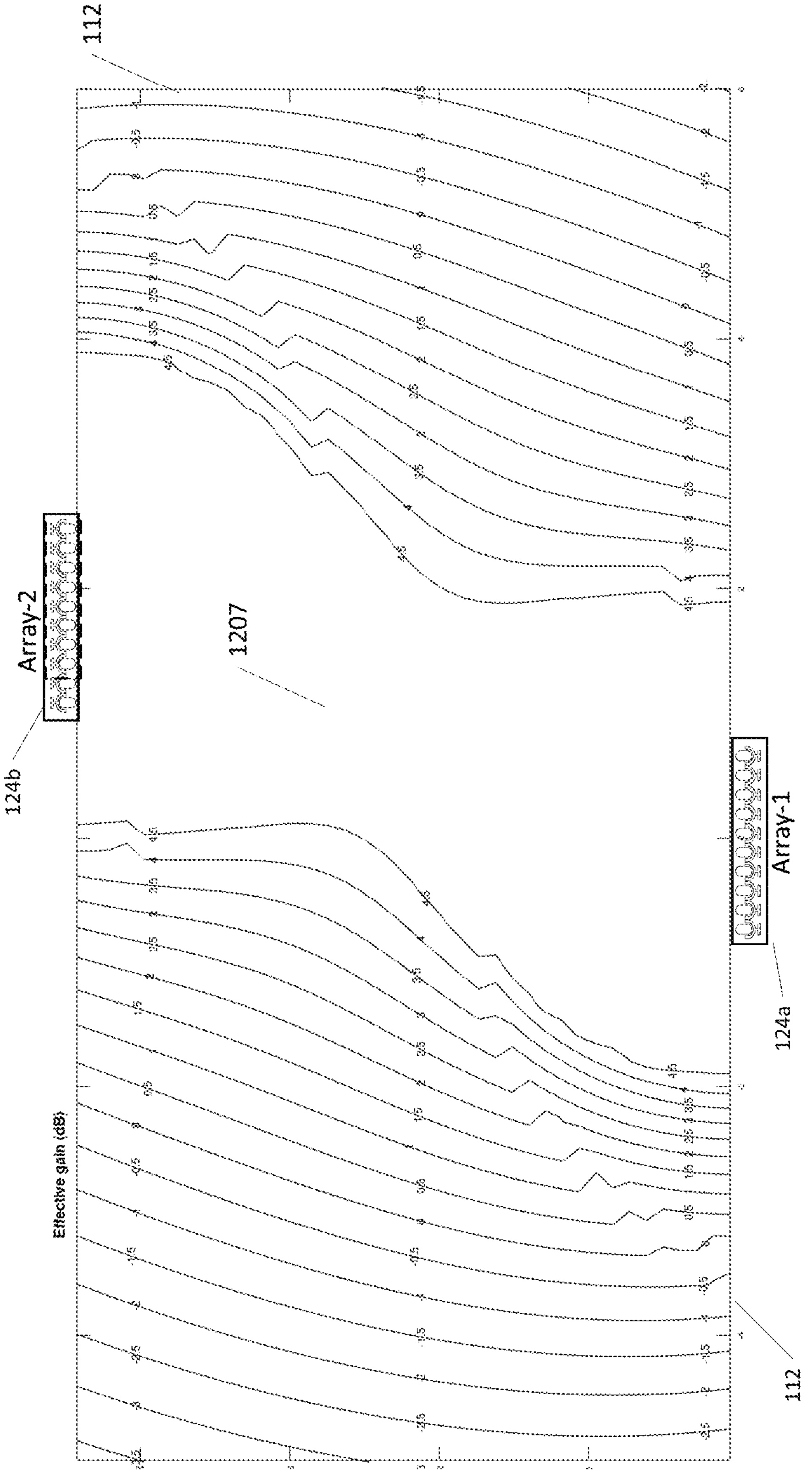

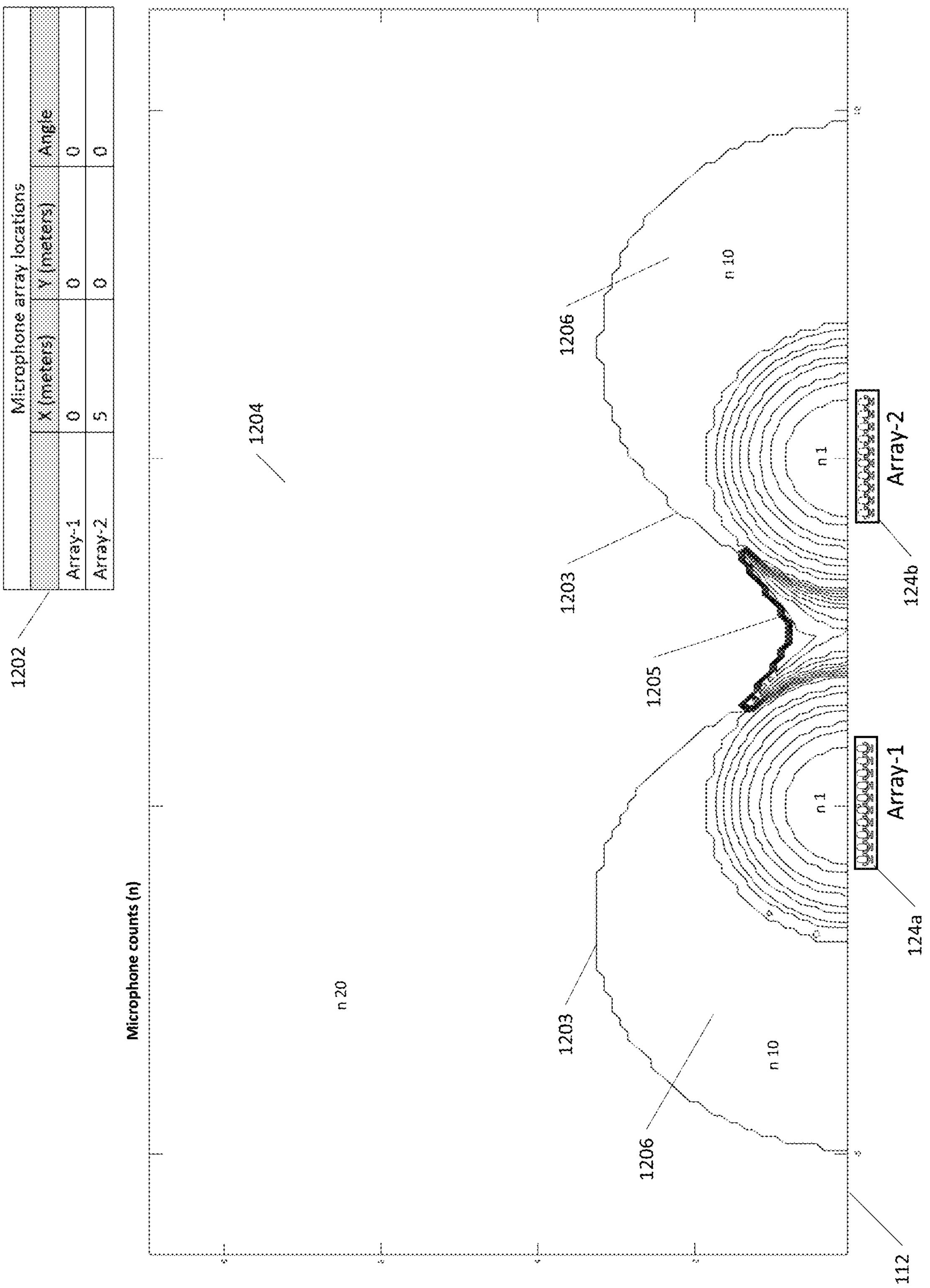
Fig 12d Same Wall Configuration

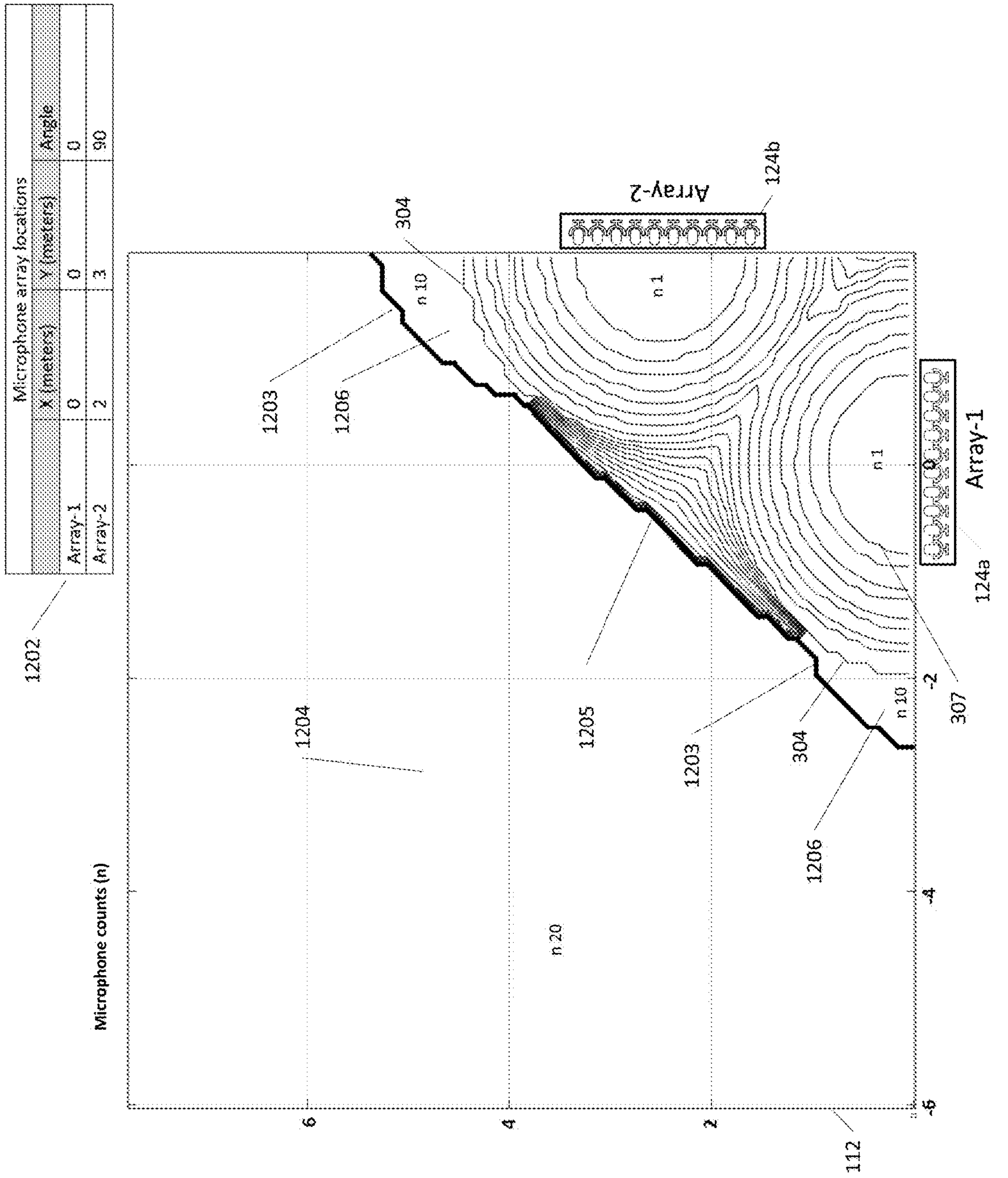
FIG. 12e Small Array Separation

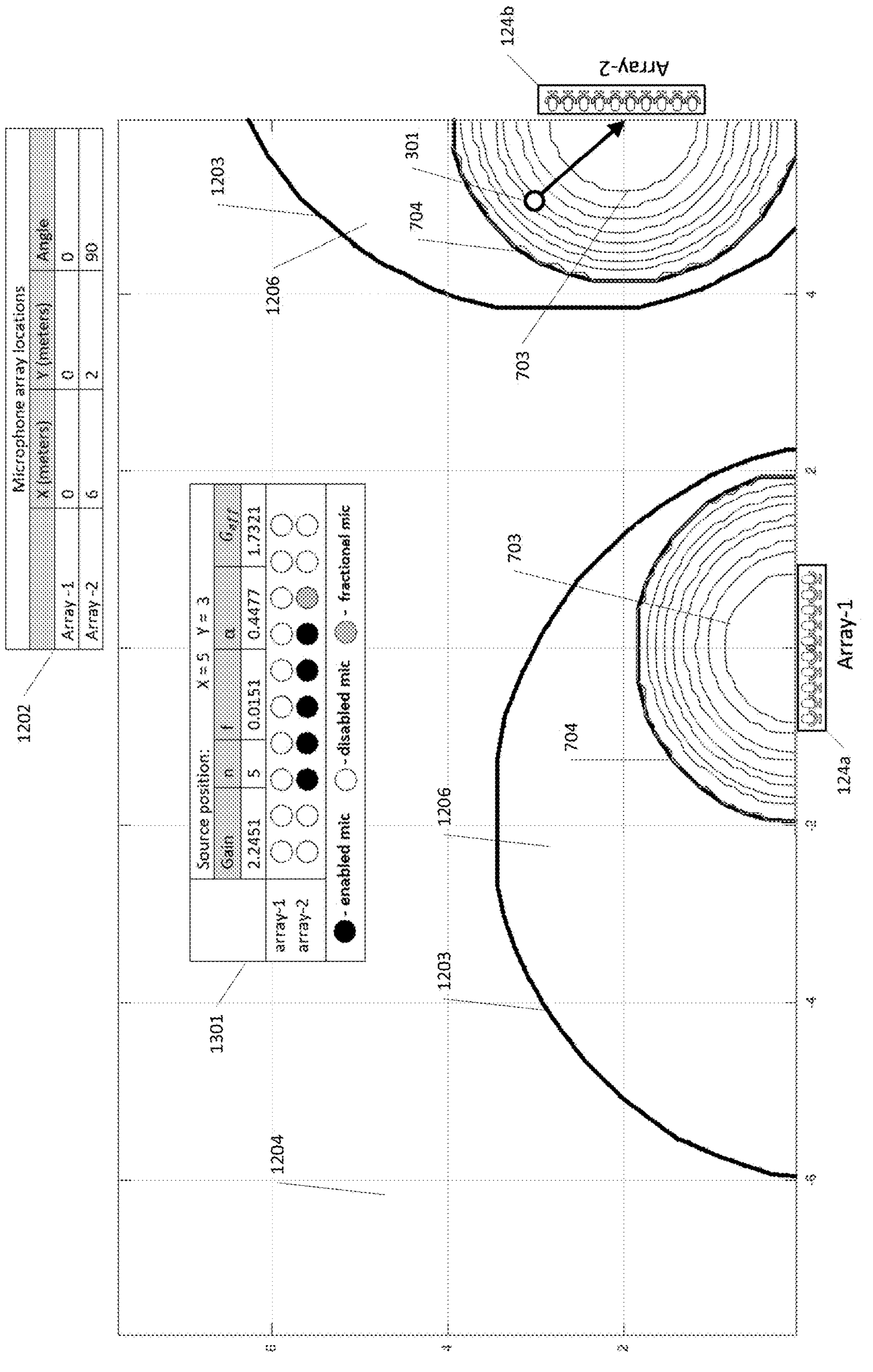
FIG. 13a PBGC - Inside Array-2

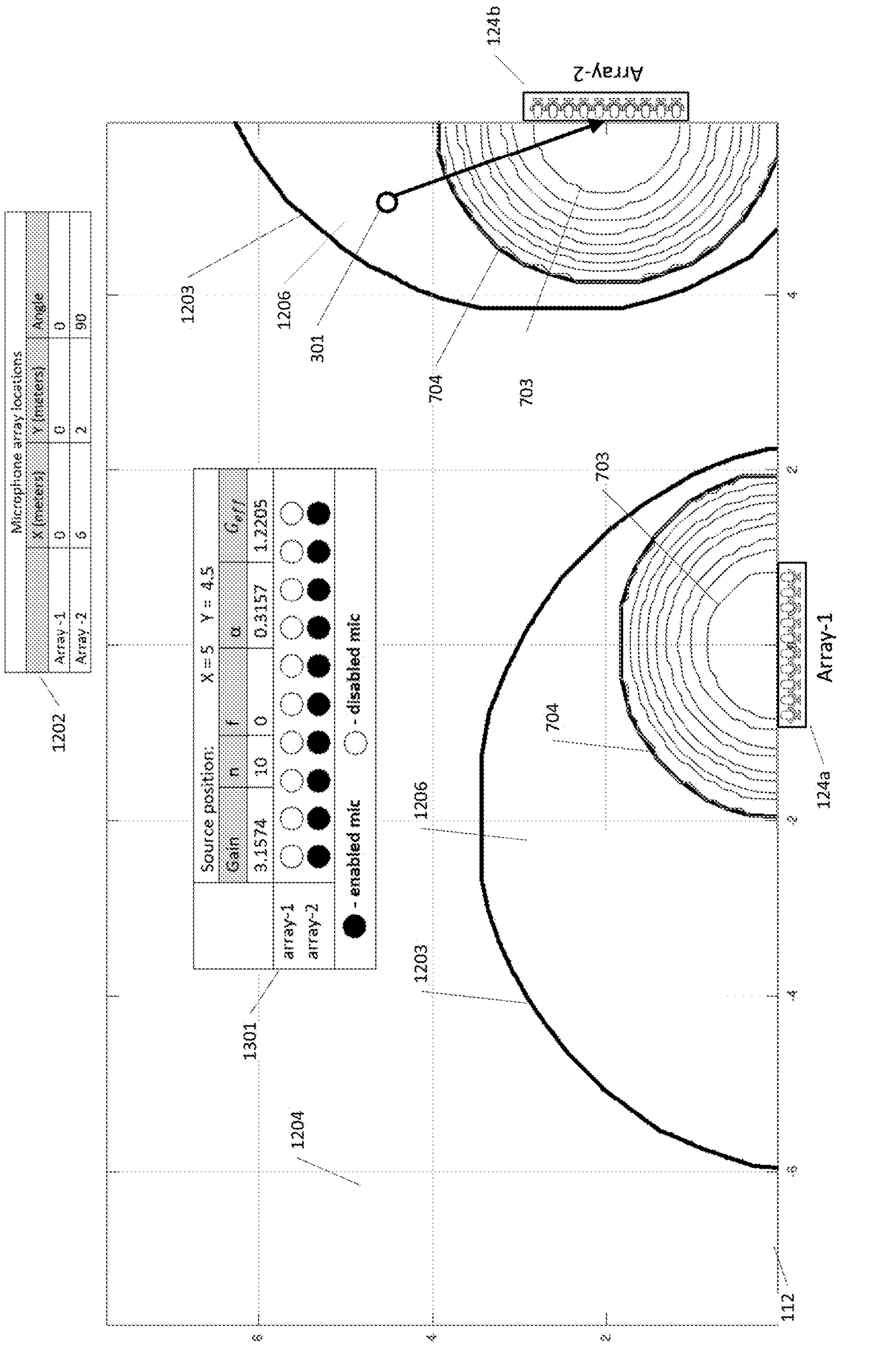
FIG. 13b PBGC - Outside Solo Region Array-2

FIG. 13c PBGC - Outside Both Arrays
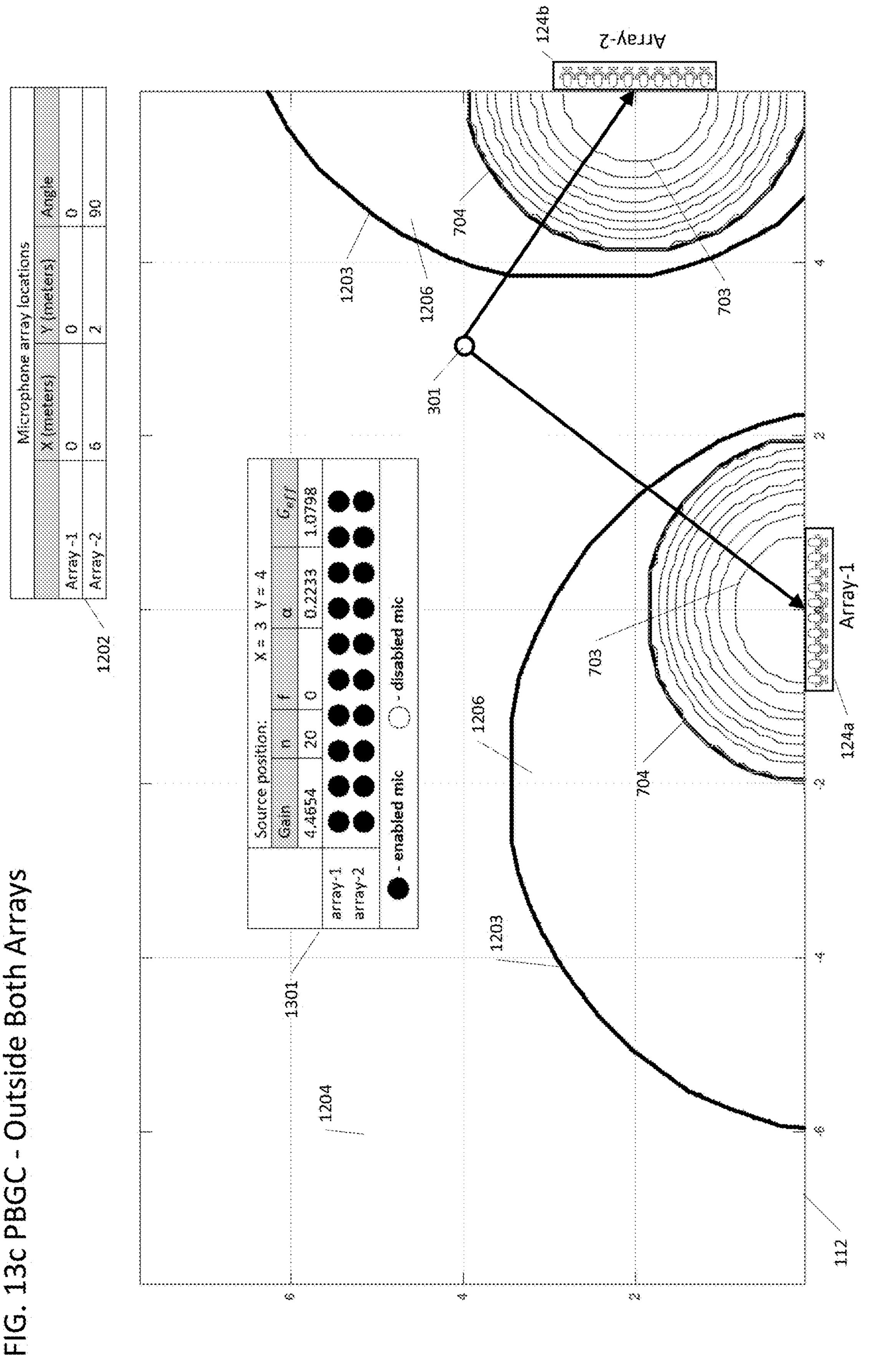

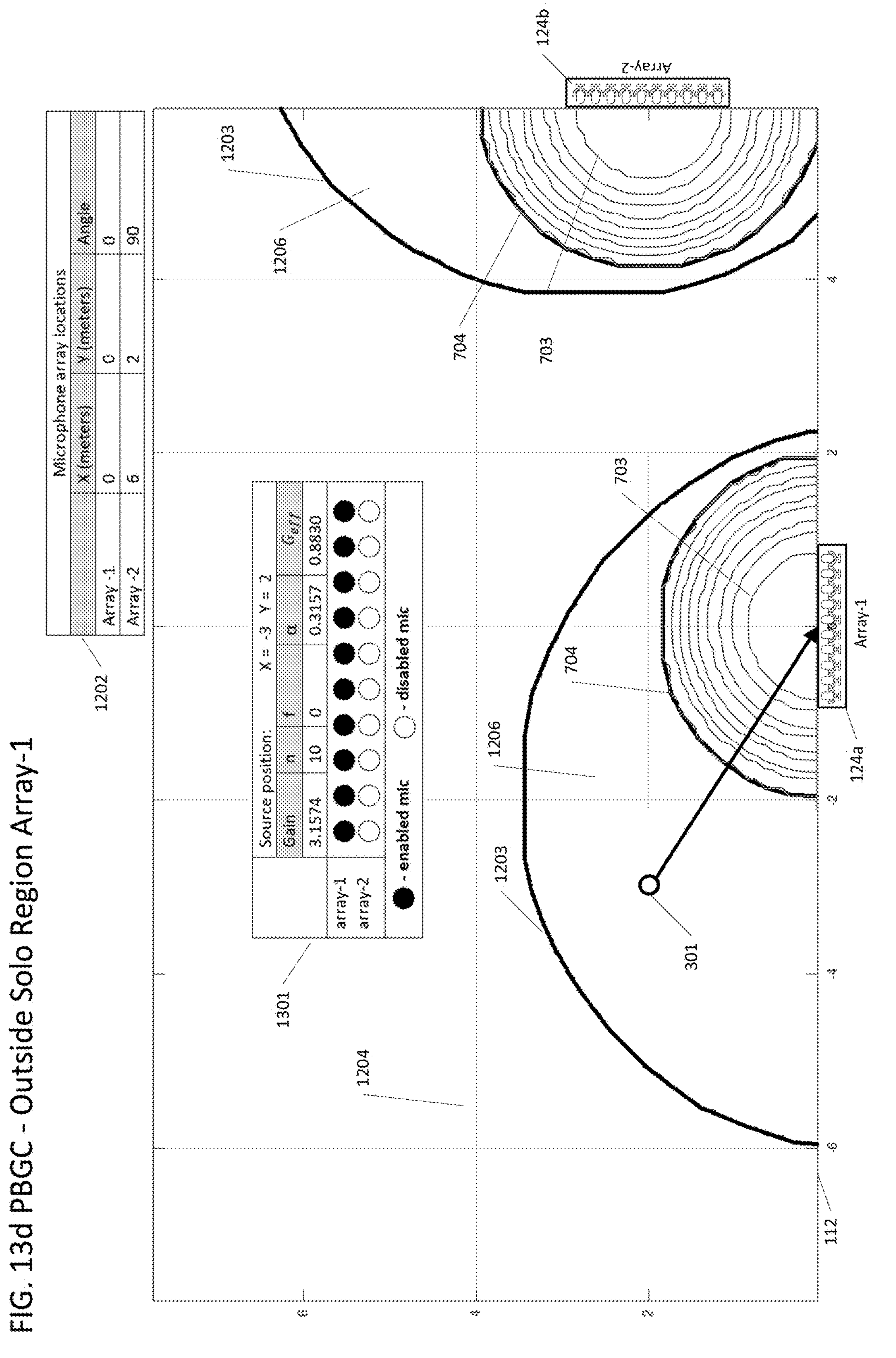
FIG. 13d PBGC - Outside Solo Region Array-1
Microphone array locations
X (meters)
Y (meters)
Angle
Array -1
0
0
0
Array -2
6
2
90
Source position: X = -3 Y = 2
Gain
n
f
α
$G_{eff}$
3.1574
10
0
0.3157
0.8830
array-1
array-2
- enabled mic
- disabled mic
Array-1
Array-2
1202
1203
1204
1206
1301
301
703
704
112
124a
124b

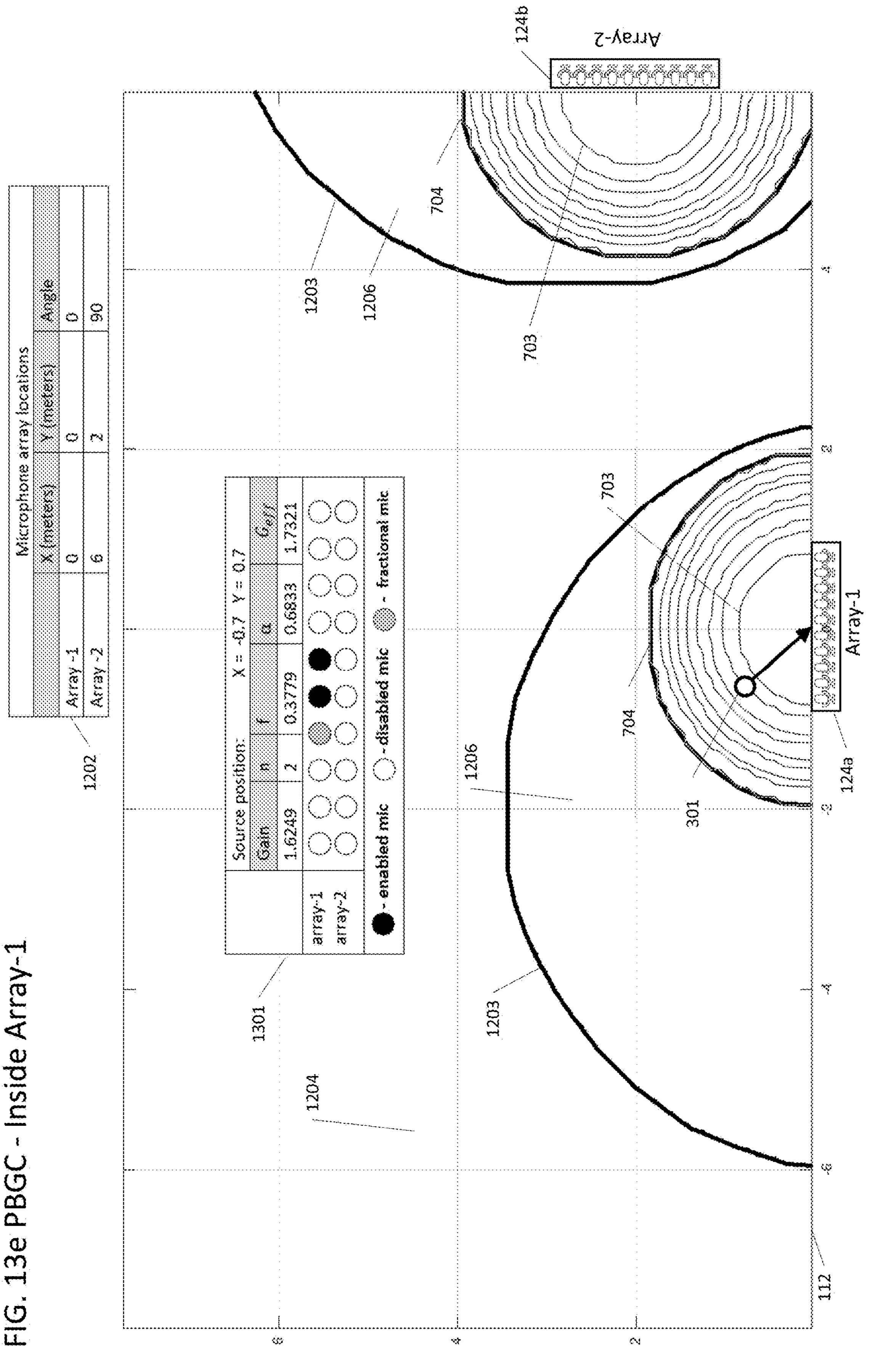
FIG. 13e PBGC - Inside Array-1

FIG. 14 Graph of PBGC and AGC vs Ambient Noise Levels
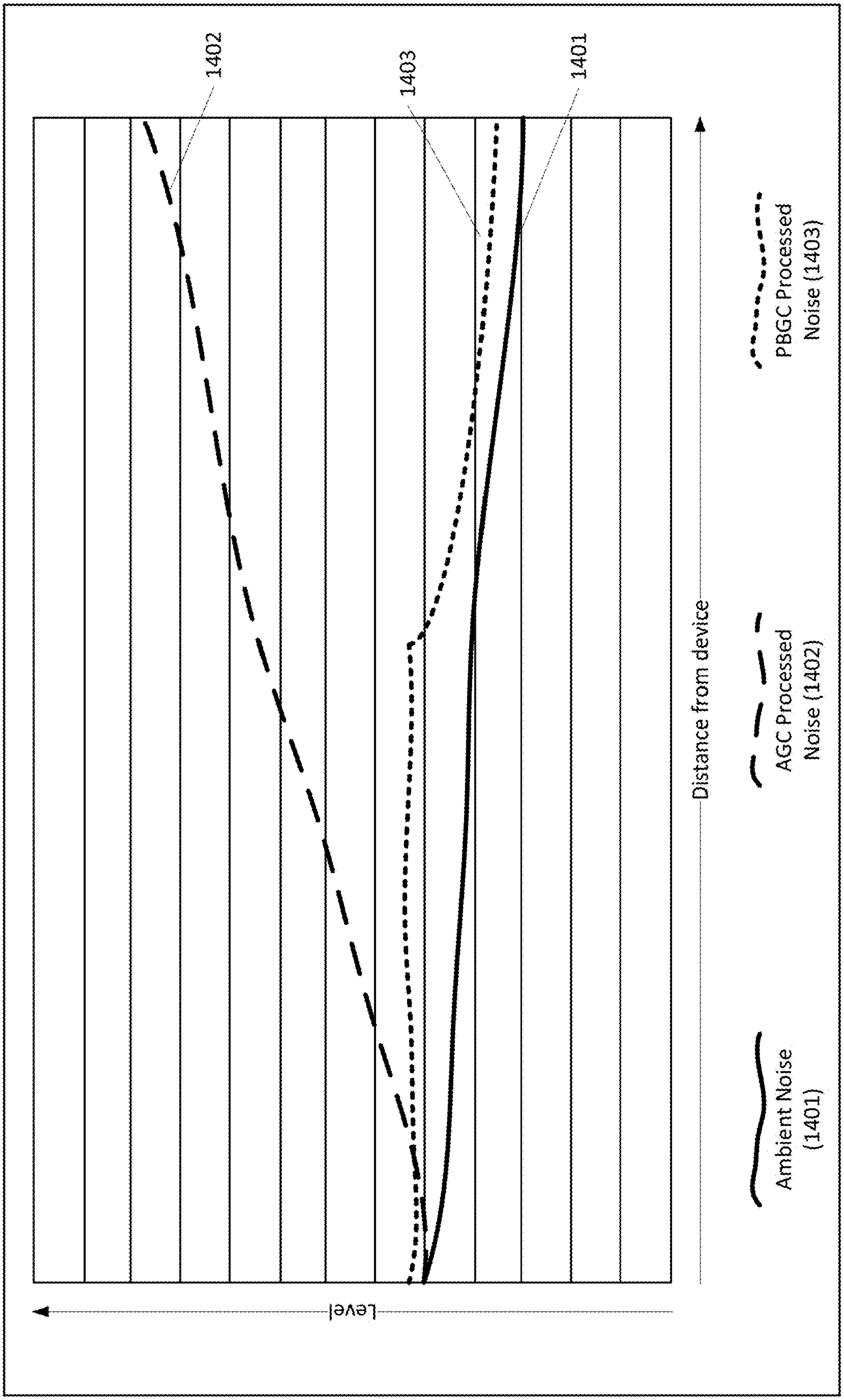

SYSTEM FOR DYNAMICALLY DERIVING AND USING POSITIONAL BASED GAIN OUTPUT PARAMETERS ACROSS ONE OR MORE MICROPHONE ELEMENT LOCATIONS

CROSS REFERENCE TO RELATED APPLICATIONS

This application claims priority to U.S. Provisional Patent Application No. 63/324,452, filed Mar. 28, 2022, the entire contents of which are incorporated herein by reference.

BACKGROUND OF THE INVENTION

1. Field of the Invention

The present invention generally relates to utilizing positional 3D spatial sound power information for the purpose of deterministic positional based automatic gain control to adjust one or more dynamically configured microphone arrays in at least near real-time for multi-user conference situations for optimum audio signal and ambient sound level performance.

2. Description of Related Art

Obtaining high quality audio at both ends of a conference call is difficult to manage due to, but not limited to, variable room dimensions, dynamic seating plans, roaming participants, unknown number of microphones and locations, unknown speaker system locations, known steady state and unknown dynamic noise, variable desired sound source levels, and unknown room characteristics. Because of the complex needs and requirements, solving the problems has proven difficult and insufficient within the current art.

To provide an audio conference system that addresses dynamic room usage scenarios and the audio performance variables discussed above, microphone systems need to be thoughtfully designed, installed, configured, and calibrated to perform satisfactorily in the environment. The process starts by placing an audio conference system in the room utilizing one or more microphones. The placement of microphone(s) is critical for obtaining adequate room coverage which must then be balanced with proximity of the microphone(s) to the participants to maximize desired vocal audio pickup while reducing pickup of speakers and undesired sound sources. In a small space where participants are collocated around a table, simple audio conference systems can be placed on the table to provide adequate performance and participant audio room coverage. Larger spaces require multiple microphones of various form factors which may be mounted in any combination of, but not limited to, the ceiling, tables, walls, etc., making for increasingly complex and difficult installations. To optimize audio performance of the audio conference system, various compromises are typically required based on, but not limited to, limited available microphone mounting locations, inability to run connecting cables, room use changes requiring a different microphone layout, seated vs agile and walking participants, location of undesired noise sources and other equipment in the room, etc. all affecting where and what type of microphones can be placed in the room.

Once mounting locations have been determined and the system has been installed, the audio system will typically require a manual calibration process run by an audio technician to complete setup up. Examples of items checked during the calibration include: the coverage zone for each microphone type, gain structure and levels of the microphone inputs, feedback calibration and adjustment of speaker levels and echo canceler calibration. It should be noted in the current art, the microphone systems do not have knowledge of location information relative to other microphones and speakers in the system, so the setup procedure is managing for basic signal levels and audio parameters to account for the unknown placement of equipment. As a result, if any part of the microphone or speaker system is removed, replaced, or new microphone and speakers are added, the system would need to undergo a new calibration and configuration procedure. Even though the audio conference system has been calibrated to work as a system, the microphone elements operate independently of each other requiring complex switching and management logic to ensure the correct microphone system element is active for the appropriate speaking participant in the room. The impact of this is overlapping microphone coverage zones, coverage zone boundaries that cannot be configured for, or controlled precisely resulting in microphone element conflict with desired sound sources, unwanted undesired sound source pick up, to little coverage zone for the room, coverage zone extension beyond the preferred coverage area and inconsistent gain management as sound sources move across the various microphone coverage regions. This can result in the microphone system having to deal with a wide dynamic range of audio signals and ambient background noise levels based on the sound source position in the room relative to any one of the physical microphones installed. This issue is further complicated and magnified when two or more microphone array systems are utilized to provide sufficient room coverage.

In the currently known art, there have been various approaches to solving the complex issue of managing wide dynamic range audio signals with acceptable ambient sound level performance from multi-location based sound and signal sources. Typically, this is accomplished using heuristic-based automatic gain control techniques to enhance audio conferencing system performance in a multi-user room. Automatic gain control is used to bring the desired signal, which in this case may be but is not limited to a speaking participant in the room, to within an acceptable dynamic range to be transmitted to remote participants through third party telephone, network and/or teleconference software such as Microsoft Skype, for example. If automatic gain control was not implemented the conversations would be hard to hear with the sound volume levels swinging from very low level to very loud levels. The communication system may not be able to manage the signal properly, with too little signal strength to be heard clearly or too much signal strength, which would overdrive the system resulting in clipping of the signal and adding significant distortion. Either scenario would not be acceptable in an audio conference situation. If the signal is within a sufficient range to propagate through the system, the resulting dynamic range swings would require the remote participants to continually adjust their volume control to compensate for the widely variable level differences that would be present for each individual speaking participant. An unwanted byproduct of typical automatic gain control circuits is the ambient sound levels also tracking in proportion to volume changes by the remote participant.

Automatic gain control is typically applied as a post-processing function within a variable gain amplifier or after the analog digital converter in a digital signal processor isolated from the microphone processing logic. The automatic gain control does not know a key parameter such as the position of the sound source, or the configuration of the specific microphone system at that location in the room that was used to pick up the sound source audio, which means the automatic gain control will need to operate on heuristic principals, assumptions, and configuration limits. This is problematic because the automatic gain control solutions have to work on heuristic principals because the actual location of the sound and ambient sound sources are not known in relation to the microphone system's various microphone elements, which means the performance of the automatic gain control is not deterministic. This results in serious shortcomings by not being able to adapt to and provide consistent performance and acceptable end user experiences.

Automatic gain control systems which need to deal with large dynamic range signals end up having to adjust the gain of the system, which can show up as sharp unexpected changes in background ambient sound levels. The automatic gain control will appear to hunt for the right gain setting so there can be a warbling and inconsistent sound levels making it difficult to understand the person speaking. The automatic gain control is trying to normalize to preset parameters that may or may not be suitable to the actual situation, as designers cannot anticipate all scenarios and contingencies that an automatic gain control function must handle. Third party conference and phone software such as but not limited to Microsoft Skype, for example, have specifications that need to be met to guarantee compatibility, certifications, and consistent performance. Automatic gain controls in the current art do not know the distance and the actual sound levels of the sound source they are trying to manage, resulting in inconsistent sound volume when switching sources and fluctuating ambient sound level performance. This makes for solutions that are not deterministic and do not provide a high level of audio performance and user experience.

Thus, the current art is not able to provide consistent performance in regard to a natural user experience regarding desired source signal level control and consistent ambient sound level performance.

An approach in the prior art is to utilize various methods to determine source location targeting parameters to determine Automatic Gain Control (AGC) settings. However, the systems in the prior art address a gain adjustment method that does not adequately manage the ambient noise levels to a consistent level, regardless of targeted AGC parameters, which is problematic for maintaining a natural audio listening experience with consistent ambient noise levels for conference participants.

The optimum solution would be a conference system that is able to automatically determine and adapt an optimized combined coverage zone for shape, size, position, and boundary dimensions in real-time utilizing all available microphone elements in shared space as a single physical array and create a gain map based on the position of each virtual microphone in the coverage zone in relation to each microphone array element. However, fully automating the dynamic gain structure coverage zone process and creating a single dimensioned, positioned, and shaped coverage zone grid from multiple individual microphones that is able to fully encompass a 3D space including limiting the coverage area to derived boundaries and solving such problems has proven difficult and insufficient within the current art.

An automatic calibration process is preferably required which will detect microphones attached or removed from the system, locate the microphones in 3D space to sufficient position and orientation accuracy to form a single cohesive microphone array element out of all the in-room microphones. With all microphones operating as a single physical microphone element, effectively a microphone array, the system will be able to derive a single cohesive position based, dimensioned and shaped coverage map that contains gain specific parameters for each virtual microphone position relative to the individual microphone elements that is specific and adapts to the room in which the microphone system is installed. This approach improves, for example, the management of audio signal gain, tracking participants, maintaining ambient noise levels, minimizing unwanted sound sources, reduction of ingress from other spaces and sounds source bleed through from coverage grids that extend beyond wall boundaries and wide-open spaces while accommodating a wide range of microphone placement options; one of which is being able to add or remove microphone elements in the system and have the audio conference system integrate the changed microphone element structure into the microphone array in real-time and preferably adapting the coverage pattern accordingly.

Systems in the current art do not automatically derive, establish and adjust their specific coverage zone parameters and virtual microphone gain parameter details based on specific microphone element positions and orientations, and instead rely on a manual calibration and setup process to setup the audio conference system requiring complex DSP switching and management processors to integrate independent microphones into a coordinated microphone room coverage selection process based on the position and sound levels of the participants in the room. Adapting to the addition or removal of a microphone element is a complex process. The audio conference system will typically need to be taken offline, recalibrated, and configured to account for coverage patterns as microphones are added or removed from the audio conference system. Adapting and optimizing the coverage area to a specific size, shape and bounded dimensions is not easily accomplished with microphone devices used in the current art which results in a scenario where either not enough of the desired space is covered or too much of the desired space is covered extending into an undesired space and undesired sound source pickup.

Therefore, the current art is not able to provide a dynamically formed virtual microphone coverage grid with individual virtual microphone gain parameters in real-time accounting for individual microphone position placement in the space during audio conference system setup that takes into account multiple microphone-to-speaker combinations, multiple microphone and microphone array formats, microphone room position, addition and removal of microphones, in-room reverberation, and return echo signals.

SUMMARY OF THE INVENTION

An object of the present embodiments is, in real-time, upon auto-calibration of the combined microphone array system after automatically determining and positioning the microphone coverage grid for the optimal dispersion of virtual microphones for grid placement, size and geometric shape relative to a reference point in the combined microphone array and to the position of the other microphone elements in the combined microphone array to create a virtual microphone position based gain map. More specifically, it is an object of the invention to preferably derive virtual microphone specific gain parameters for one or more physical microphone elements that are specific to each microphone element relative to each virtual microphone position in the coverage map in the shared 3D space.

The present invention provides a real-time adaptable solution to undertake creation of a dynamically determined coverage zone grid containing positional based gain parameters for each virtual microphone based on the installed microphone's position, orientation, and configuration settings in the 3D space.

These advantages and others are achieved, for example, by a system for positional based automatic gain control to adjust a dynamically configured combined microphone array in a shared 3D space for optimum audio signal and ambient sound level performance. The system includes a combined microphone array and a system processor communicating with the combined microphone array. The combined microphone array includes one or more of individual microphones and/or microphone arrays each including a plurality of microphones. The microphones in each microphone array are arranged along a microphone axis. The system processor is configured to perform operations including: obtaining predetermined locations of the microphones of the combined microphone array throughout the shared 3D space, obtaining predetermined coverage zone dimensions based on the locations of the microphones of the combined microphone array, populating the coverage zone dimensions with virtual microphones, identifying locations of sound sources in the shared 3D space based on the virtual microphones, computing one or more positional based gain control (PBGC) parameter values for one or more virtual microphones based on the locations of the virtual microphones, and combining microphone signals into desired channel audio signals by applying the PBGC parameters to adjust microphones to control positional based microphone gains based on the location information of the sound source.

The PBGC parameter values may be stored in one or more computer-readable media. The PBGC parameter values may include gains for the microphones and the virtual microphones. The adjusting microphones may include adjusting a gain value for each microphone. The PBGC parameters may be pre-computed based on locations of the virtual microphones. The PBGC parameters may be computed in real-time when a new sound source location is determined and corresponding virtual microphone receives focus. The operations may further include creating processed audio signals from raw microphone signals, and applying gain values to processed audio signals by using the PBGC parameters. the positional based microphone gains may be obtained on a per microphone basis. The microphones in the combined microphone array may be configured to form a 2D plane in the shared 3D space. The microphones in the combined microphone array may be configured to form a hyperplane in the shared 3D space.

The preferred embodiments comprise both algorithms and hardware accelerators to implement the structures and functions described herein.

BRIEF DESCRIPTION OF THE DRAWINGS

FIGS. 1*a*, 1*b* and 1*c* are diagrammatic examples of a typical audio conference setups across multiple device types.

FIGS. 2*a* and 2*b* are graphical structural examples of microphone array layouts supported in the embodiment of the present invention.

FIGS. 3*a*, 3*b*, 3*c* and 3*d* are examples of Microphone Axis arrangements supported in the embodiment of the invention.

FIGS. 3*e*, 3*f*, 3*g*, 3*h*, 3*i*, 3*j* and 3*k* are examples of Microphone Plane arrangements supported in the embodiment of the invention.

FIGS. 3*l*, 3*m*, 3*n*, 3*o*, 3*p*, 3*q* and 3*r* are examples of Microphone Hyperplane arrangements supported in the embodiment of the invention.

FIGS. 4*a*, 4*b*, 4*c*. 4*d*, 4*e* and 4*f* are prior art diagrammatic examples of microphone array coverage patterns in the current art.

FIGS. 5*a*, 5*b*, 5*c*, 5*d*, 5*e*, 5*f* and 5*g* are diagrammatic illustrations of the of microphone array devices combined and calibrated into a single array providing full room coverage.

FIG. 6 is diagrammatic illustration of coordinate definitions within a 3D space.

FIG. 7 is an illustration of a positional based gain control system utilizing a single microphone array in the prior art.

FIGS. 8*a* and 8*b* are exemplary illustrations of a multiple microphone array utilizing positional based gain control supported in the embodiment of the invention.

FIGS. 9*a*, 9*b*, 9*c*, 9*d* and 9*e* are functional and structural diagrams of an exemplary embodiment of the positional based gain control algorithm across one or more microphone arrays while using the virtual microphone map to identify target sound sources in a 3D space.

FIGS. 10*a* and 10*b* are exemplary embodiments of the logic flowcharts of the Positional Gain Control processor process.

FIGS. 11*a*, 11*b* and 11*c* are exemplary illustrations of the present invention mapping physical microphones to one or more microphone arrays when the target virtual microphone is within the minimum threshold distance.

FIGS. 11*d* and 11*e* are exemplary illustrations of the threshold region shapes as defined by the microphone allocation scheme.

FIGS. 12*a*, 12*b*, 12*c*, 12*d*, and 12*e* are exemplary illustrative drawings of the present invention mapping physical microphones contour lines to virtual microphones in a 3D space based on two microphone array mounting locations.

FIGS. 13*a*, 13*b*, 13*c*, 13*d*, and 13*e* are exemplary illustrative drawings of the logical assignment of physical microphones contained in the microphone arrays with regards to specific active virtual microphone locations.

FIG. 14 is a graphical illustration showing gain vs. ambient noise contrasted between positional based gain control and common automatic gain control algorithms with respect to distance from the microphone array.

DETAILED DESCRIPTION OF THE PRESENT INVENTION

Figure 2B:
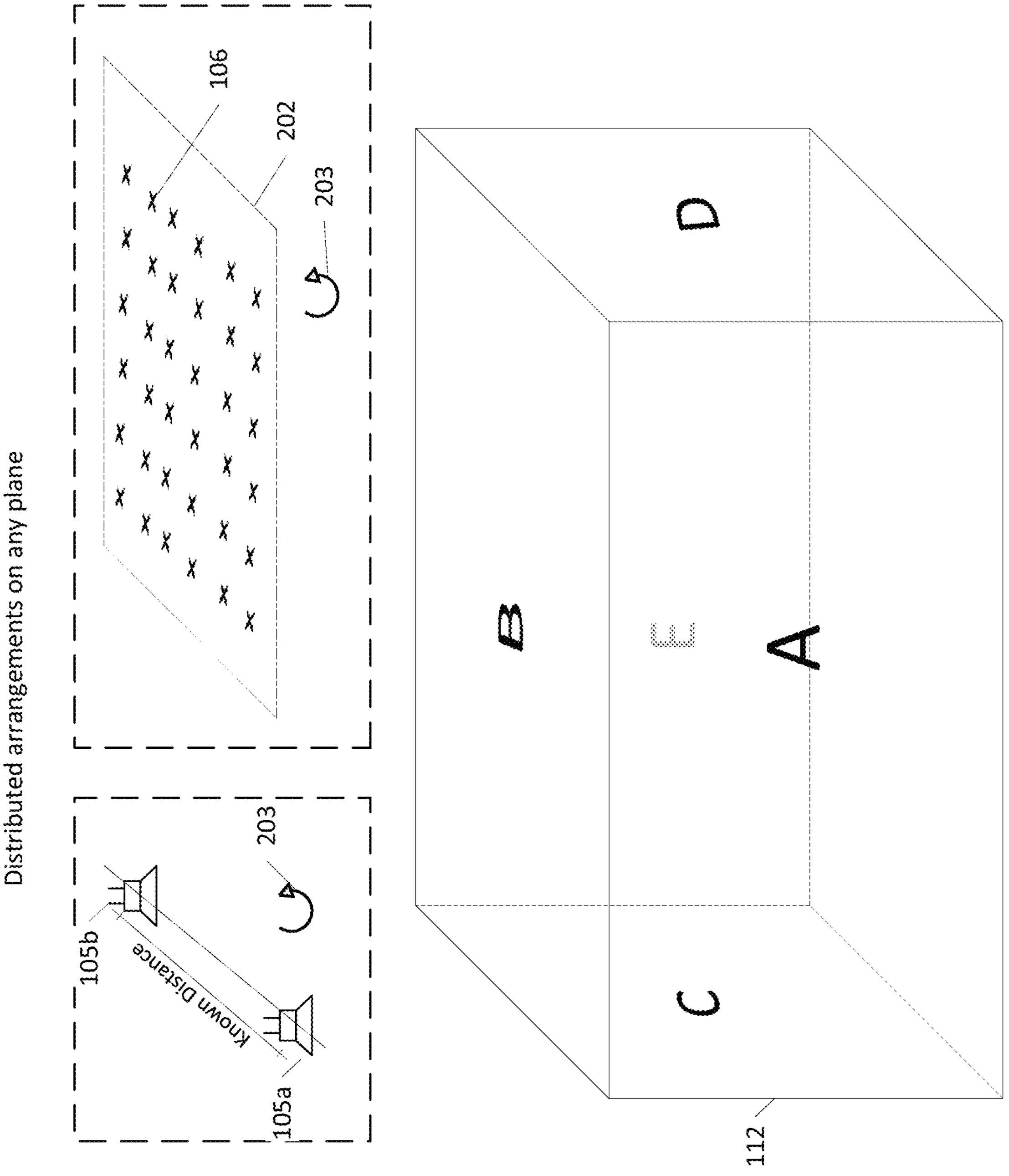

The present invention is directed to apparatus and methods that enable groups of people (and other sound sources, for example, recordings, broadcast music, Internet sound, etc.), known as "participants", to join together over a network, such as the Internet, in a remotely-distributed real-time fashion employing personal computers, network workstations, and/or other similarly connected appliances, often without face-to-face contact, to engage in effective audio conference meetings that utilize large multi-user rooms (spaces) with distributed participants.

Advantageously, embodiments of the present apparatus and methods provide an ability for remote participants to experience in room sound sources (participants) of a conference call at a consistent volume level, regardless of their location with respect to the microphone array, while always maintaining consistent ambient sound levels, regardless of the number of microphone elements distributed throughout the space.

A notable challenge to picking up sound clearly in a room, cabin, or confined space is the dynamic nature of the sound sources, resulting in a wide range of sound pressure levels, while maintaining realistic and consistent ambient sound levels for the remote participant(s). Creating a dynamically shaped and positioned virtual microphone bubble map that contains gain parameters for each virtual microphone location from ad-hoc located microphones in a 3D space requires reliably placing and sizing the 3D virtual microphone bubble map with sufficient accuracy to position the virtual microphone bubble map in proper context to the room boundaries, physical microphones installed locations and the participants usage requirements all without requiring a complex manual setup procedure, the merging of individual microphone coverage zones, directional microphone systems or complex digital signal processing (DSP) logic. Instead, preferably using a microphone array system that is aware of its constituent microphones locations relative to each other in the 3D space as well as each microphone device having configuration parameters that facilitate coverage zone boundary determinations on a per microphone basis allowing for a microphone array system that is able to automatically and dynamically derive and establish room specific installed coverage zone areas and constraints to optimize the coverage zone area and gain structure parameters for each virtual microphone in each individual room automatically without the need to manually calibrate and configure the microphone system.

A "microphone" in this specification may include, but is not limited to, one or more of, any combination of transducer device(s) such as, microphone element, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting to electrical signals, and or digital signals.

A "microphone point source" is defined for the purpose of this specification as the center of the aperture of each physical microphone. The microphones are considered to be omni-directional as defined by their polar plot and can essentially be considered an isotropic point source. This is required for determining the geometric arrangement of the physical microphones relative to each other. The microphones will be considered to be a microphone point source in 3D space.

A "Boundary Device" in this specification may be defined as any microphone and/or microphone arrangement that has been defined as a boundary device. A microphone can be configured and thus defined as a boundary device through automatic queries to the microphone and/or through a manual configuration process. A boundary device may be mounted on a room boundary such as a wall or ceiling, a tabletop, and/or a free-standing microphone offset from or suspended from a mounting location that will be used to define the outer coverage area limit of the installed microphone system in its environment. The microphone system will use microphones configured as boundary devices to derive coverage zone dimensions in the 3D space. By default, if a boundary device is mounted to a wall or ceiling it will define the coverage area to be constrained to that mounting surface which can then be used to derive room dimensions. As more boundary devices are installed on each room boundary in a space the accuracy of determining the room dimensions increases with each device and can be determined to a high degree of accuracy if all room boundaries are used for mounting. By the same token a boundary device can be free standing in a space such as a microphone on a stand or suspended from a ceiling or offset from a wall or other structure. The coverage zone dimension will be constrained to that boundary device which is not defining a specific room dimension but is a free air dimension that is movable based on the boundary devices' current placement in the space. These can be used to define a boundary constraint of 1, 2 or 3 planes based on the location of the boundary device. Boundary constraints are defined as part of the boundary device configuration parameters to be defined in detail within the specification. Note that a boundary device is not restricted to create a boundary at its microphone location. For example, a boundary device that consists of a single microphone hanging from a ceiling mount at a known distance could create a boundary at the ceiling by off-setting the boundary from the microphone by that known distance.

A "microphone arrangement" may be defined in this specification as a geometric arrangement of all the microphones contained in the microphone system. Microphone arrangements are required to determine the virtual microphone distribution pattern. The microphones can be mounted at any point in the 3D space, which may be a room boundary, such as a wall, ceiling or floor. Alternatively, the microphones may be offset from the room boundaries by mounting on stands, tables or structures that provide offset from the room boundaries. The microphone arrangements are used to describe all the possible geometric layouts of the physical microphones to either form a microphone axis (m-axis), microphone plane (m-plane) or microphone hyperplane (m-hyperplane) geometric arrangement in the 3D space.

A "microphone axis" (m-axis) may be defined in this specification as an arrangement of microphones that forms and is constrained to a single 1D line.

A "microphone plane" (m-plane) may be defined in this specification as an arrangement containing all the physical microphones that forms and is constrained to a 2D geometric plane. A microphone plane cannot be formed from a single microphone axis.

A "microphone hyperplane" (m-hyperplane) may be defined in this specification as an arrangement containing all the physical microphones that forms a 3-dimensional hyperplane structure between the microphones. A microphone hyperplane cannot be formed from a single microphone axis or microphone plane.

Two or more microphone aperture arrangements can be combined to form an overall microphone aperture arrangement. For example, two microphone axes arranged perpendicular to each other will form a microphone plane and two microphone planes arranged perpendicular to each other with form a microphone hyperplane.

A "virtual microphone" in this specification represents a point in space that has been focused on by the combined microphone array by time-aligning and combining a set of physical microphone signals according to the time delays based on the speed of sound and the time to propagate from the sound source each to physical microphone.

A "Coverage Zone Dimension" in the specification may include physical boundaries such as wall, ceiling and floors that contain a space with regards to the establishment of installing and configuring a microphone system coverage patterns and dimensions. The coverage zone dimension can be known ahead of time or derived with a number of sufficiently placed microphone arrays also known as boundary devices placed on or offset from physical room boundaries.

A "combined array" in this specification can be defined as the combining of two more individual microphone elements, groups of microphone elements and other combined microphone elements into a single combined microphone array system that is aware of the relative distance between each microphone element to a reference microphone element, determined in configuration, and is aware of the relative orientation of the microphone elements such as a m-axis, m-plane and m-hyperplane sub arrangements of the combined array. A combined array will integrate all microphone elements into a single array and will be able to form coverage pattern configurations as a combined array.

A "conference enabled system" in this specification may include, but is not limited to, one or more of, any combination of device(s) such as, UC (unified communications) compliant devices and software, computers, dedicated software, audio devices, cell phones, a laptop, tablets, smart watches, a cloud-access device, and/or any device capable of sending and receiving audio signals to/from a local area network or a wide area network (e.g. the Internet), containing integrated or attached microphones, amplifiers, speakers and network adapters. PSTN, Phone networks etc.

A "communication connection" in this specification may include, but is not limited to, one or more of or any combination of network interface(s) and devices(s) such as, Wi-Fi modems and cards, internet routers, internet switches, LAN cards, local area network devices, wide area network devices, PSTN, Phone networks, etc.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

A "participant" in this specification may include, but is not limited to, one or more of, any combination of persons such as students, employees, users, attendees, or any other general groups of people that can be interchanged throughout the specification and construed to mean the same thing. Who gathering into a room or space for the purpose of listening to and or being a part of a classroom, conference, presentation, panel discussion or any event that requires a public address system and a UCC connection for remote participants to join and be a part of the session taking place. Throughout this specification a participant is a desired sound source, and the two words can be construed to mean the same thing.

A "desired sound source" in this specification may include, but is not limited to, one or more of a combination of audio source signals of interest such as: sound sources that have frequency and time domain attributes, specific spectral signatures, and/or any audio sounds that have amplitude, power, phase, frequency and time, and/or voice characteristics that can be measured and/or identified such that a microphone can be focused on the desired sound source and said signals processed to optimize audio quality before delivery to an audio conferencing system. Examples include one or more speaking persons, one or more audio speakers providing input from a remote location, combined video/audio sources, multiple persons, or a combination of these. A desired sound source can radiate sound in an omni-polar pattern and/or in any one or combination of directions from the center of origin of the sound source.

An "undesired sound source" in this specification may include, but is not limited to, one or more of a combination of persistent or semi-persistent audio sources such as: sound sources that may be measured to be constant over a configurable specified period of time, have a predetermined amplitude response, have configurable frequency and time domain attributes, specific spectral signatures, and/or any audio sounds that have amplitude, power, phase, frequency and time characteristics that can be measured and/or identified such that a microphone might be erroneously focused on the undesired sound source. These undesired sources encompass, but are not limited to, Heating, Ventilation, Air Conditioning (HVAC) fans and vents; projector and display fans and electronic components; white noise generators; any other types of persistent or semi-persistent electronic or mechanical sound sources; external sound source such as traffic, trains, trucks, etc.; and any combination of these. An undesired sound source can radiate sound in an omni-polar pattern and/or in any one or combination of directions from the center of origin of the sound source.

A "system processor" is preferably a computing platform composed of standard or proprietary hardware and associated software or firmware processing audio and control signals. An example of a standard hardware/software system processor would be a Windows-based computer. An example of a proprietary hardware/software/firmware system processor would be a Digital Signal Processor (DSP).

A "communication connection interface" is preferably a standard networking hardware and software processing stack for providing connectivity between physically separated audio-conferencing systems. A primary example would be a physical Ethernet connection providing TCPIP network protocol connections.

A "Unified Communication Client" (UCC) is preferably a program that performs the functions of but not limited to messaging, voice and video calling, team collaboration, video conferencing and file sharing between teams and or individuals using devices deployed at each remote end to support the session. Sessions can be in the same building and/or they can be located anywhere in the world that a connection can be establish through a communications framework such but not limited to Wi-Fi, LAN, Intranet, telephony, wireless or other standard forms of communication protocols. The term "Unified Communications" may refer to systems that allow companies to access the tools they need for communication through a single application or service (e.g., a single user interface). Increasingly, Unified Communications have been offered as a service, which is a category of "as a service" or "cloud" delivery mechanisms for enterprise communications ("UCaaS"). Examples of prominent UCaaS providers include Dialpad, Cisco, Mitel, RingCentral, Twilio, Voxbone, 8×8, and Zoom Video Communications.

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing any of the one or more computer programs, data and parameters.

With reference to FIG. 1*a*, illustrated is a typical audio conference scenario in the current art, where a remote user 101 is communicating with a shared space conference room 112 via headphone (or speaker and microphone) 102 and computer 104. Room, shared space, environment, free space, conference room and 3D space can be construed to mean the same thing and will be used interchangeably throughout the specification. The purpose of this illustration is to portray a typical audio conference system 110 in the current art in which there is sufficient system complexity due to either room size and/or multiple installed microphones 106 and speakers 105 that the microphone 106 and speaker 105 system may require custom microphone 106 coverage pattern calibration and configuration setup. Microphone 106 coverage pattern setup is typically required in all but the simplest audio conference system 110 installations where the microphones 106 are static in location and their coverage patterns limited, well understood and fixed in design such as a simple table-top 108 units and/or as illustrated in FIG. 1B simple wall mounted microphone and speaker bar arrays 114.

For clarity purposes, a single remote user 101 is illustrated. However, it should be noted that there may be a plurality of remote users 101 connected to the conference system 110 which can be located anywhere a communication connection 123 is available. The number of remote users is not germane to the preferred embodiment of the invention and is included for the purpose of illustrating the context of how the audio conference system 110 is intended to be used once it has been installed and calibrated. The room 112 is configured with examples of, but not limited to, ceiling, wall, and desk mounted microphones 106 and examples of, but not limited to, ceiling and wall mounted speakers 105 which are connected to the audio conference system 110 via audio interface connections 122. In-room participants 107 may be located around a table 108 or moving about the room 112 to interact with various devices such as the touch screen monitor 111. A touch screen/flat screen monitor 111 is located on the long wall. A microphone 106 enabled webcam 109 is located on the wall beside the touch screen 111 aiming towards the in-room participants 107. The microphone 106 enabled web cam 109 is connected to the audio conference system 110 through common industry standard audio/video interfaces 122. The complete audio conference system 110 as shown is sufficiently complex that a manual setup for the microphone system is most likely required for the purpose of establishing coverage zone areas between microphones, gain structure and microphone gating levels of the microphones 106, including feedback and echo calibration of the system 110 before it can be used by the participants 107 in the room 112. As the participants 107 move around the room 112, the audio conference system 110 will need to determine the microphone 106 with the best audio pickup performance in real-time and adjust or switch to that microphone 106. Problems can occur when microphone coverage zones overlap between the physically spaced microphones 106. This can create microphone 106 selection confusion especially in systems relying on gain detection and level gate thresholding to determine the most appropriate microphone 106 to activate for the talking participant at any one time during the conference call. Some systems in the current art will try to blend individual microphones 106 through post processing means, which is also a compromise trying to balance the signal levels appropriately across separate microphone elements 106 and can create a comb filtering effect and reduced signal to noise ratio if the microphones 106 are not properly aligned and summed in the time domain. Since the microphone 106 elements are potentially part of a different array and/or location, the audio signal level in general and the audio signal level with respect to the ambient noise will be affected. This is especially pronounced in situations with high dynamic range, participants that are close to and then move away from or are far from the microphone system and the microphone system switches between the participants 107. The microphone system AGC circuit will attempt to compensate for dynamic changes in the source signal which will have a direct effect on the perceived ambient noise levels 701 as the AGC circuits adjust the gain to compensate. Conference systems 110 that do not compensate the system gain based on the specific speaking participant location 702 can never really be optimized for all dynamic situations in the room 112.

For this type of system, the specific 3D location (x, y, z) of each microphone element in space is not known, nor is it determined through the manual calibration procedure. Signal levels and thresholds are measured and adjusted for based on a manual setup procedure using computer 103 running calibration software by a trained audio technician (not shown). If the microphones 106 or speakers 105 are relocated in the room, removed or more devices are added the audio conference, manual calibration will need to be redone by the audio technician.

The size, shape, construction materials and the usage scenario of the room 112 dictates situations in which equipment can or cannot be installed in the room 112. In many situations the installer is not able to install the microphone system 106 in optimal locations in the room 112 and compromises must be made. To further complicate the system 110 installation as the room 112 increases in size, an increase in the number of speakers 105 and microphones 106 is typically required to ensure adequate audio pickup and sound coverage throughout the room 112 and thus increases the complexity of the installation, setup, and calibration of the audio conference system 110.

The speaker system 105 and the microphone system 106 may be installed in any number of locations and anywhere in the room 112. The number of devices 105, 106 required is typically dictated by the size of the room and the specific layout and intended usages. Trying to optimize all devices 105, 106 and specifically the microphones 106 for all potential room scenarios can be problematic.

It should be noted that microphone 106 and speaker 105 systems can be integrated in the same device such as tabletop devices and/or wall mounted integrated enclosures or any combination thereof and is within the scope of this disclosure as illustrated in FIG. 1B.

With reference to FIG. 1B, illustrated is a microphone 106 and speaker 105 bar combination unit 114. It is common for these units 114 to contain multiple microphone 106 elements in what is known as a microphone array 124. A microphone array 124 is a method of organizing more than one microphone 106 into a common array 124 of microphones 106 which consists of two or more and most likely five (5) or more physical microphones 106 ganged together to form a microphone array 114 element in the same enclosure 114. The microphone array 124 acts like a single microphone 106 but typically has more gain, wider coverage, fixed or configurable directional coverage patterns to try and optimize microphone 106 pickup in the room 112. It should be noted that a microphone array 124 is not limited to a single enclosure and can be formed out of separately located microphones 106 if the microphone 106 geometry and locations are known, designed for and configured appropriately during the manual installation and calibration process.

With reference to FIG. 1*c*, illustrated is the use of two microphone array 124 and speaker 105 bar units (bar units) 114 mounted on separate walls. The location of the bar units 114 for example may be mounted on the same wall, opposite walls or ninety degrees to each other as illustrated. Both bar units 114 contain microphone arrays 124 with their own unique and independent coverage patterns. If the room 112 requirements are sufficiently large, any number of microphone 106 and speaker 105 bar units 114 can be mounted to meet the room 112 coverage needs and is only limited by the specific audio conference system 110 limitations for scalability. This is a typical deployment strategy in the industry and coordination and hand off between the separate microphone array 124 coverage patterns needs to be managed and calibrated for, and/or dealt with in firmware to allow the bar units 114 to determine which unit 114 is utilized based on the active speaking participant 107 location in the room, and to automatically switch to the correct bar unit 114. Mounting multiple units 114 to increase microphone 106 coverage in larger rooms 112 is common. It should be noted that each microphone array 124 operates independently of each other, as each array 124 is not aware of the other array 124 in any way plus each array 124 has its own specific microphone coverage configuration patterns. The management of multiple arrays 124 is typically performed by a separate system processor 117 and/or DSP module. Because the arrays 124 operate independently the advantage of combined the arrays and creating a single intelligent coverage pattern strategy is not possible resulting in a microphone gain strategy that is not consistent throughout in the room 112.

FIG. 2*a* contains representative examples, but not an exhaustive list, of microphone array and microphone speaker bar layouts 114*a*, 114*b*, 114*c*, 114*d*, 114*e*, 114*f*, 114*g*, 114*h*, 114*i*, 114*j* to demonstrate the types of microphones 124 and speaker 105 arrangements that are supported within the context of the invention. The microphone array 124 and speaker 105 layout configurations are not critical and can be laid out in a linear, offset or any geometric pattern that can be described to a reference set of coordinates within the microphone and speaker bar layouts 114*a*, 114*b*, 114*c*, 114*d*, 114*e*, 114*f*, 114*g*, 114*h*, 114*i*, 114*j*. It should be noted that certain configurations where microphone elements are closely spaced relative to each other (for example, 114*a*, 114*c*, 114*e*) may require higher sampling rates to provide required accuracy. FIG. 2*a* also illustrates the different microphone arrangements that are supported within the context of the invention. Examples of microphone arrangements 114*a*, 114*b*, 114*c*, 114*d* and 114*e* are considered to be "microphone axis" 201 arrangements. All microphones 106 are arranged on a 1D axis. The m-axis 201 arrangement has a direct impact on the type and shape of the virtual microphone 301 coverage pattern that can be obtained from the combined microphone array as illustrated in FIG. 3*d* diagrams. Microphone arrangements 114*f*, 114*g*, 114*h*, 114*i* and 114*j* are examples of "microphone plane" 202 arrangements where the microphones have multiple m-axis 201 arrangements that can be confined to form a 2D plane. It should be noted that a microphone bar 124 can be anyone of i) m-axis 201, ii) m-plane 202 or iii) m-hyperplane 203 arrangement which is an arrangement of m-axis 201 or m-plane 202 microphones arranged to form a hyperplane 203 arrangement as illustrated in FIG. 3 series of drawings. Individual microphone bars 114 can have any one of the microphone arrangements m-axis 201, m-plane 202 or m-hyperplane 203 and/or groups or layouts of microphone bars 114 can be combined to form any one of the three microphone arrangements m-axis 201, m-plane 202 or a m-hyperplane 203.

FIG. 2*b* extends the support for speakers 105*a*, 105*b* and microphone array grid 124 to individual wall mounting scenarios. The microphones 106 can share the same mounting plane which would be considered a m-plane 202 arrangement and/or be distributed across multiple planes which would be considered a m-hyperplane 203 arrangement. The speakers 105*a*, 105*b* and microphone array grid 124 can be dispersed on any wall (plane) A, B, C, D or E and be within scope of the invention.

With reference to FIGS. 3*a*, 3*b*, 3*c*, 3*d*, 3*e*, 3*f*, 3*g*, 3*h*, 3*i*, 3*j*, 3*k*, 3*l*, 3*m*, 3*n*, 30, 3*p*, 3*q* and 3*r*, shown are illustrative examples of a m-axis 201, m-plane 202 and m-hyperplane 203 microphone 106 arrangements including the effective impact on virtual microphone 301 shape and size and coverage pattern dispersion of the virtual microphones 301 and reflected virtual microphones 302 in a space 112. For details on have virtual microphones 301 are formed and positioned in the 3D space 112, refer to U.S. Pat. No. 10,063,987. And for forming a combined array from ad-hoc arrays and discrete microphones, refer to U.S. patent application Ser. No. 18/116,632 filed Mar. 2, 2023.

It is important for the combined microphone system to be able to determine its microphone arrangement during the building of the combined microphone array. The microphone arrangement determines how the virtual microphones 301 can be arranged, placed, and dimensioned in the 3D space 112. Once the virtual microphones 301 have been placed in a position 702 relative to the combined array, the gain structure parameters for each virtual microphone 301 can be determined. Since each virtual microphone 301 has a known position 702 to the combined array a positional based gain control strategy can be implemented. With that it is important to understand the various microphone arrangements and how virtual microphones 301 are distributed in each scenario. The preferred embodiment of the invention will be able to utilize the automatically determined microphone arrangement for each unique combined microphone array 124 to dynamically optimize the virtual microphone 301 coverage pattern for the particular microphone 106 arrangement of the combined microphone array 124 installation. As more microphone elements 106 and/or arrays 124 also known as boundary devices are incrementally added to the system the combined microphone system can further optimize the coverage dimensions of the virtual microphone 301 bubble map to the specific room 112 dimensions and/or boundary device locations 702 relative to each other thus creating an extremely flexible and scalable array architecture that can automatically determine and adjust its coverage area, and gain structure eliminating the need for manual configuration and the dependence on heuristic AGC algorithms, the usage of independent microphone arrays with overlapping coverage areas and complex handoff and cover zone mappings. The microphone arrangement of the combined array allows for a contiguous virtual microphone 301 map with known virtual microphone 301 locations 702 across all the installed devices 106, 124. It is important to understand the various microphone arrangements and the coverage zone specifics that the preferred embodiment of the invention uses.

Figure 3A:
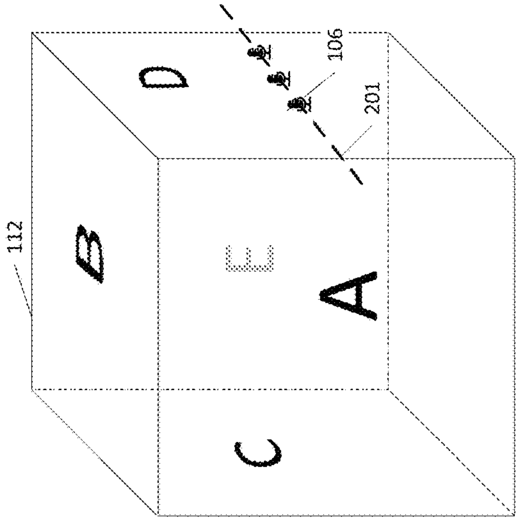
Figure 3B:
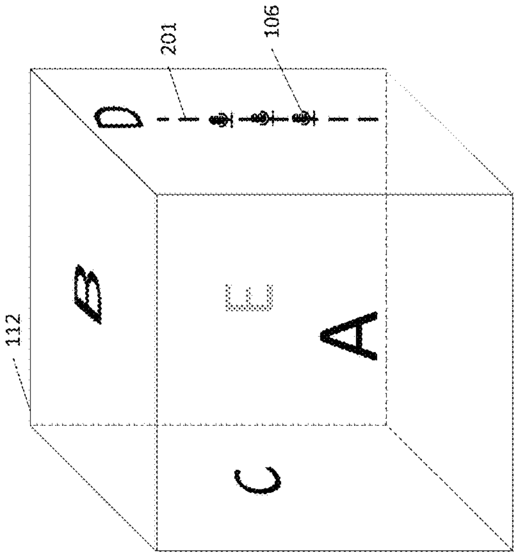
Figure 3C:
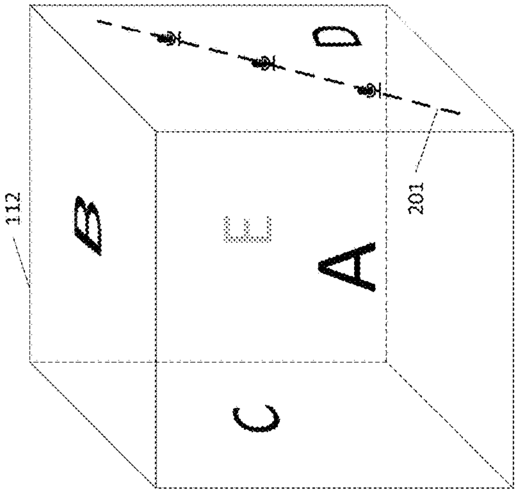

With reference to FIGS. 3*a*, 3*b* and 3*c*, illustrated are the layout of microphones 106 which forms a m-axis 201 arrangement. The Microphones 106 can be located on any plane A, B, C, D, and E and form an m-axis 201 arrangement. The m-axis 201 can be in any orientation horizontal FIG. 3*a*, vertical FIG. 3*b* or diagonal FIG. 3*c*. As long as the all microphones 106 in the combined array are constrained to a 1D axis the microphones 106 will form a m-axis 201 arrangement.

FIG. 3*d* is an illustrative diagram of the virtual microphone 301 shape that is formed from an m-axis 201 arrangement and the distribution of the virtual microphones 301 along the mounting axis of the microphone array 124. Each virtual microphone 301 is drawn as a circle (bubble) to illustrate its relative position to the microphone array 124. The number of virtual microphones 301 that can be created is a direct function of the setup and hardware limitations of the system processor 117. In the case of an m-axis 201 arrangement the virtual microphone 301 cannot be resolved specifically to a point in space and instead is represented as a toroid in the 3D space. The toroid 306 is centered on the center of the microphone axis 201 as illustrated in the side view illustration. The effect of this virtual microphone 301 toroid shape 306 is that there are always two points within the toroid 306 geometry that the m-axis 201 arrangement will be seen as equal and cannot be differentiated. The impact of this is a real virtual microphone 301 and a reflected virtual microphone 302 on the same plane. Due to this toroid geometry, the virtual microphones 301 cannot differentiate between spots in the z-axis. Therefore, the virtual microphones 301 are aligned in a single x-y plane. Allocating virtual microphones in the z-dimension would be redundant since these would still intersect with the x-y plane anyways. Note that each toroid will intersect with the x-y plane in two different spots. One of these is the true virtual mic location 301 and the other is a reflected location 302 at the same distance on the opposite side of the microphone array 124. The microphone array 124 cannot distinguish between the two virtual microphones 301, 302 positions. As a result of this, it is a recommended constraint that a m-axis 201 arrangement be positioned on a solid boundary layer such as wall or ceiling so the reflected virtual microphone 302 can be ignored as sound behind the boundary (wall). Using this mounting constraint any sound source 107 found by the array 124 will be considered to be in the room 112 in front of the front wall.

The geometric layout of the virtual microphones 301 will be equally represented in the reflected virtual microphone plane behind the wall. The virtual microphone 301 distribution geometries are symmetrical as represented by front of wall 307*a* and behind the wall 307*b*. The number of virtual microphones 301 can be configured to the y-axis dimensions, front of wall depth 307*a* and the horizontal-axis, width across the front of wall 307*a*. As stated previously, the same dimensions will be reflected behind the wall. For example, the y-axis coverage pattern configuration limit 308*a* will be equally reflected behind the wall in the y-axis in the opposite direction 308*b*. The z-axis cannot be configured due to the toroid 308 shape of the virtual microphone geometry. Put another way the number of virtual microphones 301 can be configured in the y-axis and x-axis but not in the z-axis for the m-axis 201 arrangement. As mentioned previously the m-axis 201 arrangement is well suited to a boundary mounting scenario where the reflected virtual microphones 302 can be ignored and the z-axis is not critical for the function of the array 124 in the room 112. The preferred embodiment of the invention can position the virtual microphone 301 map in relative position to the m-axis 201 orientation and can be configured to constrain the width (x-axis) and depth (y-axis) of the virtual microphone 301 map if the room boundary dimensions are known relative to the m-axis 201 position in the room 112.

Figures 3E, 3F, 3G, 3H, 3I, 3J:
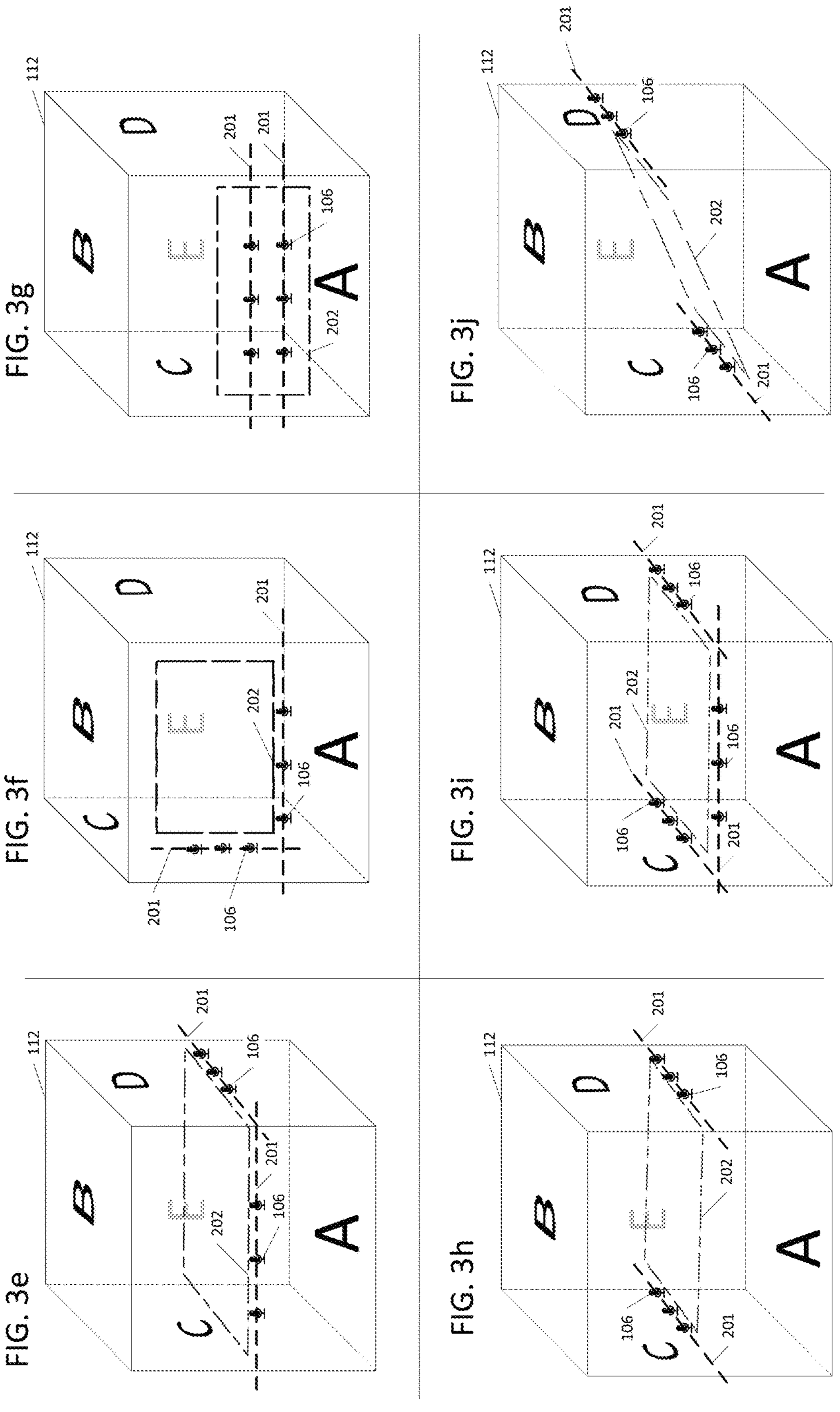
Figures 3L, 3M, 3N, 3O, 3P, 3Q:
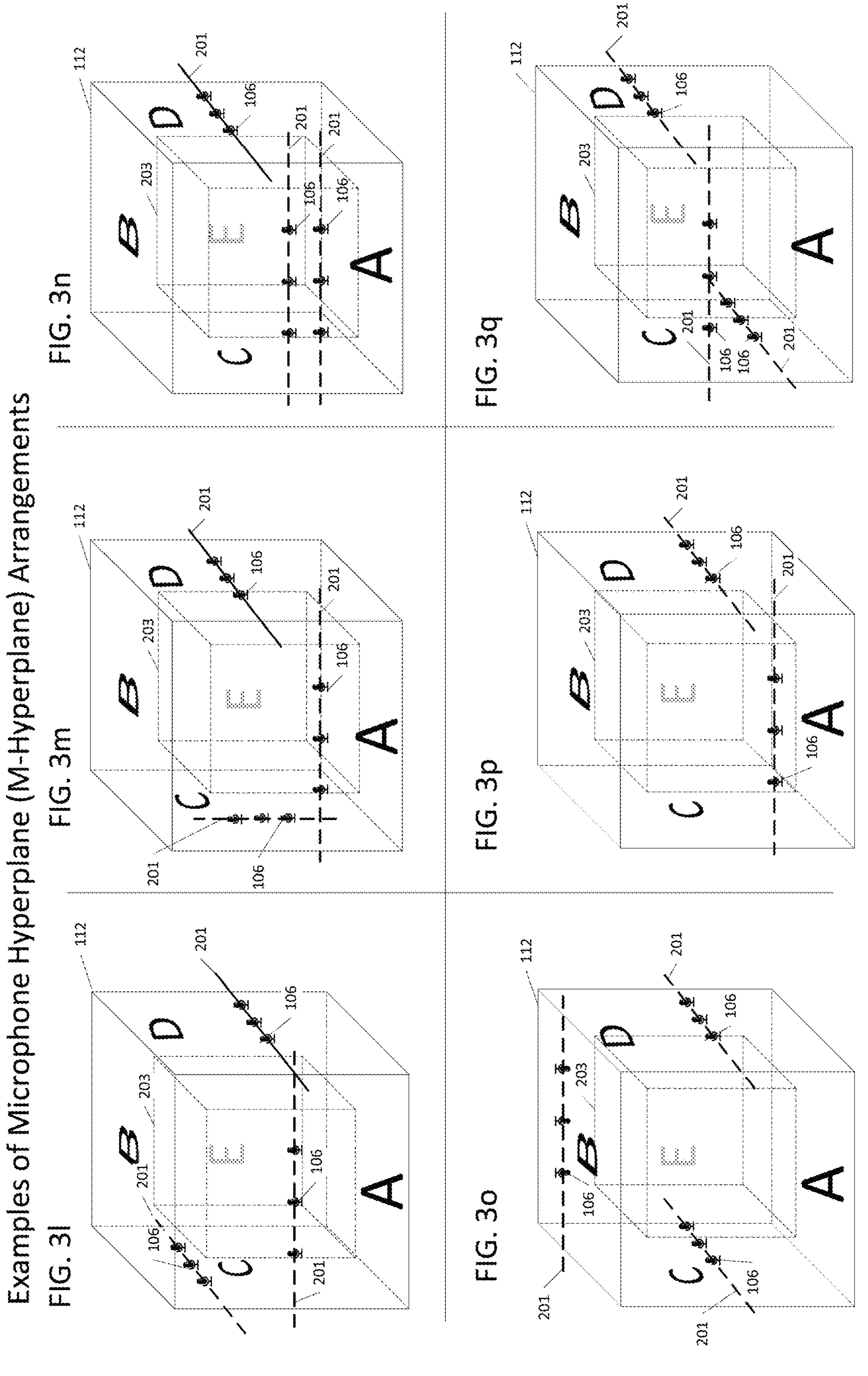

With reference to FIGS. 3*e*, 3*f*, 3*g*, 3*h*, 3*i*, and 3*j*, shown are illustrative examples of an m-plane 202 arrangement of microphones in a space 112. To form an m-plane 202 arrangement two or more m-axis 201 arrangements are required. The constraint is that the m-axis 201 arrangement must be constrained to forming only a single geometric plane which is referred to as a m-plane 202 arrangement. FIG. 3*e* illustrates two m-axis 201 arrangements, one installed on the wall "A" and one installed on wall "D" in such a manner that they are constrained to a 2D plane and forming an m-plane 202 microphone geometry. FIG. 3*f* takes the same two m-axis 201 arrangement and places it on a single wall or boundary "A". the plane orientation of the m-plane 202 is changed from horizontal to vertical and this affects the distribution of the virtual microphones 301 and reflected virtual microphones 302 on either side of the plane and illustrated in more detail in FIG. 3*k*. FIG. 3*g* is a rearrangement of the m-axis 201 microphones 106 and puts them stacked on top of each other separated by some distance. The distance separation is not important as long as the separation from the first m-axis 201 to the second m-axis 201 ends up creating a geometric plane which is a m-plane 202 arrangement. FIG. 3*h* puts the m-axis 201 on opposite walls which will still maintain a m-plane 202 arrangement through the center axis of the microphones 106. A third m-axis 201 arrangement is added in FIG. 3*i* and because the m-axis 201 are distributed along the same plane the m-plane 202 arrangement is maintained. Two m-axis 201 arrangements installed at different z-axis heights opposite each other, will form a plane geometry and form a m-plane 202 arrangement. An example of this is shown in FIG. 3*j*.

FIG. 3*k* is an illustrative example of the distribution and shape or the virtual microphones 301 across the coverage area resulting from an m-plane 202 arrangement. As per an m-axis 201 arrangement there will be two virtual microphones, a real virtual microphone 301 and a reflected virtual microphone 302 that will be represented on either side of the m-plane 202. The array 124 cannot distinguish a sound source 107 as being different from the front of the m-plane 202 to the back of the m-plane 202 as there will be a virtual microphone 301 that will share the same time difference of arrival values with a reflected virtual microphone 302 on the other side of the m-plane 202. As per the m-axis 201 it is best to mount an m-plane 202 arrangement on a physical boundary such as a wall or ceiling for example so the reflected virtual microphones 302 can be ignored in the space 112. Unlike an m-axis 201 arrangement the shape of the virtual microphone (bubble) 301, 302 can now be considered as a point source in the 3D space 112 and not as a toroid 306. This has the distinct advantage of being able to distribute virtual microphones 301 in the x-axis, y-axis and z-axis in a configuration based on the microphone 106, 124 locations and room boundary conditions to be further explained in detail. It is important to mount the m-plane 202 to utilize the virtual microphone 301 in front of the plane to the best advantage for the usage of the space 112. The virtual microphone 301 coverage dimensions can be configured and bounded in any axis. The number of virtual microphones 301 can be determined by hardware constraints and/or a pure configuration setting by the user or automatically determined and optimized based on the installed combined 124 microphone array location and number of boundary devices for a per room installed configuration. An m-plane 202 arrangement allows for the automatic and dynamic creation of a specific and optimized virtual microphone 301 coverage map over and above a m-axis 201 arrangement. The m-plane 202 has at least one boundary device on the plane and perhaps two or more boundary devices depending on the number of boundary devices installed and their orientation to each other. Note that in an m-plane 202 arrangement, due to the reflected virtual microphones 302, all virtual microphones 301 must be placed on one side of the m-plane 202. Therefore, the m-plane 202 acts as a boundary for the coverage zone dimensions. This means at least one dimension will be restrained by the plane. If there are boundary devices within the plane, further dimensions could also be restrained, depending on the nature of the boundary device. As a result, a further preferred embodiment of the invention specified in Provisional application 2 can specifically optimize the virtual microphone 301 coverage map to room boundaries and/or boundary device placement.

With reference to FIGS. 3*l*, 3*m*, 3*n*, 3*o*, 3*p* and 3*q*, shown are illustrative examples of an m-axis 201 and m-planes 202 arranged to form an m-hyperplane 203 arrangement of microphones 106 resulting in a virtual microphone 301 distribution that is not reflected or mirrored on either side of a m-plane 202 nor is it rotated around the m-axis 201 forming a toroid 306 shape. The hyperplane 203 arrangement is the most preferable microphone 106 arrangement as it affords the most configuration flexibility in the x-axis, y-axis and z-axis and eliminates the reflected virtual microphone 302 geometry. This means that although the microphones 106 are illustrated as being shown as mounted to a boundary they are not constrained to a boundary mounting location and can be offset, suspended and/or even table mounted, and optimal performance is maintained as there is no reflected virtual microphones 302 to be accounted for. As per the m-plane 202 arrangement all virtual microphones 301 are considered to be a point source in space.

For simplicity the illustration of the m-hyperplane 203 is shown as cubic however it is not constrained to a cubic geometry for virtual microphone 301 coverage map form factor and instead is meant to represent that the virtual microphones 301 are not distributed on an axis or a plane and thus incurring the limitations of those geometries. The virtual microphones 301 can be distributed in any geometry and pattern supported by the hardware and mounting locations of the individual arrays 124 within the combined array and be considered within the scope of the invention.

FIG. 3*r* illustrates a potential virtual microphone 301 coverage pattern that is obtained from a m-hyperplane 203 arrangement. There are no reflected virtual microphones 302 to be accounted for as the $3^{rd}$ mounting axis of the m-hyperplane 203 arrangement eliminates any duplicate time of arrival values to the combined microphone array from the sound source in the 3d space 112. The hyperplane 203 arrangement supports any distribution, size and position of virtual microphones 301 in the space 112 that the hardware and mounting locations of the microphone array 124 can support thus making it the most flexible, specific and optimized arrangement for automatically generating and placing the virtual microphone 301 coverage map in the 3D space 112.

With reference to FIGS. 4*a*, 4*b*, 4*c*, 4*d*, 4*e* and 4*f*, shown are current art illustrations showing common microphone deployment locations and the effects on microphone bar 114*a* coverage area overlapping 403, resulting in issues that can arise when the microphones are not treated as a single physical microphone array with one coverage area. It is important to understand how current systems in the art are not able to form a combined microphone array and thus are not able to dynamically create a specific coverage pattern that is optimized for each space 112 that the array system is installed in. Since each microphone array 114*a* and 114*b* may be acting independent of each other and the location 702 of the sound source 107 may not be known or may be only relevant to each individual array 114*a*, 114*b*, the audio level and ambient noise level 701 will be inconsistent between each array 114*a*, 114*b*. The arrangement of the arrays 114*a*, 114*b* will not change the undesired behavior of the gain management strategy as outlined below.

FIG. 4*a* illustrates a top-down view of a single microphone and speaker bar 114*a* mounted on a short wall of the room 112. The microphone and speaker bar array 114*a* provides sufficient coverage 401 to most of the room 112, and since a single microphone and speaker bar 114*a* is present, there are no coverage conflicts with other microphones 106 in the room 112.

FIG. 4*b* illustrates the addition of a second microphone and speaker bar 114*b* in the room 112 on the wall opposite of the microphone and speaker bar 114*a* unit. Since the two units 114*a*, 114*b* are operating independently of each other, their coverage patterns 401, 402 are significantly overlapped in 403. This can create issues as both devices could be tracking different sound sources and/or the same sound source making it difficult for the system processor 117 to combine the signals into a single, high-quality audio stream. The depicted configuration is not optimal but none-the-less is often used to get full room coverage and participants 101, 107 will most likely deal with inconsistent audio quality.

The coverage problem still exists if the second unit 114*b* is moved to a perpendicular side wall as shown in FIG. 4*c*. The overlap of the coverage patterns changes but system performance has not improved. FIG. 4*d* shows the two devices 114*a* and 114*b* on opposite long walls. Again, the overlap of the coverage patterns has changed but the core problem of the units 114*a*, 114*b* tracking of individual and/or more than one sounds sources remains. FIG. 4*e* depicts both units 114*a*, 114*b* on the same long wall with essentially the same coverage zone 401, 402 overlap with no improvement in overall system performance. Rearranging the units 114*a*, 114*b* does not address the core issues of having independent microphones covering a common space 112.

FIG. 4*f* further illustrates the problem in the current art if we use discrete individual microphones 106*a*, 106*b* installed in the ceiling to fill gaps in coverage. Microphone 106*a* has coverage pattern 404 and microphone 106*b* has coverage pattern 405. Microphone array 114*a* is still using coverage pattern 401. All three (3) microphones 114*a*, 106*a*, 106*b* overlap to varying degrees 407 causing coverage conflicts with certain participants at one section of the table 108. All microphones are effectively independent devices that are switched in and out of the audio conference system 110, either through complex logic or even manual switching resulting in a suboptimal audio conference experience resulting an unnatural varying of volume levels of the in room 112 participants 107 and perceived ambient background noise also changing sometimes dramatically for the remote participants 101.

With reference to FIGS. 5*a*, 5*b*, 5*c*, 5*d*, 5*e*, 5*f*, and 5*g*, illustrated are the result of a combined array (see U.S. patent application Ser. No. 18/116,632 filed Mar. 2, 2023) to overcoming limitations of independent units 114*a*, 114*b*, 106*a*, 106*b* with disparate coverage patterns from individual microphone elements or arrays 114*a*, 114*b*, 106*a*, 106*b*, regardless of mounting location, which can be calibrated and configured to perform as a single cohesive physical array system with a consolidated coverage area 501 and gain management strategy thus eliminating the complex issues of switching, managing and optimizing individual microphone elements 114*a*, 114*b*, 106*a*, 106*b* in a room 112. When combined the microphone arrangements being m-axis 201, m-plane 202 or m-hyperplane 203 can be utilized by the preferred embodiment of the invention to create optimal coverage patterns which can be automatically derived for each unique room installation of the combined microphone array. Once all microphones 106 have been calibrated into a combined array the resulting virtual microphone 301 coverage map can be configured for a cohesive and consistent gain mapping strategy based on the positional based gain control functionality for each virtual microphone 301 location 702 to each individual microphone element 106 in the system.

FIG. 5*a* illustrates a room 112 with two microphone and speaker bar units 114*a* and 114*b* installed on the same wall. Before auto-calibration, the two units 114*a*, 114*b* are operating as independent microphone arrays 114*a*, 114*b* in the room with disparate 401, 402 and overlapping 403 coverage patterns leading to inconsistent audio microphone pickup throughout the room 112. The same challenges are present when participants 107 are moving about the room 112 and crossing through the independent coverage areas 401, 402 and the overlapped coverage area 403. After auto-calibration is performed, the two units 114*a* and 114*b* will be integrated and operate as a single physical microphone array system 124 with one overall coverage pattern 501 that the audio conference system 110 can now transparently utilize as a single microphone array 124 installation in the room 112. Because all microphones 114*a*, 114*b* are utilized in the combined array 124, optimization decisions and selection of gain structures, microphone on/off, echo cancellation and audio processing can be maximized as if the audio conference system 110 was using a single microphone array system 114. The auto-calibration procedure run by the system processor 117 allows for the system to know the location (x, y, z) of each speaker 105 and microphone 106 element in the room 112. This gives the system processor 117 the ability to perform system optimization, setup and configuration that would not be practical in an independent device system. As previously described, current art systems primarily tune speaker and microphone levels to reduce feedback and speaker echo signals with tradeoffs being made to reduce either the speaker level or microphone gain. These tradeoffs will impact either the local conference participants 107 with a lower speaker 105 signal or remote participants 101 with a lower microphone gain level. Through the auto-calibration procedure in the described invention knowing the relative location of every speaker 105 and microphone 106 element, the system processor can better synchronize and optimize the audio processing algorithms to improve echo cancelation performance while boosting both speakers 105 and microphones 106 to more desirable levels for all participants 107.

FIGS. 5*c* and 5*d* further illustrate how any number of microphone and speaker bars 114*a*, 114*b*, 114*c*, 114*d* (four units are shown but any number is within scope of the invention) with independent coverage areas 401, 402, 404, 405 can be calibrated to form a single microphone array 124 and coverage zone 501. FIG. 5*e* Shows four examples of preferred configurations for mounting units 114*a*, 114*b*, 114*c* in the same room space 112 in various fully supported mounting orientations. Although the bars 114*a*, 114*b*, 114*c* are shown mounted in a horizontal orientation, the mounting orientation is not critical to the calibration process meaning that the microphones 106 can be located (x, y, z) in any orientation and on any surface plane and be within scope of the preferred embodiment of the invention. The system processor 117 is not limited to these configurations as any microphone arrangement can be calibrated to define a single microphone array 114 and operate with all the benefits of location detection, coverage zone configurations and gain structure control.

FIGS. 5*f* and 5*g* extend the examples to show how a discrete microphone 106, if desired, can be placed on the table. Without auto-calibration microphone 106 has its own unique and separate coverage zone 404. After auto-calibration of the microphone systems 114*a*, 114*b*, 106, all microphone elements, are configured to operate as a single physical microphone array 124 with a consolidated coverage area 501. Once the combined array is formed the preferred embodiment of the invention can automatically determine virtual microphone 301 distribution, placement and coverage zone dimensions and size can be determined and optimized for each individual and unique room 112 installation without requiring the need for complex configuration management.

Once the virtual microphone 301 map has been determined, the positional based gain control (PBGC) 920 FIG. 9*d* parameters can be derived and sent to the PBGC processor as outlined in FIGS. 9*a*, 9*b*, 9*c* and 9*d*.

With reference to FIG. 6, shown is an example of the basic coordinate layout with respect to the room 112. The x-axis represents the horizontal placement of the microphone system 124 along the side wall. The y-axis represents the depth coordinate in the room 112 and the z-axis is a coordinate representation of the height in the room 112. The axes will be referenced for both microphone array 124 installation location and virtual microphone 301 distribution throughout the room 112 in the specification. Optimizing the placement of a combined array can be done by knowing the microphone arrangement of m-axis 201, m-plane 202 and m-hyperplane 203. The installer can optimize the placement of the combined array to maximize the benefit of the microphone arrangement geometry while minimizing the impact of the reflected virtual microphones 302. The optimization of the combined array can be further enhanced by knowing the installation location of the boundary devices relative to each other and relative to the room 112 boundaries such as the walls, floor, or ceiling.

With reference to FIG. 7, shown is a prior art illustration of a single microphone array 124 positional gain control system in a room 112 with a microphone array 124, which comprises a plurality of microphones 106. This diagram illustrates the various configuration zones that are available for the microphone array 124.

For the purpose of this embodiment, the microphone array 124 is positioned against a wall; however, the position of the microphone array 124 can be against any wall, ceiling mounted, suspended, tabletop mounted and/or placed on a mounting stand such as tripod in the room 112. There are notionally three participants illustrated in the room, Participant 1 107, Participant 2 107 and Participant 3 107. Participant(s) and sound source(s) can and will be used interchangeably and in this context mean substantially the same thing. Each participant 107 illustrates, but is not limited to, an example of the variability of position within a room 112. The embodiments are designed to adjust for and accommodate such positions (stationary and/or moving). For example, each participant 107 may be moving, and thus have varying location coordinates in the X, Y, and Z directions. Also illustrated is an ambient sound 701, which may be present and propagated throughout the room 112, such that it is relatively constant for each participant 107, locations. For example, the room ambient noise 701 may be one or more of HVAC noise, TV noise, outside noise, etc.

Also illustrated is a Minimum Threshold Distance (MTD) 703 and a Configurable Threshold Distance (CTD) 704. The area inside the CTD 704 is the microphone array 124 configuration zone. In that zone, utilizing the specific distance P2 d(m) 705 (e.g., distance in metric) of participant 2 107, the array 124 will be configured for individual gain and microphone 106 selection to stabilize the array 124 volume output and ambient sound level 701 relative to the Participant 2 location 107. Within the CTD 704 there is preferably enough positional 702 resolution of the system to utilize distance path loss 705 to tune the array 124 for individual microphone 106 gain-weighted measurements. Within the zone of the CTD 704 and the MTD 703, the microphone array 124 is dynamically configured to utilize between one and twelve of the microphones 106, based on the position 702 of the sound source 107.

For participants 107 outside the CTD 704, preferably all microphones 106 are used. As the sound source 107 gets further from the CTD 704, its perceived volume will drop off. This is the preferred behavior as it may be undesirable to pick up people far away and have them sound as if they are in the room.

For participants 107 in the zone between the MTD 703 and the CTD 704, the system will preferably pick the n+1 microphones 124*b* which are closest to the location 702 of the sound source 107 to act as the microphone array (e.g., one of them will only be fractionally on) and the remainder are preferably turned off.

When a participant 1 107 is within the MTD 703 distance P1 d(m) 706, the system will preferably select a pair of microphones 106 in the array 124, so that the ambient sound level 701 can be maintained with one microphone 124*b* fully on and one fractionally on, e.g., 5%, 10%, 15%, 20%, 25%, 30%, 35%, 40%, 45%, 50%, or any value between 0% and 99%. When the participant 107 gets within the MTD 703 of the closest microphone 106, the array 124 will preferably no longer use that microphone 106. Instead, the system preferably uses one or more other microphones 106 further away, that are outside the closest-microphone MTD 703 to control the gain of the sound source 107. If the microphones 106 are spaced close enough, there will usually exist a microphone in the range where n=1. The maximum microphone 106 spacing allowed is preferably (sqrt(2)−1)*MTD 703.

Beyond the CTD 704 such as Participant 3 107 at distance P3 d(m) 707, all 12 microphones (or however many microphones are in the array, e.g., any number between 2 and 100; and the "array" may be a one-dimensional array, a two-dimensional matrix array, or a three-dimensional linear or matrix array having certain microphones 106 at different distances from a Z-axis baseline) of the microphone array 124 are preferably sequentially enabled as the positional information 702 (obtained from the system) becomes too granular and the best performance is realized with all 12 microphones 106 in operation. Both the MTD 703 and the CTD 704 are preferably system-configurable parameters that are set based on the microphone array 124 parameters and the room 112 parameters.

The prior art invention described in U.S. Pat. No. 10,387,108 considers a single (minimum) distance from the sound source 107 to a single (closest) microphone within the microphone array. This single distance is a reasonably good approximation for the remaining microphones contained in the same array 124. However, when two or more arrays 124 are used the single distance used in prior art equations is largely inadequate for modeling the contribution of microphones 106 in separate arrays 124 positioned at significant distances from each other. In contrast, current invention overcomes this limitation by accurately accounting for the plurality of distances from the sound source 107 to the plurality of microphone elements 106 by defining a generalized mathematical treatment.

With reference to FIG. 8*a* shown is a preferred embodiment of the positional based gain control (PBGC) invention that illustrates a room 112 with plurality of microphone arrays 124*a*, 124*b*, and 124*c* and standalone microphones 106 such as tabletop 108 design. Each microphone array contains a plurality of microphones 106. This diagram illustrates the configuration zone that is available for the microphone arrays 124*a*, 124*b*, and 124*c*.

For the purpose of this embodiment, the microphone arrays 124*a*, 124*b* and 124*c* are positioned against walls, ceiling mounted, suspended, tabletop mounted and/or placed on a mounting stand such as tripod in the room 112 and the microphone arrays can be placed on any wall in the room 112, there can be plurality of microphone arrays on the same wall surface and ceiling of the room 112. There are notionally three participants 107 illustrated in the room 112, Participant 1 107, Participant 2 107 and Participant 3 107. Participant(s) and sound source(s) can and will be used interchangeably and in this context mean substantially the same thing. Each participant 107 illustrates, but is not limited to, an example of the variability of position 702 within a room 112. The embodiments are designed to adjust for and accommodate such positions 702 (stationary and/or moving). For example, each Participant 107 may be moving, and thus have varying location 702 coordinates in the X, Y, and Z directions. Also illustrated is an ambient sound 701, which may be present and propagated throughout the room, such that it is relatively constant for each participant 107 locations. For example, the room 112 ambient noise 701 may be one or more of HVAC noise, TV noise, outside noise, etc.

Also illustrated in FIG. 8*a* is a Configurable Threshold Distance (CTD) 704. The area inside the CTD 704 is the microphone array 124*a* configuration zone. In that zone, utilizing the specific distance P1 d(m) (e.g., distance in metric) 801, the array will be configured for individual gain and microphone selection to stabilize the array 124*a* volume output and ambient sound level 701 relative to the Participant 1 location 702. For the participant 1 at location 702 all other microphone arrays 124*b*, 124*c* and standalone microphone 106 are turned off since array 124*a* provides sufficient gain to stabilize the output sound. This is done by utilizing between one and six of the microphones 106 in array 124*a* (e.g., one of them will only be fractionally on) and the remainder are preferably turned off.

For participants 107 outside the CTD 704 additional microphone arrays 124*b*, 124*c* and 106 are activated and a sufficient number of microphones 106 within each of the arrays are utilized to stabilize the volume output and ambient sound at location 702. As the sound source 107 moves further away from arrays 124*b*, 124*c* and 106 and all available microphones 106 are already utilized, the audio level will start to drop off. This is the preferred behavior as it may be undesirable to pick up people far away such as outside of the bubble map coverage zone and have them sound as if they are in the room 112. At certain locations of the source 107 the invention may preferably determine that one or more of the arrays 124*a*, 124*b*, 124*c* and 106 based on specific distances to the source P21, P24, P23 and P22 respectively are contributing adversely to stabilizing the volume output and ambient sound 701 and consequently direct that array to turn all microphones 106 off. This aspect of the invention is referred to as the microphone engagement criteria. For the example of participant 2 source at location 702 to the array 124*b* may be the first choice of the array to be turned off due to the largest relative distance P24.

When only a subset of microphones 106 within each array 124*a*, 124*b*, 124, and 106 is utilized the system may pick the microphones 106 that are closest to the source location 702 or microphones 106 starting from the center of the array 124 or other similar methods of microphone allocation (FIGS. 11*a*, 11*b* and 11*c*). The microphone 106 allocation schemes preferably account for the form factor of the array (FIG. 2*a*), the proximity of loudspeakers 105 to microphones 106 and related echo return loss. Furthermore, as the number of microphones 106 across arrays 124*a*, 124*b*, and 124*c* are enabled (activated) due to increasing distances to the sound source 107 the unused microphones 106 from the closest of the arrays 124*a*-124*c*, and 106 are utilized first.

When two or more array CTD 704 zones overlap due to proximity of the arrays 124, the microphone 106 allocation proceeds as outlined above but resulting signal weights allows for the microphones 106 from both overlapping arrays to be active simultaneously. Such case is illustrated with the arrays 124*b* and 124*c* and the sound source 107 participant 3 in FIG. 8A.

When the sound source inside the CTD zone 704 moves closer to the microphone array 124 and the number of microphones 106 utilized according to the invention decreases to 1 the distance to the array is called the Minimum Threshold Distance (MTD 703) and denoted with symbol Dm in the equations. It should be noted that the MTD 703 in the invention is a significant improvement over prior art and results in improved microphone array 124 performance in this region as will be further described in the specification. This boundary is illustrated in FIG. 12*b* for a 10-microphone array example. When the participant 107 gets within the MTD 703 of the closest microphone, the array will preferably no longer use that microphone. Instead, the system preferably uses one or more other microphones further away, that are outside the closest-microphone MTD 703 to control the gain of the sound source 107. If the microphones 106 are spaced close enough, there will usually exist a microphone 106 in the range where n=1. The maximum microphone spacing allowed is preferably (sqrt (2)−1)*MTD 703. In another embodiment termed fractional MTD 703 method, the distance to the source 107 is allowed to fall below the MTD 703 and a single microphone 106 is activated with a fractional weight. The output volume is stabilized at the desired value however the ambient sound level is reduced compared to other locations of 107. The details of these two options are described in FIG. 10*b*.

Each of the arrays 124*a*, 124*b*, 124*c*, and 106 may contain generally a different number of microphone elements 106; and the “array” may be a one-dimensional array (m-axis 201), a two-dimensional matrix array (m-plane 202), or a three-dimensional linear or matrix array (m-hyperplane 203) having certain microphones 106 at different distances from a Z-axis baseline. CTD 704 is preferably a system-configurable parameter denoted by distance Dc while MTD 703 zone is derived from the selected CTD 704 as outlined by S1023 in FIG. 10*b*. The desired output volume is achieved through a system configurable parameter called effective gain. When the effective gain is defined in terms of the nominal microphone array size N1 and the distance Dc as described in more detail later (see equation (4)), the intuitive behavior emerges where the closest array with exactly N1 microphones is able to stabilize the output volume up to exactly CTD 704 away. Conversely, a closest array 124 with fewer microphone elements 106 than the nominal number N1 may “run-out” of available microphones 106 before the sound source 107 moves away to the CTD 704 boundary and the output volume may start to decrease from the desired value.

Similarly, a closest array 124 with more than N1 microphone elements will maintain the desired output level beyond the CTD 704 range. The nominal microphone array size N1 is preferably a system-configurable parameter. For the example system in FIG. 8*a* a suitable setting of N1=6 is preferably selected which causes arrays 124*a* and 124*c* to maintain the desired output level up to distance CTD 704. As the sound source 107 moves further away the output volume may start to decrease from the desired value. This decrease will depend on the location 702 and distances from the sound source 107 to other arrays 124*a*, 124*b*, 124*c* and 106 in the room 112 and whether they can provide sufficient gain to maintain the desired output volume.

Note that the microphone allocation scheme such as those presented in FIGS. 11*a* and 11*b* will affect the shape of the region described by the MTD 703 This is shown in FIGS. 11*d* and 11*e*. FIG. 11*d* shows the MTD 703 for a center-based allocation scheme. Here, the MTD represents a semi-circle around the center of the microphone array 124. Any point in this semi-circle has an equivalent distance 1115 to the center of the microphone array 124. In this configuration, the center microphone is always the first to be allocated so the MTD is based on the distance to that mic. FIG. 11*e* shows the MTD shape 703 that results from a nearest-based microphone 106 allocation scheme. Here, the first microphone 106 to be allocated is always set to the nearest microphone 106 from the MTD. In this case, distance 1115 represents the distance from any point in the MTD to the nearest microphone 106 available. Note that the CTD 704 remains the same for both schemes. The CTD is based on the configuration where all microphones 106 in the array 124 are turned on so the microphone 106 allocation scheme does not affect its shape.

With reference to FIG. 8*b*, shown is an illustration of a grid overlay of virtual microphones 301 which are individually located at x, y, z locations 702. Each participant 107 location 702 corresponds to a virtual microphone 301 location 702 in the room 112. It is this location 702 that is used by the Audio Processor 903 to adjust microphone 106 parameters to control the overall microphone system gain and delay.

With reference to FIG. 9*a*, shown is a block diagram showing a subset of high-level system components related to a preferred embodiment of the invention. The three major processing blocks are the Array Configuration and Calibration 901, the Targeting Processor 902, and Audio Processor 903. The invention described herein utilizes both the Array Configuration and Calibration block 901 which finds the location of physical microphones 106 throughout the room 112 and uses various configuration constraints 937 to create coverage zone dimensions 938 that are then used by the Targeting Processor 902 and the Audio Processor block 903 which uses the location information to produce the combined audio channel signals. Examples of configuration constraints 937 but not limited to are relative locations of speakers and microphones within an array, distance between outer-most speakers and microphones in the array, array orientations relative to the room and to other arrays, array tilt angle, height differences between arrays and maximum distance allowed between arrays. The Array Configuration and Calibration block 901 is described in more details in FIG. 9*d*. First, the Array Configuration and Calibration block 901 finds the location of all physical microphones 106 in the system by injecting a known signal 939 to the speakers 105 and measuring the delays to each microphone 106. This is performed in the Array Building block 901*a*, which uses the microphone delays and configuration constraints 937 to find the location estimates 916 of all microphones 106 in the system. This process is described in more details in U.S. patent application Ser. No. 18/116,632 filed Mar. 2, 2023. Once the location 702 of all physical microphones 106 has been determined, the next step is to create coverage zone dimensions and populate the coverage zone with virtual microphones 301. Herein, populating the coverage zone dimensions with the virtual microphones includes densely or non-densely (or sparsely) filling the coverage zone dimensions with the virtual microphones and uniformly or non-uniformly placing the virtual microphones in the coverage zone dimensions. Any number of virtual microphones can be contained in the coverage zone dimensions. This process 919 is described more details in U.S. Provisional Application No. 63/322,504 filed Mar. 22, 2022. Once the virtual microphones 301 have been allocated, the next step is to find the corresponding delays from each virtual microphone 301 to all physical microphones 106. This is preferably done as part of the Virtual Microphone Map Creation block 919 and sent along with the virtual microphone 301 locations in 938 to the Targeting Processor block 902 which will use the delays to identify sound source 107 locations 702 from the virtual microphones 301 as described in FIG. 9*b*. The resulting real-time location results from the Targeting Processor 902 are sent to the Audio Processor 903 in 908. Additionally, the Array Configuration and Calibration block 901 preferably provides the array location x,y,z while block 920 pre-computes the PBGC gain tables as described by the invention and sends the gain and delay tables to the Audio Processor 903 in 940. These are then used by the Audio Processor 903 to combine the physical microphone 106 signals into desired channel audio signals as described in FIG. 9*e*. Alternatively, the PBGC gain and delay values could be computed by the Audio Processor 903 real-time every time a new sound source 107 location 702 is focused on.

With reference to FIGS. 9*b* and 9*c*, shown are illustrations of the target processor. FIG. 9*b* describes the target processor 902. A sound source is picked up by a microphone array 124 of many (M) physical microphones 106. The microphone signals 918 are inputs to the mic element processors 910 as described in FIG. 9*c*. This returns an N*M*Time 3D array of each 2D mic element processor output 911 that then sums all (M) microphones 106 for each bubble n=1 . . . N in 906. This is a sum of sound pressure that is then converted to power in 905 by squaring each sample. The power signals are then preferably summed over a given time window such as 50-100 ms by the N accumulators at node 907. The sum represents the signal energy over that given time period. The unfocused signal energy is preferably calculated by summing in 922 the energies of each microphone signal 918 over the given time window, weighted by the maximum ratio combining weight squared. This is the energy that we would expect if all the signals were uncorrelated. The processing gains 909 is then preferably calculated for each virtual microphone bubble 301 by dividing the microphone array signal energy by the unfocused signal energy 904. Node 942 searches through the output of the processing gain unit 909 for the bubble 301 with the highest processing gain. This will correspond to the active sound source 927. FIG. 9*c* shows the Mic Element Processor 910. Individual microphone signals 918 are passed through a precondition process 917 that can filter off undesired frequencies such as frequencies below 100 Hz that are not found in typical voice bands from the signal before being stored in a delay line 943. The Mic Element Processor 910 uses the delay 912 and weight 914 from each bubble 301 (*n*) to create the N*Time 2D output array 938. Each entry is created by multiplying the delayed microphone by the weight in 923. The weight and delay of each entry are based on the bubble position 915 and the delay 944 from the microphone 106 to that bubble 301. The position of all N bubbles 301 gets populated or filled by the Bubble Map Positioner Processor 921 based on the location of the available physical microphones 106 as described in U.S. Provisional Application No. 63/322,504 filed Mar. 22, 2022.

One embodiment may comprise the processor described and depicted in U.S. Pat. No. 10,063,987, the entire contents of which are incorporated herein by reference.

FIG. 9*e* shows an example configuration of the Audio Processor 903 as described in FIG. 9*a*. Here, microphone array devices 124*a*, 124*b*, and 124*c* (comprising a plurality of microphones 106) represent the combined microphone array found by the Array Configuration and Calibration block 901. The signals 935 from this combined mic array are used by both the Target Processor 902 and the Audio Processor 903. For the Audio Processor 903, the individual raw mic signals 935 are first preferably processed for example but not limited to remove noise, reverberation and echo in block 930. This creates the processed audio streams 936 that are used by the multipliers 929. Note that some or all of this processing in the Audio Processor 930 may also be optionally applied to the audio streams 918 that are used by the Target Processor 902. Doing so can help the Target Processor 902 to focus on desired sound sources such as Participants 107 instead of undesired sources such as coherent noise sources or residual echo signals. Alternatively, the raw microphone signals 935 could be used by both the multipliers 929 and the Target Processor 902 and the resulting combined microphone stream could later be subjected to the processing described in 930.

The sound pressure level (SPL) of the sound waves follows a very predictable loss pattern where the SPL is inversely proportional to the distances P21 d(m) 802, P22, P23 and P24 from the source Participant 2 107 to each of the microphone arrays 124*a*, 124*b*, 124*c*, and 106. Since the positional information 908 derived from the Target Processor 902 is known, the distance P21, P22, P23 and P24 can be calculated, and the PBGC within 920 calculates the gain required, on a per microphone 106 basis, based on the distances 802 to each microphone 106 of the microphone arrays 124*a*, 124*b*, 124*c*, and 106. In the preferred implementation the gain table covering every possible virtual microphone 301 location 702 is pre-calculated in PBGC within Array Configuration and Calibration process 901 step 920 and sent via 940 to the Gain Weight Processor 926 where the gain values are loaded and applied to the microphone signals. Alternatively, the PBGC invention can operate inside the Gain Weight Processor 926 while the Array Configuration and Calibration 901 provides only the physical array 124 and microphone 106 locations directly to 926 via the connection 916.

The Target Processor 902 utilizing the Microphone Array signals 918 preferably determines the substantially exact positional location 702 (X,Y,Z) coordinates of the sound source 107 with the highest processing gain. This is the sound source 107 that the microphone array 124 will focus on. The Target Processor 902 preferably runs independent of the Audio Processor 903. The Target Processor 902 preferably communicates the positional information 908 to the Audio Processor 903, which comprises the Delay Processor 932 and the Gain Weight Processor 926 which loads the PBGC gains from the gain table 940 for the virtual microphone 301 location 702 selected by 908. The Audio Processor 903 preferably runs at the required sample rates (e.g., 24 kHz) to support the desired frequency response specifications, meaning the sample rates are not limited by the invention implementation in the embodiments.

Once the Gain Weight parameters 928 Alpha (α=the multiplication factor to be applied to each of the fully-on microphone signals. f*α=the multiplication factor to be applied to the fractionally-on microphone signal (f is preferably a value between 0 and 1)); and the Pa parameters have been calculated, they are multiplied 929 with the individual Microphone 106 signals 936, resulting in weighted output parameters 931 that have been gain-compensated based on the actual distances 802 (P21, P22, P23 and P24) to each microphone 106 of the microphone arrays 124*a*, 124*b*, 124*c*, and 106. This process accomplishes the specific automatic gain control function, which adjusts the microphone 106 levels 931 that are preferably sent to the delay elements.

The delays in the microphone arrays 124*a*, 124*b*, 124*c*, and 106 are calculated using the positional information 908 from the Target Processor 901 in the Delay Processor 932. The Delay Processor 932 preferably calculates the individual direct path delays d(m) for each microphone 106 relative to the sound source 107 location 702. It then preferably adds the extra DELAY into each microphone path of D-d(m) so that the overall DELAY between the sound source 107 and the summer 933 through all the microphone paths is preferably a constant D. The value constant D would typically be the delay through the longest path between a microphone 106 and a position monitored by the Target Processor 902, measured in milliseconds. For example, if the longest distance between the 17 microphones 106 and the 8192 virtual microphone 301 points monitored by the Target Processor 902 is 10m, then then the value of D would be that distance converted into a delay, about 30 ms. The result is that signals from all microphones 106 are aligned in the time domain, allowing for maximum natural gain of all direct signal path signals to the microphone arrays 124*a*, 124*b*, 124*c*, and 106. All the output signals 934 are preferably summed at the Summer 933 and output for further system processing. The resulting delays are applied to all of the microphones whether they will be used by the Gain Weight Processor 926 or not.

Note that the Target Processor 902 can identify one or multiple sound source locations. The number of locations corresponds to the number of output channels provided by the audio processor. Each channel c would have its own set of weights and delays for its given location.

To provide gain control of the desired signal without affecting the ambient sound level is preferably accomplished through the following methods. This is accomplished by controlling the processing gain of the microphone arrays 124, 124*b*, 124*c* and 106. Processing gain is how much the arrays 124*a*, 124*b*, 124*c*, and 106 boosts the desired signal source relative to the undesired signal sources. As illustrated with the microphone arrays 124 in FIG. 8*a*, the processing gain is roughly the square root of the number of microphones in use ($\sqrt{17}$=4.12 if we use all 17 microphones). When it is desired to reduce the volume of the focused signal without affecting ambient levels 701, the microphones 106 in the arrays 124*a*, 124*b*, 124*c*, and 106 are turned off to reduce the gain and provide the proper scaling constants to keep the ambient sounds 701 at the same level. For example, if seven microphones 106 are turned off, the gain drops to $\sqrt{10}$=3.16, or a 2.3 dB drop from 17 microphones.

In this embodiment, the maximum gain that can be achieved with all 17 microphones is 4.12, and the minimum gain (when reduced to a single microphone) is 1. This gives a 12.3 dB gain range. Inside the CTD 704 of individual arrays 124*a*, 124*b*, 124*c*, and 106 typically only the microphones 106 of the closest array are enabled and individually turned off as the sound source gets closer to the array. Depending on the specific locations of arrays 124*a*, 124*b*, 124*c*, and 106 in the room 112 often the desired level is maintained well outside the CTD 704 due to the activation of microphones in plurality of arrays 124*a*, 124*b*, 124*c*, and 106 and the processing gain they provide. When distances P21, P22, P23 and P24 from sound source 107 to microphone arrays 124*a*, 124*b*, 124*c*, and 106 increase further the sound level will drop off with the inverse distance law.

To optimize the implementation embodiments, it is not preferred to just switch microphones 106 in and out, since this may cause undesirable jumps in the sound volume. To make the adjustments continuous, it is preferable to assign some number of microphones 106 to be fully turned on and one microphone 106 to be partially turned on. The partially turned-on microphone 106 allows a smooth transition from one set of microphones 106 to another, and to implement any arbitrary gain within the limits.

For the calculation of microphone gain parameters, it is preferred to determine a specific gain, Gf, for the focused signal while keeping the background gain, $G_{bg}$, at unity. To do this, it is preferred to turn n microphones 106 in system microphone array combining 124*a*, 124*b*, 124*c*, and 106 on fully and have one microphone 106, of any one of the available microphones 106, on fractionally with a constant f that is somewhere between 0 and 1. Each microphone 106 signal is preferably weighted by the common constant α. Given the assumptions that the background signals are orthogonal, so they add by power when combined, and that the levels of the signals arriving at each microphone 106 are aligned in phase due to the action of the delay processor 932, the rms gain of n signal with a gain of a and one signal with a gain of f*α is:

$$G_{bg}=\alpha\sqrt{n+f^2} \tag{1}$$

Setting $G_{bg}$ to unity to keep it constant gives:

$$\alpha=1/\sqrt{n+f^2} \tag{2}$$

Logic flow of the positional based gain control (PBGC) algorithm is captured in FIG. 10*a*. The PBGC procedure aims to compensate for the sound level attenuation due to sound propagation over the distance from the sound source to each of the microphones 106. The distances are computed from the known position Pt of the source sound 107 and the positions M(i) of each microphone 106 in the arrays 124*a*, 124*b*, 124*c*, and 106 according to the equation (see FIG. 10*a*, S1002), $$d(i)=\|M(i)-Pt\| \tag{3}$$

Where operator ‖ . . . ‖ represents the Euclidean distance calculation on position vector 702.

The desired effective gain $G_{eff}$ is a system configurable setting based on the CTD distance 704 denoted here as Dc (see FIG. 10*a*, S1001)

$$G_{eff}=\frac{Gm}{Dc} \tag{4}$$

The effective gain combines the effects of sound propagation over distances d(i) and the processing gain delivered by the Gain Weight Processor 926, and multipliers 929. The system stabilizes the output sound by maintaining the effective gain $G_{eff}$ at all locations close enough to microphone arrays 124*a*, 124*b*, 124*c*, and 106 where this is possible. When distances increase further and no additional microphones 106 are available to reinforce the sound, $G_{eff}$ cannot be maintained, and the output sound level will drop off. The value Gm is system configurable and preferably set to $Gm=\sqrt{N1}$ where N1 is the number of microphones within a single microphone array device, for example 6 in array 124. This definition for Gm provides an intuitive property that $G_{eff}$ can be maintained in the vicinity of an array with N1 microphones to at least the extent of the CTD 704 and possibly farther depending on the proximity of other microphone arrays 124*a*, 124*b*, 124*c*, and 106. Note that for arrays with fewer microphones 106 than N1 the range where $G_{eff}$ can be maintained is reduced and vice versa.

The position based gain processor 920 will meet the desired effective gain when sufficient number of microphones n and a fractional microphone f are enabled so that the following equation is met, $$\frac{Gm}{Dc}*d_{j(n+1)}=\frac{d_{j(n+1)}*\left(\frac{1}{d_{j(1)}}+\frac{1}{d_{j(2)}}+\ldots+\frac{1}{d_{j(n)}}\right)+f}{\sqrt{n+f^2}} \tag{5}$$

where distances d(j(1 . . . n)) are distances to n microphones and d(j(n+1)) is the distance to the fractional microphone f where all the microphones are allocated according to the active microphone allocation scheme described in FIGS. 11*a*, 11*b* and 11*c*. The allocation operation from the sequential microphone number 1 . . . n to the physical microphone number is represented by the index mapping j(1) . . . j(n). The microphone allocation scheme sequentially adds the microphones starting from the closest array either from closest microphone within this array, from the center microphone of this array or any other scheme suitable for a given form factor of each microphone array (see FIGS. 2*a* and 2*b*). Array form factor considerations for the microphone allocation scheme j(i) may include but not limited to echo cancellation effects due to proximity to the speakers 105 embedded in the array.

With reference to FIGS. 10*a* and 10*b*, shown are a preferred embodiment of the logic flow of the procedure for finding values n and f that satisfy equation (5). Furthermore, this procedure describes how the final gain processor values w(i) 928 for each microphone i are calculated once the number of fully enabled microphones n and the fractional microphone value f are known. The logic flow description is as follows:

Initially the number of microphones is n=1. After the first microphone j(1) is allocated in step S1003 according to the current allocation scheme (FIGS. 11*a*, 11*b* and 11*c*) step S1004 checks if the first allocated microphone is closer than the Minimum Threshold Distance (MTD) (illustrated in 703, computed in S1023) by comparing to Dm. When the distance to the first allocated microphone is smaller than Dm this microphone generally provides sufficient gain to meet the desired effective gain $G_{eff}$ and the logic flow diagram in FIG. 10*b* is executed at S1022.

Depending on system configurable parameter "MTD method" S1024 either a single fractional microphone j(1) is used (fractional method S1025) or the allocation j(1) is changed so that the distance d(j(1)) exceeds the threshold Dm (push-away method S1026). In the case of the fractional MTD method S1024 with processing step S1025 the output sound level is stabilized at the desired effective gain by setting the gain weight processor w(j(1)) to the following value, $$w(j(1))=\frac{Gm}{Dc}d_{j(1)} \tag{6}$$

When using the fractional MTD method S1024, the effective gain Geff is achieved and consequently the level of the source signal remains constant with the decreasing distance. However, the background signal level will decrease because the preferred unity gain according to the equations (1), (2) is not maintained. In contrast the use of the push-away MTD method S1024, processing step S1026 achieves both the desired effective gain and the background signal unity gain property provided that the size of the array, microphone spacing and the selection of parameters CTD/MTD 703, 704 allow for the re-allocation of the microphone 106 outside the MTD 703 zone per S1026. Examples of solutions for gain weight values w(j) for methods S1025, S1026 are illustrated in graphics 1001 and 1002 respectively. After push-away MTD method S1026 reassigns j(1) and the procedure control is returned to the main logic flow in FIG. 10*a* to calculate one additional fractional microphone as shown in example 1002. A legend describing the states of the microphones 106 is outlined in table 1003

The core processing steps S1012, S1013, S1014, S1015, S1016 act to evaluate the addition of one microphone at a time to find a sufficient set of microphones 106 that satisfies the equation (5). Step S1010 checks that there are unused microphones 106 still available for the processing loop to continue. When source position Pt is far from all microphone arrays and distances d(i) are large the right side of the equation (5) cannot meet the target focus gain Gf (left side of equation) which results in all microphones being activated (n=N). In such conditions, the final gains w(i) are calculated according to S1011 and the gain calculation procedure ends.

If unused microphones 106 are available in S1010 then next microphone j(n+1) is selected in step S1012 according to the desired allocation scheme (FIGS. 11*a*, 11*b*, and 11*c*). Note that S1012 is identical procedure to S1003 described earlier for allocating the first microphone. The distance to the allocated microphone d(j(n+1)) is used by S1013 to update the inverse distance sum according to the following equations, $$Sd(n) = \left(\frac{1}{d_{j(1)}} + \frac{1}{d_{j(2)}} + \ldots + \frac{1}{d_{j(n)}}\right) \tag{7}$$

$$Sd(n+1) = Sd(n) + \left(\frac{1}{d_{j(n+1)}}\right) \tag{8}$$

Where equation (8) shows that the (n+1) value can be more efficiently calculated recursively from the previous Sd(n) value based on all previously allocated microphones 1 . . . n. The values of Sd(n) and Sd(n+1) are used in the next step S1014 to compute the new microphone (n+1) engagement status according to the following equation, $$\frac{Sd(n+1)}{\sqrt{n+1}} > \frac{Sd(n)}{\sqrt{n}} \tag{9}$$

When true, this microphone engagement status indicates that the inclusion of the new microphone (n+1) increases the source signal level relative to the background signal (SNR) and that equation (5) is closer to being satisfied. The engagement status is checked in step S1015 in the logic flow diagram. If the new microphone 106 does not engage, i.e. equation (9) is false, then no additional microphones 106 will be allocated, and the gain processor weights are computed in S1020 from the subset of n from the total of N microphones 106 present in the system.

$$w(i) = \alpha = \frac{1}{\sqrt{n}} \quad \{i = 1 \ldots n\} \tag{10}$$

When n microphones are fully activated in S1020, there is no fractional microphone and the gains w(i) for the remaining microphones are set to 0. Intuitively speaking, the microphone (n+1) fails to engage when the distance d(j(n+1)) is large relative to distances of the currently allocated microphones 1 . . . n thus providing poor quality signal to the PBGC processor 920 (FIG. 9*d*). With step S1020 the gain calculation ends.

Conversely, when the engage status S1015 is true we proceed to checking if focus gain Gf(left hand side of equation (5)) has been met or exceeded by the additional gain provided by the microphone (n+1). The sufficient gain status is evaluated in S1016 according to equation, $$\frac{Sd(n+1)}{\sqrt{n+1}} > \frac{Gm}{Dc} \tag{11}$$

When the sufficient gain status (11) is false the new microphone (n+1) is appended to the list of fully active microphones in step S1017 and the processing loop continues at step S1010 where preferably the next microphone is evaluated. However, if sufficient gain is reached, i.e., condition in equation (11) is true, then we proceed to S1018 to solve the quadratic equation (14) for the unknown fractional microphone value f. The equation (14) is constructed by first making substitutions defined in equations (12) and (13).

$$Rd(n) = d_{j(n+1)} * Sd(n) \tag{12}$$

$$Gf(n) = d_{j(n+1)} * \frac{Gm}{Dc} \tag{13}$$

$$(Gf(n)^2 - 1) * f^2 - 2 * Rd(n) * f + (Gf(n)^2 * n - Rd(n)^2) = 0 \tag{14}$$

With the known values n (number of fully active microphones) and f (fraction assigned to the last microphone (n+1)) the weights 928 of the gain weight processor 926 are calculated in step S1019 as following, $$\alpha = \frac{1}{\sqrt{n + f^2}} \tag{15}$$

Then values a and f are used to calculate the fully activated microphone gains as w(j(1 . . . n))=a, the fractional microphone gains w(j(n+1))=α*f while the remaining microphone gains are set to w(i)=0 as described in step S1019 of the logic flow diagram in FIG. 10*a*. With step S1019 the gain calculation ends.

With reference to FIG. 12*a*, shown is a diagrammatic illustration of a room 112 that contains two microphone arrays Array-1 124*a* and Array-2 124*b* on opposite walls. A legend 1202 outlines the specific positions of Array-1 124*a* and Array-2 124*b* within the coordinates of the room 112 which are indicated on the room 112 walls. Contour lines described in more detail in FIGS. 12*b* and 12*c* are shown in the room 112 which represent how many microphones 106 are enabled in each array 124*a*, 124*b* based on the active virtual microphone 301 location 702 in the room 112. A full grid (map) of virtual microphones 301 are illustrated for the purpose of showing that the virtual microphone 301 map covers the entire room 112 and based on the virtual microphone 301 coverage pattern derived or configured. The number of virtual microphones 301 illustrated is a reduced for clarity purposes and the room can be configured with preferably 1000's, to more preferably 10,000's of virtual microphones 301 constrained to hardware, scalability and if set up user configured parameters. For clarity purposes in the remaining diagrams only one virtual microphone 301 will be illustrated in the figures; however, it should be noted that there is a plurality of virtual microphones 301 distributed throughout the room 112. The virtual microphone 301 illustrated in the remaining figures is considered to be the location 702 of an active talking participant 107 at that virtual microphone 301 location 702.

With reference to FIG. 12*b*, shown is a detailed illustration of possible microphone 106 activation contours lines. Each line represents a boundary to demarcate when a microphone 106 is activated or not activated. Activated in this case means ON and not activated means OFF. As the active sound source moves away from any one microphone array 124*a*, 124*b*, essentially activating a different virtual microphone 301 location 702 in the room 112, the number of microphones 106 activated increases as indicated by the notation contained within the contour lines. An example is going from n=1 microphones 106 to 2 microphones 106 activated to 3 microphones 106 and so on to a point where all microphones 106 are activated in the array 124*a* for example. Minimum threshold distance 703 is shown to be a region where 1 microphone 106 or a fractional microphone 106 is active. The configurable threshold distance 704 is the region where any number between 1 to the max number of microphones 106 in that specific array 124*a* or 124*b* is activated. The single array region (SAR) 1206 is the region where all single array 124*a* microphones are ON and the second or other microphone arrays 124*b* are not utilized at this point. The boundary for this region is defined as the single array region boundary (SARB) 1203. Past the SARB 1203 all microphones in the room 112 are enabled across all microphone arrays 124*a*, 124*b* which is called the "all microphones region" (AMR) 1204. The region where one or more arrays are working together is the "array collaboration region" (ACR) 1205. The ACR 1205 signifies that all microphone arrays are working together turning microphones 106 ON/OFF to manage the gain structure of the array based on the active virtual microphone 301 position in the room 112.

In FIG. 12*b* the gain calculation procedure is evaluated over all possible source sound locations 702 Pt in the room 112. The number of active microphones n+f is shown in the contour plot to illustrate the shape of the positional gain values for each location 702 in the room 112. The shape of the microphone 106 count contours depends on the location 702 of the two microphone arrays 124*a*, 124*b* relative to each other in the room 112. In this example, the Array-2 124*b* is located on the opposite wall offset 2 meters along the x-axis and 4.5 meters along the y-axis and arrays 124*a*, 124*b* contain 10 microphones elements 106 each. Note that the MTD 703 region is delineated by the contour of n=1 while the CTD 704 region is delineated by the contour of n=10.

Using the same room 112 configuration and positioning of arrays as in FIG. 12*b* the effective gains are shown in FIG. 12*c* for each location 702 in the room 112. Note, that the effective gain combines the attenuation of the source sound due to sound propagation through the air and the PBGC processor 920 gain designed to stabilize the output level. Note that a large area 1207 spanning from Array-1 124*a* to Array-2 124*b* shows a constant effective gain which indicates that the output level will be correctly stabilized. As the source position Pt moves farther away to each side the output level starts to drop off as anticipated since all the available microphones 106 have been used up and we limit at n=20.

The calculations of microphone gain parameters as described above (FIGS. 10*a*, and 10*b*) resulting in a set of weights w(i) for each microphone i=1 . . . N and for each location Pt 702 are preferably pre-calculated over all possible locations of the virtual microphone 301 map as shown in FIG. 12*a*. These virtual microphone 301 locations may preferably coincide with the discrete list of locations 938 that the bubble processor (BP) 902 evaluates and outputs as the source sound position 908. This method of using a finite set of source locations 702 (bubbles) 301 allows for the microphone gain parameters to be pre-calculated by the PBGC processor 920 and immediately available in the gain weight processor 926. Furthermore, due to the exact match of the virtual microphone 301 locations 702 between the Target Processor (TP) 902 and the PBGC processor 920 the detected position 908 can be used directly to select the gain weights for the detected source location 702.

Additional examples of the spatial arrangements of the microphone activation regions are shown in FIGS. 12*d* and 12*e* for the case of two microphone arrays. The microphone 106 activation regions depend directly on the relative orientations and distances between the microphone arrays 124*a*, 124*b*. When arrays 124*a*, 124*b* are closer together as in FIG. 12*e* the effect of the arrays 124*a*, 124*b* displays a higher degree of overlapping action. In FIG. 12*d* the second microphone array 124*b* is located on the same wall as the first microphone array 124*a* and offset 5.0 meters along the x-axis. With CTD 704 value set at 2.0 meters the CTD 704 zones exhibit separation, however due to the mutual reinforcement of the two arrays 124*a*, 124*b* the zones are linked through a narrow strip region ACR 1205 between the two arrays 124*a*, 124*b* where the desired effective gain is maintained.

The example in FIG. 12*e* shows two arrays 124*a*, 124*b* mounted on perpendicular walls at a somewhat closer range. Array-2 124*b* is offset 2 meters along the x-axis and 3 meters along the y-axis. The microphone 106 activation regions display a high degree of overlap and reinforcement of the two arrays 124*a*, 124*b* across that space. The desired effective gain is expected to be maintained in a broad region between Array-1 124*a* and Array-2 124*b* (for an example of effective gain contours see FIG. 12*c*)

Examples of gain weight processor weights calculated according to the PBGC logic flow logic and equations in FIGS. 10*a* and 10*b* for a specific spatial arrangement of two 10 microphone 106 arrays are shown in FIGS. 13*a*, 13*b*, 13*c*, 13*d*, and 13*e*. The sound source location corresponding to virtual microphone 301 (XYZ) location 702 is connected with arrows to the arrays that have one or more active microphones with non-zero weights after the application of PBGC logic flow and equations in FIGS. 10*a* and 10*b*. The following examples in the related FIGS. 13*a*, 13*b*, 13*c*, 13*d*, and 13*e* illustrate the microphones 106 activated based on the virtual microphone 301 position is relation to the two microphone arrays 124*a*, 124*b*, each specific case depends on the sound source (virtual microphone) 301 location 702 shown in table 1301. The table 1301 contains the status of each microphone 106 in each array 124*a*, 124*b*. The statuses are enabled=fully ON, disabled=fully off and fractional=partially on by a fractional amount between 0 and 1. In this instance each array 124*a*, 124*b* has 10 microphones and the state of each microphone 106 in each array 124*a*, 124*b* is shown. The sound source (virtual microphone 301) position 702 relative to the microphone arrays 124*a*, 124*b* is shown and the specific derived PBGC processor 920 values are shown. Consisting of Gain (the effect of audio processor 903), n=number of microphones 106 enabled, f=fractional microphone value, α=gain weight, $G_{eff}$=effective gain of the array. The value Gain in table 1301 represents the algorithm gain in the audio processor 903 on the desired sound source 107 that the system is focused on which is calculated as Gain=α*(n+f)

In FIG. 13*a* the sound source location 702 is located inside the CTD 704 zone of the array 124*b* at x-axis offset of 5 meters and y-axis offset of 3 meters. The application of the logic flow of the PBGC processor 920 results in n=5 microphones 106 activated with gain weights α=0.4477 and one fractional microphone 106 with gain weight of 0.0151*α as shown in table 1301. Due to sound source being located within the CTD 704 of Array-2 124*b*, sufficient gain is available due to action of Array-2 124*b* resulting in all Array-1 124*a* microphones 106 being disabled (OFF). The table 1301 also shows that the desired $G_{eff}$ of 1.7321 is maintained.

In FIG. 13*b* the sound source location 702 is located outside the CTD 704 zone of the array-2 124*b* but within the SAR 1206 region where array-1 124*a* does not engage due to condition defined in equation (9). The sound source is located 702 at x-axis offset of 5 meters and y-axis offset of 4.5 meters. The application of the logic flow of the PBGC processor 920 results in n=10 microphones 106 of array-2 124*b* activated with gain weights α=0.3157, no fractional microphone 106 and all microphones of Array-1 124*a* disabled as shown in table 1301. The table 1301 also shows that the desired $G_{eff}$ is not maintained, and the output level drops off slightly.

In FIG. 13*c* the sound source location 702 is located outside the CTD 704 zone of both Array-1 124*a* and Array-2 124*b* in the AMR 1204 at x-axis offset of 3 meters and y-axis offset of 4 meters. The application of the logic flow of the PBGC processor 920 results in all microphones 106 in the system n=20 activated with gain weights α=0.2233 and no fractional microphone 106 used as shown in table 1301. In this example both Array-1 124*a* and Array-2 124*b* microphones 106 engage according to the condition in equation (9). Since the distance to the arrays is significantly large the desired effective gain is not reached at $G_{eff}$=1.0798.

In FIG. 13*d* the sound source location 702 is located outside the CTD 704 zone of the array-1 124*a* but within the SAR 1206 region where array-2 124*b* does not engage due to condition defined in equation (9). The sound source location is located 702 at x-axis offset of −3 meters and y-axis offset of 2 meters. The application of the logic flow of the PBGC processor 920 results in n=10 microphone 106 of array-1 activated with gain weights α=0.3157, no fractional microphone 106 and all microphones 106 of array-2 124*b* disabled as shown in table 1301. The table 1301 also shows that the desired $G_{eff}$ is not maintained, and the output level drops off slightly.

In FIG. 13*e* the sound source 107 location 702 is located inside the CTD 704 zone of the array-1 124*a* at x-axis offset of −0.7 meters and y-axis offset of 0.7 meters and outside of the MTD 703. The application of the logic flow of the PBGC processor 920 results in n=2 microphones 106 activated with gain weights α=0.6833 and one fractional microphone 106 with gain weight of 0.3779*a as shown in table 1301. Due to sound source 107 being located 702 within the CTD 704 of array-1 124*a*, sufficient gain is available due to action of array-1 124*a* resulting in all array-2 124*b* microphones being disabled. The table 1301 also shows that the desired $G_{eff}$ of 1.7321 is maintained.

With reference to FIG. 14, shown is a graphical illustration of the effect of distance from the device (arrays) 124 and the effect on the output ambient noise 1401 performance of a PBGC 920 system vs an AGC system. Ambient noise 1401 also shown as 701 in FIG. 7 stays relatively constant as the sound source 107 moves away from the array device 124. This is what you would expect when you are in the room 112. If another person is talking to you while walking away, the ambient noise 1401 will stay relatively constant. In an AGC system that applies gain electronically to an audio signal from the array 124, the desired audio signal and ambient noise signal 1401 picked up by the microphone 106 have equal gain applied. So as the distance of the sound source 107 increases from the array 124 the AGC circuit will need to add gain in direct proportion to the amount of loss of desired signal in the microphone 106. This will cause a proportional increase in the ambient noise as illustrated by AGC Processed Noise 1402. In contrast to that, the PGBC 920 processor knows the distance to the sound source 107 and as a result, the correct number of microphones 106 can be enabled to provide a constant gain from the array 124. Since ambient noise 1401 is assumed to add orthogonally, the PBGC processed noise 1403 tracks the ambient noise 1401 and does not suffer the effects of an increase in level of ambient noise 1401 with an increase in added processing gain to the audio signal.

The embodiments described in this application have been presented with respect to use in one or more conference rooms preferably with multiple users. However, the present invention may also find applicability in other environments such as: 1. Commercial transit passenger and crew cabins such as, but not limited to, aircraft, busses, trains and boats. All of these commercial applications can be outfitted with microphones and can benefit from consistent desired source volume and control of the ambient sound conditions which can vary from moderate to considerable; 2. Private transportation such as cars, truck, and mini vans, where command and control applications and voice communication applications are becoming more prominent; 3. Industrial applications such as manufacturing floors, warehouses, hospitals, and retail outlets to allow for audio monitoring and to facilitate employee communications without having to use specific portable devices; and 4. Drive through windows and similar applications, where ambient sounds levels can be quite high and variable, can be controlled to consistent levels within the scope of the invention. Also, the processing described above may be carried out in one or more devices, one or more servers, cloud servers, etc.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for sound source positional based automatic gain control to dynamically adjust individual microphone elements of a cohesive microphone element in a shared 3D space for optimum audio signal and ambient sound level performance, comprising:

one or more of individual microphones and/or microphone arrays each including a plurality of microphones, wherein the microphones in each microphone array are arranged along a microphone axis; and a system processor communicating with the one or more of individual microphones and/or microphone arrays, wherein the system processor is configured to perform operations comprising:

obtaining, in real-time, locations of microphone elements of the one or more of individual microphones and/or microphone arrays throughout the shared 3D space and integrating, in real-time, the one or more of individual microphones and/or microphone arrays, by measuring delays to each microphone element of the one or more of individual microphones and/or microphone arrays, to build a single cohesive microphone element comprising the microphones elements of the one or more of individual microphones and/or microphone arrays;

obtaining, in real-time, a consolidated coverage zone dimension based on the single cohesive microphone element;

populating, in real-time, the consolidated coverage zone dimension with virtual microphones;

identifying locations of sound sources in the shared 3D space based on one or more of the virtual microphones receiving targeting focus;

computing one or more positional based gain control (PBGC) parameter values at locations of the one or more of the virtual microphones receiving the targeting focus based on the locations of the sound sources and the locations of the individual microphone elements of the single cohesive microphone element; and combining individual microphone element signals into desired one or more channel audio signals by applying the PBGC parameters to the individual microphone element signals to adjust the individual microphone elements of the single cohesive microphone element based on the location information of the sound sources.

2. The system of claim 1 wherein the PBGC parameter values are stored in one or more computer-readable media.

3. The system of claim 1 wherein the PBGC parameter values comprise gains for the individual microphone elements of the single cohesive microphone element and the virtual microphones.

4. The system of claim 1 wherein the adjusting the individual microphone elements comprises adjusting a gain value for each individual microphone element.

5. The system of claim 1 wherein the PBGC parameters are pre-computed based on the locations of the virtual microphones.

6. The system of claim 1 wherein the PBGC parameters are computed in real-time when a new sound source location is determined and corresponding virtual microphone receives focus.

7. The system of claim 1 wherein the operations further comprise:

creating processed audio signals from raw individual microphone element signals; and applying gain values to processed audio signals by using the PBGC parameters.

8. The system of claim 1 wherein the PBGC parameter values are derived on a per individual microphone element basis.

9. The system of claim 1 wherein the microphone elements of the single cohesive microphone element are configured to form a 2D plane in the shared 3D space.

10. The system of claim 1 wherein the microphone elements of the single cohesive microphone element are configured to form a hyperplane in the shared 3D space.

11. A method for sound source positional based automatic gain control to dynamically adjust individual microphone elements of a cohesive microphone element in a shared 3D space for optimum audio signal and ambient sound level performance, comprising:

obtaining, in real-time, locations of microphone elements of one or more of individual microphones and/or microphone arrays each including a plurality of microphones arranged along a microphone axis throughout the shared 3D space and integrating, in real-time, the one or more of individual microphones and/or microphone arrays, by measuring delays to each microphone element of the one or more of individual microphones and/or microphone arrays, to build a single cohesive microphone element comprising the microphones elements of the one or more of individual microphones and/or microphone arrays;

obtaining, in real-time, a consolidated coverage zone dimension based on the single cohesive microphone element;

populating, in real-time, the consolidated coverage zone dimension with virtual microphones;

identifying locations of sound sources in the shared 3D space based on one or more of the virtual microphones receiving targeting focus;

computing one or more positional based gain control (PBGC) parameter values at locations of the one or more of the virtual microphones receiving the targeting focus based on the locations of the sound sources and the locations of the individual microphone elements of the single cohesive microphone element; and combining individual microphone element signals into one or more channel audio signals by applying the PBGC parameters to the individual microphone element signals to adjust the individual microphone elements of the single cohesive microphone element based on the location information of the sound sources.

12. The method of claim 11 wherein the PBGC parameter values are stored in one or more computer-readable media.

13. The method of claim 11 wherein the PBGC parameter values comprise gains for the individual microphone elements of the single cohesive microphone element and the virtual microphones.

14. The method of claim 11 wherein the adjusting the individual microphone elements comprises adjusting a gain value for each individual microphone element.

15. The method of claim 11 wherein the PBGC parameters are pre-computed based on the locations of the virtual microphones.

16. The method of claim 11 wherein the PBGC parameters are computed in real-time when a new sound source location is determined and corresponding virtual microphone receives focus.

17. The method of claim 11 further comprising:

creating processed audio signals from raw individual microphone element signals; and applying gain values to processed audio signals by using the PBGC parameters.

18. The method of claim 11 wherein the PBGC parameter values are derived on a per individual microphone element basis.

19. The method of claim 11 wherein the microphone elements of the single cohesive microphone element are configured to form a 2D plane in the shared 3D space.

20. The method of claim 11 wherein the microphone elements of the single cohesive microphone element are configured to form a hyperplane in the shared 3D space.

21. One or more non-transitory computer-readable media for sound source positional based automatic gain control to dynamically adjust individual microphone elements of a cohesive microphone element in a shared 3D space for optimum audio signal and ambient sound level performance, the computer-readable media comprising instructions configured to cause a system processor to perform operations comprising:

obtaining, in real-time, locations of microphone elements of one or more of individual microphones and/or microphone arrays each including a plurality of microphones arranged along a microphone axis throughout the shared 3D space and integrating, in real-time, the one or more of individual microphones and/or microphone arrays, by measuring delays to each microphone element of the one or more of individual microphones and/or microphone arrays, to build a single cohesive microphone element comprising the microphones elements of the one or more of individual microphones and/or microphone arrays;

obtaining, in real-time, a consolidated coverage zone dimension based on the single cohesive microphone element;

populating, in real-time, the consolidated coverage zone dimension with virtual microphones;

identifying locations of sound sources in the shared 3D space based on one or more of the virtual microphones receiving targeting focus;

computing one or more positional based gain control (PBGC) parameter values at locations of the one or more of the virtual microphones receiving targeting focus based on the locations of the sound sources and the locations of the individual microphone elements of the single cohesive microphone element; and combining individual microphone element signals into one or more channel audio signals by applying the PBGC parameters to the individual microphone signals to adjust the individual microphone elements of the single cohesive microphone element based on the location information of the sound sources.

22. The one or more non-transitory computer-readable media of claim 21 wherein the PBGC parameter values are stored in one or more computer-readable media.

23. The one or more non-transitory computer-readable media of claim 21 wherein the PBGC parameter values comprise gains for the individual microphone elements of the single cohesive microphone element and the virtual microphones.

24. The one or more non-transitory computer-readable media of claim 21 wherein the adjusting the individual microphone elements comprises adjusting a gain value for each individual microphone element.

25. The one or more non-transitory computer-readable media of claim 21 wherein the PBGC parameters are pre-computed based on the locations of the virtual microphones.

26. The one or more non-transitory computer-readable media of claim 21 wherein the PBGC parameters are computed in real-time when a new sound source location is determined and corresponding virtual microphone receives focus.

27. The one or more non-transitory computer-readable media of claim 21 wherein the operations further comprise:

creating processed audio signals from raw individual microphone element signals; and applying gain values to processed audio signals by using the PBGC parameters.

28. The one or more non-transitory computer-readable media of claim 21 wherein the PBGC parameter values are derived on a per individual microphone element basis.

29. The one or more non-transitory computer-readable media of claim 21 wherein the microphone elements of the single cohesive microphone element are configured to form a 2D plane in the shared 3D space.

30. The one or more non-transitory computer-readable media of claim 21 wherein the microphone elements of the single cohesive microphone element are configured to form a hyperplane in the shared 3D space.

* * * * *